US009195648B2

(12) United States Patent
Giraudy et al.

(10) Patent No.: US 9,195,648 B2
(45) Date of Patent: Nov. 24, 2015

(54) MULTI-LINGUAL KNOWLEDGE BASE

(71) Applicants: Etienne Giraudy, San Francisco, CA (US); Gene Rivera, San Francisco, CA (US); Jill Blue Lin, Berkeley, CA (US); Nicolas Paymal, San Francisco, CA (US); Orjan Kjellberg, Walnut Creek, CA (US); Natalie Doan, San Jose, CA (US); Mark A. Fischer, Ashland, OR (US); Francois Lopitaux, San Francisco, CA (US)

(72) Inventors: Etienne Giraudy, San Francisco, CA (US); Gene Rivera, San Francisco, CA (US); Jill Blue Lin, Berkeley, CA (US); Nicolas Paymal, San Francisco, CA (US); Orjan Kjellberg, Walnut Creek, CA (US); Natalie Doan, San Jose, CA (US); Mark A. Fischer, Ashland, OR (US); Francois Lopitaux, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 128 days.

(21) Appl. No.: 13/645,503

(22) Filed: Oct. 4, 2012

(65) Prior Publication Data

US 2013/0151231 A1 Jun. 13, 2013

Related U.S. Application Data

(63) Continuation-in-part of application No. 13/272,015, filed on Oct. 12, 2011.

(51) Int. Cl.
*G06F 17/28* (2006.01)

(52) U.S. Cl.
CPC .............. *G06F 17/28* (2013.01); *G06F 17/289* (2013.01)

(58) Field of Classification Search
CPC . G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC ........................................ 704/1–10; 715/264
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |

(Continued)

FOREIGN PATENT DOCUMENTS

| | | | |
|---|---|---|---|
| WO | WO/2007/030796 | A2 | 3/2007 |
| WO | WO/2011/060306 | A2 | 5/2011 |

(Continued)

OTHER PUBLICATIONS

Holmes et al., Encoding models for scholarly literature, Jan. 2011, Publishing and digital libraries, Legal and organizational issues, pp. 88-110.*

(Continued)

*Primary Examiner* — Lamont Spooner
(74) *Attorney, Agent, or Firm* — Weaver Austin Villeneuve & Sampson LLP

(57) ABSTRACT

Mechanisms and methods for enabling customers to manage multi-lingual knowledge bases, so that end users can access articles based on a language the end user chooses, while also providing publishers with tools to manage articles in different languages and to translate them, either using an external vendor or leveraging in house translators, and providing administrators (knowledge managers) with the ability to setup or choose which languages are available in the knowledge base, as well as default language assignments for translations.

16 Claims, 66 Drawing Sheets

(56) References Cited

U.S. PATENT DOCUMENTS

| | | | | |
|---|---|---|---|---|
| 5,761,419 | A | 6/1998 | Schwartz et al. | |
| 5,819,038 | A | 10/1998 | Carleton et al. | |
| 5,821,937 | A | 10/1998 | Tonelli et al. | |
| 5,831,610 | A | 11/1998 | Tonelli et al. | |
| 5,873,096 | A | 2/1999 | Lim et al. | |
| 5,918,159 | A | 6/1999 | Fomukong et al. | |
| 5,963,953 | A | 10/1999 | Cram et al. | |
| 5,983,227 | A | 11/1999 | Nazem et al. | |
| 6,092,083 | A | 7/2000 | Brodersen et al. | |
| 6,161,149 | A | 12/2000 | Achacoso et al. | |
| 6,169,534 | B1 | 1/2001 | Raffel et al. | |
| 6,178,425 | B1 | 1/2001 | Brodersen et al. | |
| 6,189,011 | B1 | 2/2001 | Lim et al. | |
| 6,216,133 | B1 | 4/2001 | Masthoff | |
| 6,216,135 | B1 | 4/2001 | Brodersen et al. | |
| 6,233,617 | B1 | 5/2001 | Rothwein et al. | |
| 6,236,978 | B1 | 5/2001 | Tuzhilin | |
| 6,266,669 | B1 | 7/2001 | Brodersen et al. | |
| 6,288,717 | B1 | 9/2001 | Dunkle | |
| 6,295,530 | B1 | 9/2001 | Ritchie et al. | |
| 6,324,568 | B1 | 11/2001 | Diec et al. | |
| 6,324,693 | B1 | 11/2001 | Brodersen et al. | |
| 6,336,137 | B1 | 1/2002 | Lee et al. | |
| 6,347,316 | B1 * | 2/2002 | Redpath | |
| D454,139 | S | 3/2002 | Feldcamp | |
| 6,367,077 | B1 | 4/2002 | Brodersen et al. | |
| 6,393,605 | B1 | 5/2002 | Loomans | |
| 6,405,220 | B1 | 6/2002 | Brodersen et al. | |
| 6,411,949 | B1 | 6/2002 | Schaffer | |
| 6,434,550 | B1 | 8/2002 | Warner et al. | |
| 6,446,089 | B1 | 9/2002 | Brodersen et al. | |
| 6,490,547 | B1 * | 12/2002 | Atkin et al. | 704/8 |
| 6,535,909 | B1 | 3/2003 | Rust | |
| 6,549,908 | B1 | 4/2003 | Loomans | |
| 6,553,563 | B2 | 4/2003 | Ambrose et al. | |
| 6,560,461 | B1 | 5/2003 | Fomukong et al. | |
| 6,574,635 | B2 | 6/2003 | Stauber et al. | |
| 6,577,726 | B1 | 6/2003 | Huang et al. | |
| 6,601,087 | B1 | 7/2003 | Zhu et al. | |
| 6,604,117 | B2 | 8/2003 | Lim et al. | |
| 6,604,128 | B2 | 8/2003 | Diec | |
| 6,609,150 | B2 | 8/2003 | Lee et al. | |
| 6,621,834 | B1 | 9/2003 | Scherpbier et al. | |
| 6,632,251 | B1 * | 10/2003 | Rutten et al. | 715/205 |
| 6,654,032 | B1 | 11/2003 | Zhu et al. | |
| 6,665,648 | B2 | 12/2003 | Brodersen et al. | |
| 6,665,655 | B1 | 12/2003 | Warner et al. | |
| 6,684,438 | B2 | 2/2004 | Brodersen et al. | |
| 6,711,565 | B1 | 3/2004 | Subramaniam et al. | |
| 6,724,399 | B1 | 4/2004 | Katchour et al. | |
| 6,728,702 | B1 | 4/2004 | Subramaniam et al. | |
| 6,728,960 | B1 | 4/2004 | Loomans | |
| 6,732,095 | B1 | 5/2004 | Warshavsky et al. | |
| 6,732,100 | B1 | 5/2004 | Brodersen et al. | |
| 6,732,111 | B2 | 5/2004 | Brodersen et al. | |
| 6,754,681 | B2 | 6/2004 | Brodersen et al. | |
| 6,763,351 | B1 | 7/2004 | Subramaniam et al. | |
| 6,763,501 | B1 | 7/2004 | Zhu et al. | |
| 6,768,904 | B2 | 7/2004 | Kim | |
| 6,772,229 | B1 | 8/2004 | Achacoso et al. | |
| 6,782,383 | B2 | 8/2004 | Subramaniam et al. | |
| 6,804,330 | B1 | 10/2004 | Jones et al. | |
| 6,826,565 | B2 | 11/2004 | Ritchie et al. | |
| 6,826,582 | B1 | 11/2004 | Chatterjee et al. | |
| 6,826,745 | B2 | 11/2004 | Coker et al. | |
| 6,829,655 | B1 | 12/2004 | Huang et al. | |
| 6,842,748 | B1 | 1/2005 | Warner et al. | |
| 6,850,895 | B2 | 2/2005 | Brodersen et al. | |
| 6,850,949 | B2 | 2/2005 | Warner et al. | |
| 6,886,011 | B2 * | 4/2005 | Beauchamp | |
| 6,907,566 | B1 | 6/2005 | McElfresh et al. | |
| 7,062,502 | B1 | 6/2006 | Kesler | |
| 7,069,231 | B1 | 6/2006 | Cinarkaya et al. | |
| 7,069,497 | B1 | 6/2006 | Desai | |
| 7,100,111 | B2 | 8/2006 | McElfresh et al. | |
| 7,181,758 | B1 | 2/2007 | Chan | |
| 7,269,590 | B2 | 9/2007 | Hull et al. | |
| 7,289,976 | B2 | 10/2007 | Kihneman et al. | |
| 7,340,411 | B2 | 3/2008 | Cook | |
| 7,356,482 | B2 | 4/2008 | Frankland et al. | |
| 7,373,599 | B2 | 5/2008 | McElfresh et al. | |
| 7,401,094 | B1 | 7/2008 | Kesler | |
| 7,406,501 | B2 | 7/2008 | Szeto et al. | |
| 7,412,455 | B2 | 8/2008 | Dillon | |
| 7,454,509 | B2 | 11/2008 | Boulter et al. | |
| 7,508,789 | B2 | 3/2009 | Chan | |
| 7,599,935 | B2 | 10/2009 | La Rotonda et al. | |
| 7,603,331 | B2 | 10/2009 | Tuzhilin et al. | |
| 7,603,483 | B2 | 10/2009 | Psounis et al. | |
| 7,620,655 | B2 | 11/2009 | Larsson et al. | |
| 7,644,122 | B2 | 1/2010 | Weyer et al. | |
| 7,668,861 | B2 | 2/2010 | Steven | |
| 7,698,160 | B2 | 4/2010 | Beaven et al. | |
| 7,730,478 | B2 | 6/2010 | Weissman | |
| 7,739,351 | B2 | 6/2010 | Shkvarchuk et al. | |
| 7,747,648 | B1 | 6/2010 | Kraft et al. | |
| 7,761,288 | B2 * | 7/2010 | Parnell et al. | 704/2 |
| 7,779,039 | B2 | 8/2010 | Weissman et al. | |
| 7,779,475 | B2 | 8/2010 | Jakobson et al. | |
| 7,827,208 | B2 | 11/2010 | Bosworth et al. | |
| 7,840,413 | B2 | 11/2010 | Yoshida et al. | |
| 7,853,881 | B1 | 12/2010 | Aly Assal et al. | |
| 7,904,882 | B2 | 3/2011 | Hinks | |
| 7,945,653 | B2 | 5/2011 | Zuckerberg et al. | |
| 7,949,684 | B2 | 5/2011 | Brooks et al. | |
| 8,005,896 | B2 | 8/2011 | Cheah | |
| 8,014,943 | B2 | 9/2011 | Jakobson | |
| 8,015,495 | B2 | 9/2011 | Achacoso et al. | |
| 8,024,320 | B1 * | 9/2011 | Yehuda et al. | 707/713 |
| 8,032,297 | B2 | 10/2011 | Jakobson | |
| 8,073,850 | B1 | 12/2011 | Hubbard et al. | |
| 8,082,301 | B2 | 12/2011 | Ahlgren et al. | |
| 8,095,413 | B1 | 1/2012 | Beaven | |
| 8,095,531 | B2 | 1/2012 | Weissman et al. | |
| 8,095,594 | B2 | 1/2012 | Beaven et al. | |
| 8,103,611 | B2 | 1/2012 | Tuzhilin et al. | |
| 8,131,580 | B2 | 3/2012 | Doshi et al. | |
| 8,150,913 | B2 | 4/2012 | Cheah | |
| 8,200,476 | B2 * | 6/2012 | Butterfield et al. | 704/8 |
| 8,209,308 | B2 | 6/2012 | Rueben et al. | |
| 8,209,333 | B2 | 6/2012 | Hubbard et al. | |
| 8,244,759 | B2 | 8/2012 | Brooks et al. | |
| 8,260,849 | B2 | 9/2012 | Shkvarchuk et al. | |
| 8,266,138 | B1 | 9/2012 | Collins et al. | |
| 8,271,837 | B2 | 9/2012 | Prophete et al. | |
| 8,275,836 | B2 | 9/2012 | Beaven et al. | |
| 8,326,674 | B2 | 12/2012 | Doshi et al. | |
| 8,326,675 | B2 | 12/2012 | Doshi et al. | |
| 8,332,435 | B2 | 12/2012 | Ballard et al. | |
| 8,332,436 | B2 | 12/2012 | Ballard et al. | |
| 8,332,437 | B2 | 12/2012 | Ballard et al. | |
| 8,386,471 | B2 | 2/2013 | Collins et al. | |
| 8,407,184 | B2 | 3/2013 | Prophete et al. | |
| 8,443,085 | B2 | 5/2013 | Jensen-Horne et al. | |
| 8,457,545 | B2 | 6/2013 | Chan | |
| 8,484,111 | B2 | 7/2013 | Frankland et al. | |
| 8,490,025 | B2 | 7/2013 | Jakobson et al. | |
| 8,504,945 | B2 | 8/2013 | Jakobson et al. | |
| 8,510,045 | B2 | 8/2013 | Rueben et al. | |
| 8,510,664 | B2 | 8/2013 | Rueben et al. | |
| 8,566,301 | B2 | 10/2013 | Rueben et al. | |
| 8,646,103 | B2 | 2/2014 | Jakobson et al. | |
| 2001/0044791 | A1 | 11/2001 | Richter et al. | |
| 2002/0022986 | A1 | 2/2002 | Coker et al. | |
| 2002/0029161 | A1 | 3/2002 | Brodersen et al. | |
| 2002/0029376 | A1 | 3/2002 | Ambrose et al. | |
| 2002/0035577 | A1 | 3/2002 | Brodersen et al. | |
| 2002/0042264 | A1 | 4/2002 | Kim | |
| 2002/0042843 | A1 | 4/2002 | Diec | |
| 2002/0072951 | A1 | 6/2002 | Lee et al. | |
| 2002/0082892 | A1 | 6/2002 | Raffel et al. | |
| 2002/0111967 | A1 * | 8/2002 | Nagase | 707/513 |
| 2002/0129352 | A1 | 9/2002 | Brodersen et al. | |
| 2002/0140731 | A1 | 10/2002 | Subramaniam et al. | |

(56) References Cited

U.S. PATENT DOCUMENTS

| | | | |
|---|---|---|---|
| 2002/0143997 | A1 | 10/2002 | Huang et al. |
| 2002/0152102 | A1 | 10/2002 | Brodersen et al. |
| 2002/0161734 | A1 | 10/2002 | Stauber et al. |
| 2002/0162090 | A1* | 10/2002 | Parnell et al. ................. 717/120 |
| 2002/0165742 | A1 | 11/2002 | Robins |
| 2003/0004971 | A1 | 1/2003 | Gong et al. |
| 2003/0018705 | A1 | 1/2003 | Chen et al. |
| 2003/0018830 | A1 | 1/2003 | Chen et al. |
| 2003/0066031 | A1 | 4/2003 | Laane |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker |
| 2003/0088545 | A1 | 5/2003 | Subramaniam et al. |
| 2003/0120675 | A1 | 6/2003 | Stauber et al. |
| 2003/0140316 | A1* | 7/2003 | Lakritz ......................... 715/536 |
| 2003/0151633 | A1 | 8/2003 | George et al. |
| 2003/0159136 | A1 | 8/2003 | Huang et al. |
| 2003/0187921 | A1 | 10/2003 | Diec |
| 2003/0189600 | A1 | 10/2003 | Gune et al. |
| 2003/0191743 | A1 | 10/2003 | Brodersen et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193398 | A1* | 9/2004 | Chu et al. .......................... 704/3 |
| 2004/0193510 | A1 | 9/2004 | Catahan, Jr. et al. |
| 2004/0199489 | A1 | 10/2004 | Barnes-Leon et al. |
| 2004/0199536 | A1 | 10/2004 | Barnes Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2005/0177358 | A1* | 8/2005 | Melomed et al. ................. 704/2 |
| 2005/0197827 | A1* | 9/2005 | Ross et al. ........................ 704/2 |
| 2005/0246156 | A1* | 11/2005 | Scanlan ........................... 704/2 |
| 2006/0200766 | A1* | 9/2006 | Lakritz ......................... 715/536 |
| 2007/0088741 | A1 | 4/2007 | Brooks et al. |
| 2007/0233456 | A1* | 10/2007 | Kim ................................. 704/2 |
| 2008/0082572 | A1 | 4/2008 | Ballard et al. |
| 2008/0086358 | A1 | 4/2008 | Doshi et al. |
| 2008/0249972 | A1 | 10/2008 | Dillon |
| 2008/0281578 | A1* | 11/2008 | Kumaran et al. ................. 704/2 |
| 2008/0281610 | A1 | 11/2008 | Yoshida et al. |
| 2009/0063415 | A1 | 3/2009 | Chatfield et al. |
| 2009/0100342 | A1 | 4/2009 | Jakobson |
| 2009/0177744 | A1 | 7/2009 | Marlow et al. |
| 2009/0287471 | A1* | 11/2009 | Bennett ............................. 704/3 |
| 2009/0287473 | A1* | 11/2009 | Bull et al. ......................... 704/8 |
| 2010/0030550 | A1* | 2/2010 | Travieso et al. .................. 704/7 |
| 2010/0174525 | A1* | 7/2010 | Travieso et al. .................. 704/7 |
| 2010/0223100 | A1 | 9/2010 | Lee et al. |
| 2010/0223284 | A1 | 9/2010 | Brooks et al. |
| 2010/0223301 | A1 | 9/2010 | Shkvarchuk et al. |
| 2011/0078213 | A1 | 3/2011 | Bezar et al. |
| 2011/0106808 | A1 | 5/2011 | Hersans et al. |
| 2011/0113057 | A1 | 5/2011 | Lee et al. |
| 2011/0113058 | A1 | 5/2011 | Lee et al. |
| 2011/0113059 | A1 | 5/2011 | Lee et al. |
| 2011/0113071 | A1 | 5/2011 | Lee et al. |
| 2011/0113072 | A1 | 5/2011 | Lee et al. |
| 2011/0137940 | A1 | 6/2011 | Gradin et al. |
| 2011/0161444 | A1 | 6/2011 | Chauhan |
| 2011/0196883 | A1 | 8/2011 | Brooks et al. |
| 2011/0202508 | A1 | 8/2011 | Brooks et al. |
| 2011/0202911 | A1 | 8/2011 | Brooks et al. |
| 2011/0218958 | A1 | 9/2011 | Warshavsky et al. |
| 2011/0219338 | A1 | 9/2011 | Schneider |
| 2011/0224973 | A1 | 9/2011 | Tamm et al. |
| 2011/0225119 | A1 | 9/2011 | Wong et al. |
| 2011/0225232 | A1 | 9/2011 | Casalaina et al. |
| 2011/0225233 | A1 | 9/2011 | Casalaina et al. |
| 2011/0225495 | A1 | 9/2011 | Casalaina et al. |
| 2011/0225500 | A1 | 9/2011 | Casalaina et al. |
| 2011/0225506 | A1 | 9/2011 | Casalaina et al. |
| 2011/0231181 | A1* | 9/2011 | Furuuchi et al. .................. 704/7 |
| 2011/0238707 | A1 | 9/2011 | Wong et al. |
| 2011/0247051 | A1 | 10/2011 | Bulumulla et al. |
| 2011/0264861 | A1 | 10/2011 | Fee et al. |
| 2011/0265066 | A1 | 10/2011 | Fee et al. |
| 2011/0265069 | A1 | 10/2011 | Fee et al. |
| 2011/0274258 | A1 | 11/2011 | Casalaina et al. |
| 2011/0274261 | A1 | 11/2011 | Casalaina et al. |
| 2011/0276535 | A1 | 11/2011 | Pin et al. |
| 2011/0276601 | A1 | 11/2011 | Pin et al. |
| 2011/0276945 | A1 | 11/2011 | Chasman et al. |
| 2011/0282847 | A1 | 11/2011 | Collins et al. |
| 2011/0282908 | A1 | 11/2011 | Fly et al. |
| 2011/0283266 | A1 | 11/2011 | Gallagher et al. |
| 2011/0283356 | A1 | 11/2011 | Fly et al. |
| 2011/0295838 | A1 | 12/2011 | Collins et al. |
| 2011/0295839 | A1 | 12/2011 | Collins et al. |
| 2011/0296298 | A1 | 12/2011 | Ahuja et al. |
| 2011/0296413 | A1 | 12/2011 | Wood et al. |
| 2011/0302098 | A1 | 12/2011 | Yoshida et al. |
| 2011/0302135 | A1 | 12/2011 | Prophete et al. |
| 2011/0302454 | A1 | 12/2011 | Prophete et al. |
| 2011/0302479 | A1 | 12/2011 | Movida et al. |
| 2011/0307510 | A1 | 12/2011 | Lopitaux et al. |
| 2011/0314373 | A1 | 12/2011 | Prophete et al. |
| 2012/0005537 | A1 | 1/2012 | Chen et al. |
| 2012/0016621 | A1 | 1/2012 | Tan et al. |
| 2012/0042218 | A1 | 2/2012 | Cinarkaya et al. |
| 2012/0042383 | A1 | 2/2012 | Greene et al. |
| 2012/0042384 | A1 | 2/2012 | Badhwar et al. |
| 2012/0046934 | A1* | 2/2012 | Cheng et al. ...................... 704/3 |
| 2012/0054241 | A1 | 3/2012 | Brooks et al. |
| 2012/0054328 | A1 | 3/2012 | Brooks et al. |
| 2012/0054632 | A1 | 3/2012 | Ballard et al. |
| 2012/0054633 | A1 | 3/2012 | Ballard et al. |
| 2012/0059807 | A1 | 3/2012 | Brooks et al. |
| 2012/0059862 | A1 | 3/2012 | Brooks et al. |
| 2012/0078917 | A1 | 3/2012 | Gradin et al. |
| 2012/0078981 | A1 | 3/2012 | Gradin et al. |
| 2012/0079004 | A1 | 3/2012 | Herman |
| 2012/0079038 | A1 | 3/2012 | Hersh |
| 2012/0084266 | A1 | 4/2012 | Brooks et al. |
| 2012/0086544 | A1 | 4/2012 | Kemp |
| 2012/0089610 | A1 | 4/2012 | Agrawal et al. |
| 2012/0096046 | A1 | 4/2012 | Kucera |
| 2012/0101985 | A1 | 4/2012 | Kemp et al. |
| 2012/0102063 | A1 | 4/2012 | Kemp et al. |
| 2012/0102114 | A1 | 4/2012 | Dunn et al. |
| 2012/0102153 | A1 | 4/2012 | Kemp et al. |
| 2012/0102402 | A1 | 4/2012 | Kwong |
| 2012/0102420 | A1 | 4/2012 | Fukahori |
| 2012/0117013 | A1 | 5/2012 | Doshi et al. |
| 2012/0117014 | A1 | 5/2012 | Doshi et al. |
| 2012/0130973 | A1 | 5/2012 | Tamm et al. |
| 2012/0143817 | A1 | 6/2012 | Prabaker et al. |
| 2012/0143917 | A1 | 6/2012 | Prabaker et al. |
| 2012/0144374 | A1 | 6/2012 | Gallagher et al. |
| 2012/0221319 | A1* | 8/2012 | Trese ................................ 704/2 |
| 2012/0223951 | A1 | 9/2012 | Dunn et al. |
| 2012/0233137 | A1 | 9/2012 | Jakobson et al. |
| 2012/0239629 | A1 | 9/2012 | Brooks et al. |
| 2012/0246120 | A1 | 9/2012 | Brooks et al. |
| 2012/0260191 | A1 | 10/2012 | Ballard et al. |
| 2012/0290407 | A1 | 11/2012 | Hubbard et al. |
| 2012/0303698 | A1 | 11/2012 | Shkvarchuk et al. |
| 2012/0304014 | A1 | 11/2012 | Prophete et al. |
| 2012/0317146 | A1 | 12/2012 | Brooks et al. |
| 2012/0317495 | A1 | 12/2012 | Ballard et al. |
| 2012/0330644 | A1 | 12/2012 | Giraudy et al. |

(56) References Cited

U.S. PATENT DOCUMENTS

| | | | |
|---|---|---|---|
| 2012/0331053 | A1 | 12/2012 | Dunn |
| 2013/0007148 | A1 | 1/2013 | Olsen |
| 2013/0018869 | A1 | 1/2013 | Hanson et al. |
| 2013/0018955 | A1 | 1/2013 | Thaxton et al. |
| 2013/0021370 | A1 | 1/2013 | Dunn et al. |
| 2013/0024454 | A1 | 1/2013 | Dunn |
| 2013/0024511 | A1 | 1/2013 | Dunn et al. |
| 2013/0024788 | A1 | 1/2013 | Olsen et al. |
| 2013/0024910 | A1 | 1/2013 | Verma et al. |
| 2013/0031172 | A1 | 1/2013 | Olsen et al. |
| 2013/0031487 | A1 | 1/2013 | Olsen et al. |
| 2013/0041718 | A1 | 2/2013 | Doshi et al. |
| 2013/0054517 | A1 | 2/2013 | Beechuk et al. |
| 2013/0054714 | A1 | 2/2013 | Bedi |
| 2013/0060859 | A1 | 3/2013 | Olsen et al. |
| 2013/0061156 | A1 | 3/2013 | Olsen et al. |
| 2013/0066680 | A1 | 3/2013 | Doshi et al. |
| 2013/0091149 | A1 | 4/2013 | Dunn et al. |
| 2013/0091217 | A1 | 4/2013 | Schneider |
| 2013/0091229 | A1 | 4/2013 | Dunn et al. |
| 2013/0097253 | A1 | 4/2013 | Mencke |
| 2013/0097540 | A1 | 4/2013 | Ballard et al. |
| 2013/0117353 | A1 | 5/2013 | Wong et al. |
| 2013/0132861 | A1 | 5/2013 | Kienzle et al. |
| 2013/0151231 | A1 | 6/2013 | Giraudy et al. |
| 2013/0212497 | A1 | 8/2013 | Zelenko et al. |
| 2013/0218948 | A1 | 8/2013 | Jakobson |
| 2013/0218949 | A1 | 8/2013 | Jakobson |
| 2013/0218966 | A1 | 8/2013 | Jakobson |
| 2013/0247216 | A1 | 9/2013 | Cinarkaya et al. |
| 2014/0359537 | A1 | 12/2014 | Jakobson et al. |
| 2015/0006289 | A1 | 1/2015 | Jakobson et al. |
| 2015/0007050 | A1 | 1/2015 | Jakobson et al. |
| 2015/0095162 | A1 | 4/2015 | Jakobson et al. |
| 2015/0142596 | A1 | 5/2015 | Jakobson et al. |

FOREIGN PATENT DOCUMENTS

| | | | |
|---|---|---|---|
| WO | WO/2012/048092 | A2 | 4/2012 |
| WO | WO/2012/054309 | A1 | 4/2012 |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

U.S. Office Action dated May 5, 2014 issued in U.S. Appl. No. 13/272,015.

* cited by examiner

EMAIL

*The article "First 3 Months Free" has been sent for translation in the following languages:*

*- Chinese (Simplified)*

*- French*

*- Spanish*

*These translations are assigned to the Articles for Export queue.*

*To view translations, go to the Draft Translations view*

*To export articles for translation, go to Setup | Data Management | Export Articles for Translation*

*NOTE: Only users with the Manage Knowledge permission can import and export articles*

*You have received similar emails for articles "Customer's Special" and "Go Abroad"*

ARTICLE EDIT PAGE

1102

MULTI-LINGUAL KNOWLEDGE BASE

PRIORITY CLAIM

This application is a continuation-in-part of U.S. patent application Ser. No. 13/272,015, entitled "MULTI-LINGUAL KNOWLEDGE BASE," by Etienne Giraudy, filed on Oct. 12, 2011; which, in turn, claims priority benefit of U.S. Provisional Patent Application 61/499,878, entitled "MULTI-LINGUAL KNOWLEDGE BASE," by Etienne Giraudy, filed on Jun. 22, 2011, and the entire contents of both are incorporated herein by reference.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 13/272,015, entitled "MULTI-LINGUAL KNOWLEDGE BASE," by Etienne Giraudy, filed on Oct. 12, 2011;

U.S. Provisional Patent Application 61/499,878, entitled "MULTI-LINGUAL KNOWLEDGE BASE," by Etienne Giraudy, filed on Jun. 22, 2011, and the entire contents of both are incorporated herein by reference;

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to managing a knowledge base in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A community, also commonly referred to as a forum, web forum, and community website, is a group of users that share a common interest and tend to communicate with one another about that common interest. A community website is a website in which users share ideas that are related to the community. Forum content may be used to refer to a question or questions and answers discussed in a forum. Traditional forums have focused on providing a meeting place for a virtual community of Internet users who share common interest.

The widespread use of the Internet, which crosses national and cultural boundaries, as well as the globalization of business opportunities has presented the need to provide information in various languages, as well as targeting information to specific groups. Accordingly, it is desirable to provide techniques for managing a multi-lingual knowledge base in a database network system.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
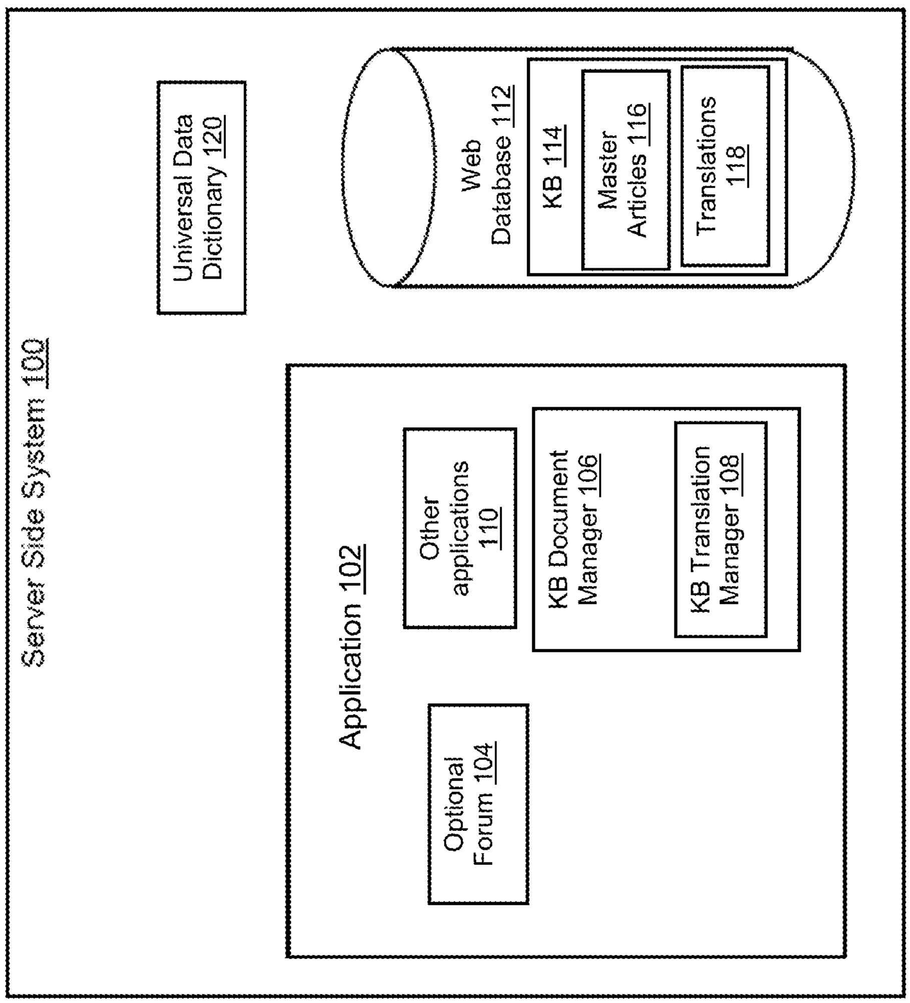
FIG. 1 shows a block diagram of an embodiment of a server system.

Systems and methods are provided for managing a multi-lingual knowledge base in a database network system.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

As used herein, the term multi-tenant database system refers to a database system that has multiple tenants that each has a degree of access to at least a portion of the database system that may or may not be the same as the degree of access as other tenants. Each tenant may be an individual or an organization that may have representatives, members, employees, customers and/or other entities associated with the tenant, which in turn, as a result of the tenancy of the tenant in the multitenant database, may also have different degrees of access to the database. The degree of access granted to those associated with the tenant and/or which entities (e.g., representatives, members, employees, customers and/or other entities) are associated with the tenant may be determined by the tenant. The database system may include multiple databases, and each database may be partitioned and/or otherwise shared amongst multiple tenants. The multitenant database may be provided on demand, that is as a service to the tenants, so that the tenants have use of the multitenant database for their own purposes that determined by the tenants, but the tenants do not need to worry about the maintaining the database, the operations of the database, or how the database works.

A community, also commonly referred to as a forum, web forum, and community website, is a group of users that share a common interest and tend to communicate with one another about that common interest. A community website is a website in which users share ideas that are related to the community. The focus of the communities may be enterprise communities, which are communities structured around a business' ecosystem: partners, customers, vendors, employees, etc.

Forum content may be used to refer to a question or questions and answers discussed in a forum. The forum contents may reside in a database. The forum may include various features and/or tools that are available to users and/or administrators. Some content may be placed initially on the forum at the launch of the website, which gives an initial significant value to the website that may be linearly proportional to the number of users that are able to view the content and that are expected to be interested in the content. Enabling user interaction with one another, via the posting of new ideas, the commenting on ideas, and/or participating in discussions causes the value of the website to increase in the community.

Traditional forums have focused on providing a meeting place for a virtual community of Internet users who share common interest. However, forums may also be used for lowering costs in a business context by providing a cheaper avenue for customer service. Instead of calling into a call center where a human agent takes calls and answers questions, forums may provide a more scalable method where customers may help each other answer their own questions.

Generally, forums serve a similar function to customer support. However, there are questions that may come into a forum that may need to be escalated to a customer support agent for a variety of reasons. A few examples of such cases may be the importance of the issue, the severity of the customer's problem alluded to in the question, a question unanswered by the community, and/or the value of the customer, among other reasons. Questions and issues in a forum that are deemed to be of widespread interest to a community, or are frequently encountered may be turned into an article. A collection of articles may be grouped together to form a knowledge base.

Embodiments provide multilingual capabilities to knowledge base (KB) applications, including the ability to create and publish translations of pre-existing knowledge articles by internal users and/or external translation vendors.

Embodiments enable tenants to manage multi-lingual knowledge bases, so that end users may access articles based on a language the end user chooses, while also providing publishers (e.g., tenants) with tools to manage articles in different languages and to translate the articles. In an embodiment, the tenant either using an external vendor or an in house translators, and providing administrators (knowledge managers) with the ability to setup or choose which languages are available in a KB, as well as default language assignments for translations.

In at least one embodiment, end users may be categorized into three groups—employees, portal users, and web users, with each group presented with different capabilities in the multi-lingual knowledge base.

Employees, who are members of an organization that is a tenant in a multi-tenant database, may interactively select the language that is being used to search the knowledge base using a language selector in an article tab of a user interface (UI), which will be explained and illustrated in greater detail below. Under an article tab, employees may have an extra drop-down menu in a filter section that lists the available languages in which knowledge articles may be configured in. In at least one embodiment, by default the language selected for an article from the knowledge base is the UI language of a user if the UI language is supported by the knowledge base. If the UI language is not supported, then a different default Knowledge language may be selected. In at least one embodiment, the language drop/down control is not sticky, meaning that each time the user goes to a new article under the article tab, the language value is reset to the default one rather than being kept set to the last language chosen. When a user changes the language value, the UI language does not change, only the article language changes.

For example, a multi-tenant application is configured to display articles in three languages: French, English (as default), and Spanish, while a user's UI language is French. In the present example, when the user opens the article tab, the language selected is French since the UI is in French, and the articles are also displayed in French. If the user changes the language value to English under the article tab, the UI stays in French, but articles are then displayed in English. Furthermore, in the article display page, the user may be able to switch to other language versions of the article (if other language versions are available) through a drop-down list selector. Again, switching languages may only change the language of the articles, the language of the UI stays in the UI language of the user.

Portal users may use the multi-lingual knowledge base in the language matching their UI language (defaulting to the KB default language if the language of the UI is not supported by knowledge base). The same features that were described above for employees may also be available for portal users (customer portal/partner portal)

Available language access for Web users, also referred to as public knowledge base (PKB) users or anonymous users, who are not affiliated with the tenant organization (but for example may visit the tenant's website and/or participate in the tenant's forum discussion), may depend on the implementation of embodiments, where the language choices may range from a different PKB per language to a (cookie based) persistent language selection using a language selector. In at least one embodiment, users may be able to pick languages for article display with a drop down menu on the user's UI.

Knowledgebase publishers may be categorized into one of several categories, such as knowledge managers, simple contributors, translation managers, and translators. It is noted that additional categories may be implemented as required and/or in other embodiments. Contributors may be able to work (contribute content) on mono-lingual articles (the master language version) with the possibility to define the language of the article. Knowledge managers may have the same responsibilities as a mono-lingual contributor of knowledge, but also may be responsible for requesting translations of selected articles. Some knowledge managers or in an embodiment each knowledge manager may only decide whether to request a translation to a specific language or set of languages, and in another embodiment or other knowledge manages may be able to select from any available language into which to request translations. Translation managers may be able to export articles to be translated by a vendor, and then later the translation manager may import the new translations into the KB. Translators are users able to translate articles into other language(s).

In at least one implementation of the multi-lingual knowledge base, knowledge managers (administrators) may be able to easily add/remove languages that are supported in the KB when multi-lingual feature is enabled. Knowledge managers may also be able to select a default language and default assignments for translations that are requested—these assignments may determine if translations are done outside of the application or whether to use an in house translator (e.g., human) for translating the article.

In embodiments, discrepancy alerts, may be provided to notify users of out of sync processes. For example, if a modification needs to be made on a master article while the master article is in the process of being translated (in the application or outside the application), the mechanisms ensure that the user who is modifying the source article knows that one or more translations are in progress on the master article. The mechanism also provides users who save a source (master) article with a means to indicate if the changes made to the source article have an impact on any translations that may be associated with the source article. Translations that are associated with a source article undergoing changes are given a discrepancy alert.

In embodiments, an import feature may import and/or export a zip file as input. The zip file may contain translated articles. The user may have the option to choose to automatically publish the translations. If the master version is already published, a translation may then be automatically published, or if the master version has not been published, the import files may be marked as ready for publication. The user may also have the option to choose to re-assign translations to a different queue (or optionally, a different user) in a "translations to be reviewed" queue. Import (similar to export), may be asynchronous in the system for managing a multi-lingual knowledge base, allowing the user to perform other activities while waiting for the import to occur. In an embodiment, when the user imports (or exports) a document, an import task may be created and queued in the message queue, and the message queue is used for processing tasks that are not required to be performed in real-time, allowing other tasks to be performed while the import is being performed.

Next, mechanisms and methods for utilizing objects (which may be created using a Unified Data Dictionary (UDD) for modeling the objects) for managing a multi-lingual knowledge base will be described with reference to example embodiments. In this specification metadata refers to the information about the data in the multi-tenant database system. Metadata describes the characteristics of the data objects such as the type, the name, and the size of the data. Metadata may also contain information about the data table as such as the length of fields, the number of columns and other information. Metadata may include the relationship of the data objects. Metadata may help in understanding and interpreting the contents of a database system.

FIG. 1 shows an embodiment of a server side system 100 in an on-demand database system. In an embodiment, the server side system 100 may host, application server 102, optional forum 104, knowledge base (KB) document manager 106, knowledge base translation manager 108, other applications 110, database 112, knowledge base 114, master articles 116, translations 118, and Unified Data Dictionary (UDD) 120. In other embodiments server side system 100 may not have all of the elements or features listed and/or may have other elements or features instead of or in addition to those listed.

Server side system 100 may be part of an on demand multi-tenant database system. In this specification, the names of objects, pointers, and variables are chosen to describe the function and/or purpose of the object, pointer or variable. The specification is not limited to the specific objects, variables or pointers mentioned, but any combination of objects, variables, or pointers that will accomplish the same or a similar purpose may be substituted for the specific object, pointer or variable mentioned.

In an embodiment in a multi-tenant database system, application server 102 sends data and other messages (e.g., output from application programming interface (API) routines called by the user system) to user systems, retrieves data and other information for users, receives messages (e.g., the results of interacting with data and/or functions calls to API functions from users. User system is described further in conjunction with FIG. 18, below). Application server 102 also serves as a platform that hosts optional forums 104, knowledge base document manager, KB translation manager, and other applications. Optional forums 104 is an application for carrying out discussions, such as by forum members posting questions and answers. As described earlier, a forum, which may also be referred to as a community, web forum, and community website, is a group of users that share a common interest and tend to communicate with one another about that common interest. A community website is a website in which users share ideas that are related to the community. In an embodiment, the content of some of the discussion in the forum may be stored in the knowledge base in a searchable form for others to benefit from. Knowledge base document manager 106 serves to organize and access articles in the knowledge base. Knowledge base translation manager

108 controls the translation of articles in the knowledge base, and other multilingual features of embodiments disclosed herein. Knowledge base document manager 106 and the knowledge base translation manager 108 determine whether the state of the article and whether the article should be in a queue, with the user, online, in an archive, or is a draft. Other applications 110 may include applications required to perform database operations and one or more instructions that cause a processor to render a webpage. Rendering the webpage may involve performing computations, such as retrieving information, which may be in response to the user input. Database 112 may include the contents of forum 104. Database 112 may contain content from the forums may be organized into articles that serve as a basis for a knowledge base. Database 112 may store a knowledge base that is organized by knowledge base document manager 106.

Database 112 may be a multi-tenant relational database having different portions dedicated to different tenants. Application server 102 may access database 112 to store information received from the user system or may receive a messages that triggers a query for information stored in database 112. Database 112 may include a database server and a database. Application server 102, as a result of a message form a user triggering a query, may also retrieve information from database 112 requested by the tenant. Users, such as developers, may access database 112, via applications server 102 in order to test and/or add/modify features to database 112.

Knowledge base 114 is a collection of articles that are written to address problems and issues that may have a high interest and/or that are expected to be of interest to the community of users that interact with the tenant. Master articles 116 are the master versions of articles. Master articles 116 are written in a particular language, which is the original language of the article. Translations 118 are translated versions of the master articles 116. Translations 118 may be made available to users, via knowledge base 114. UDD 120 is a library of templates of objects that are used for creating common type of objects. UDD 120 stores data object definitions of a variety of types of objects, and another application (e.g., a companion application) creates the actual objects from the data object definitions. A data object definition is included in the UDD 120 from which new KAs and new knowledge article versions (KAVs) may be constructed.

Figure 2:
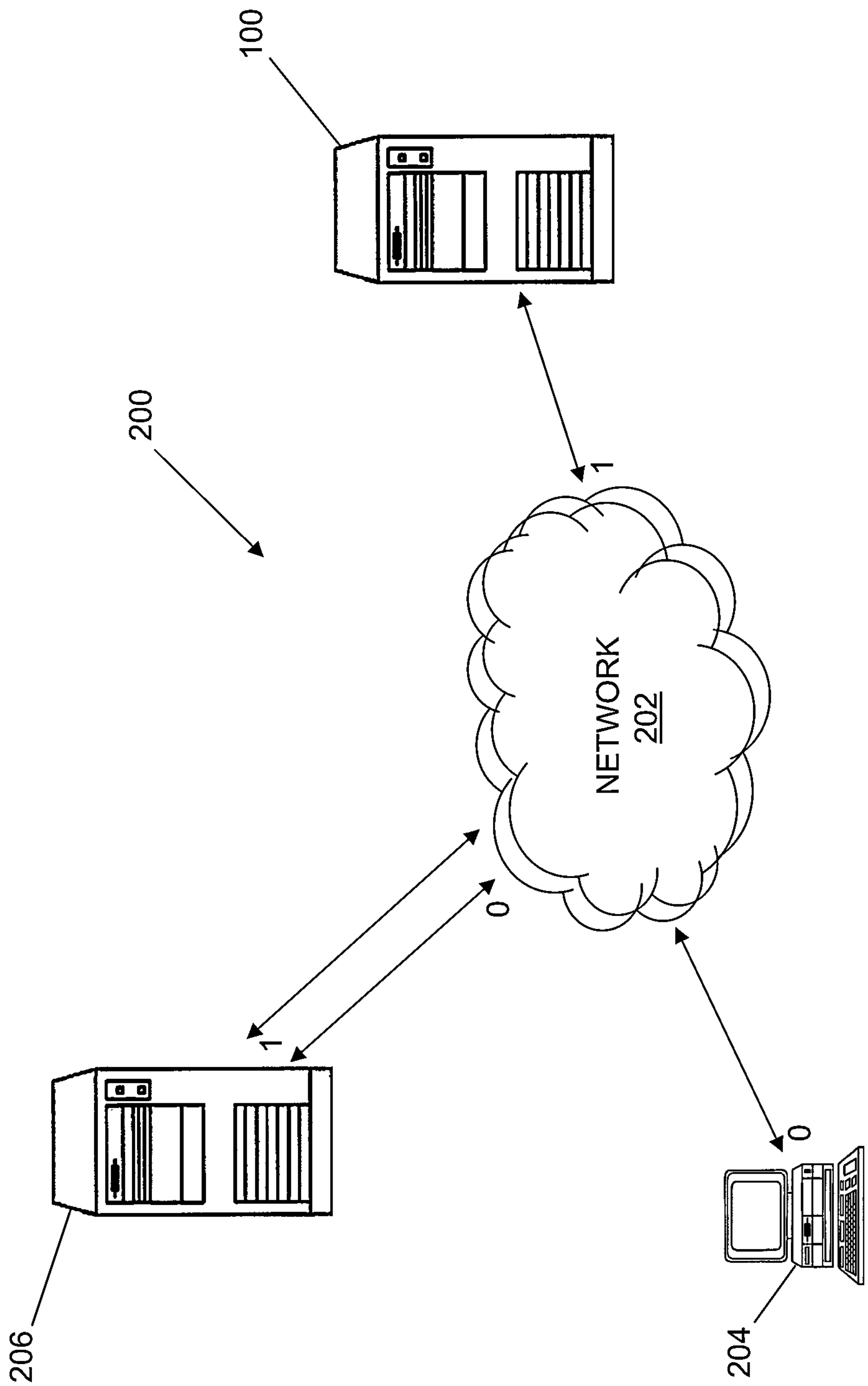
FIG. 2 shows a block diagram of an embodiment of a network system with a user interacting with a tenant server in contact the multi-tenant database system hosted on the server of FIG. 1.

FIG. 2 shows a block diagram of an embodiment of a network system 200. In an embodiment network system 200 may have network 202, user system 204, tenant server 206, and server 100. In other embodiments network system 200 may not have all of the elements or features listed and/or may have other elements or features instead of or in addition to those listed.

Figure 18:
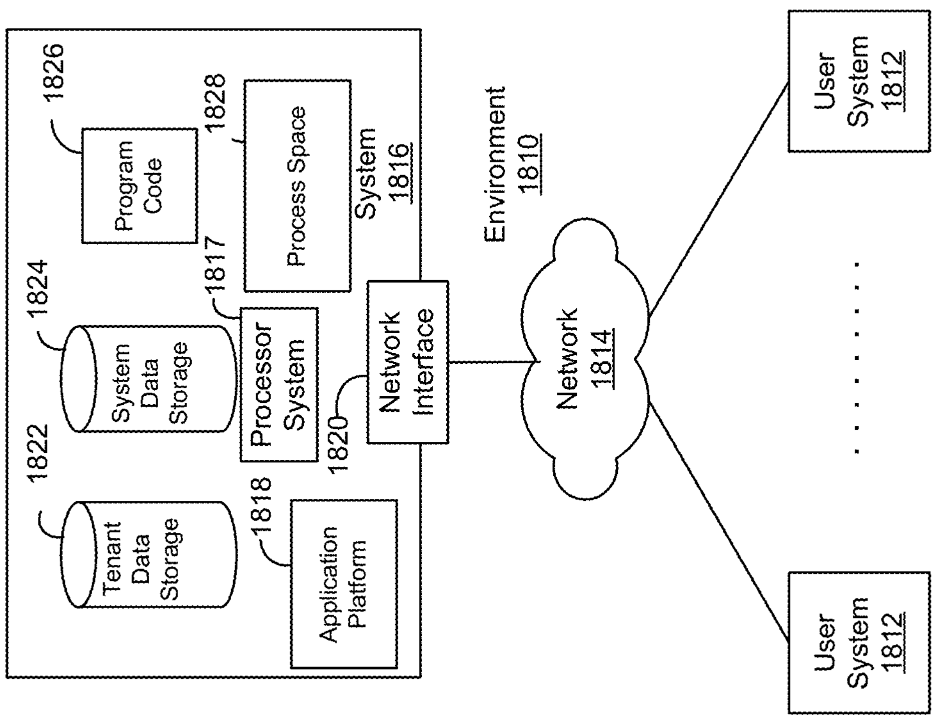
FIG. 18 shows a block diagram of an embodiment of an environment where in an on-demand database service might be used for methods and systems for managing multiple language articles within a knowledge base may operate.

In an embodiment, user system 204 (which will be discussed further in conjunction with FIG. 18) may be any machine or system that may be used by a user to access a network or a server system (discussed further in conjunction with FIG. 18). Network 202 (further discussed in conjunction with FIG. 18) may be any network or combination of networks of devices that communicate with one another. Depending on the access level granted, user system 204 may interact, via network 202, with tenant server 206 and a multi-tenant database system hosted on the server 100 of FIG. 1, which will be described further in conjunction with FIG. 18. Tenant server 206 may belong to an organization or company that is a tenant in the multi-tenant database hosted on server 100. Server 100 may host a multi-tenant database that may have a knowledge base with multi-lingual articles.

As described in FIG. 2, a user system 204 (representing a customer of the organization or company) may interact with tenant server 206, via network 202, to inquire about product information or product support as denoted by bidirectional arrows 0. In response to the customer inquiry, the tenant server 206 may contact server 100 via network 202 as denoted by bidirectional arrows 1 to access a knowledge base stored on server 100. The tenant server 206 may then communicate with the server 100 on behalf of the customer, so that the customer may access knowledge base 114, via the tenant server.

Figure 3:
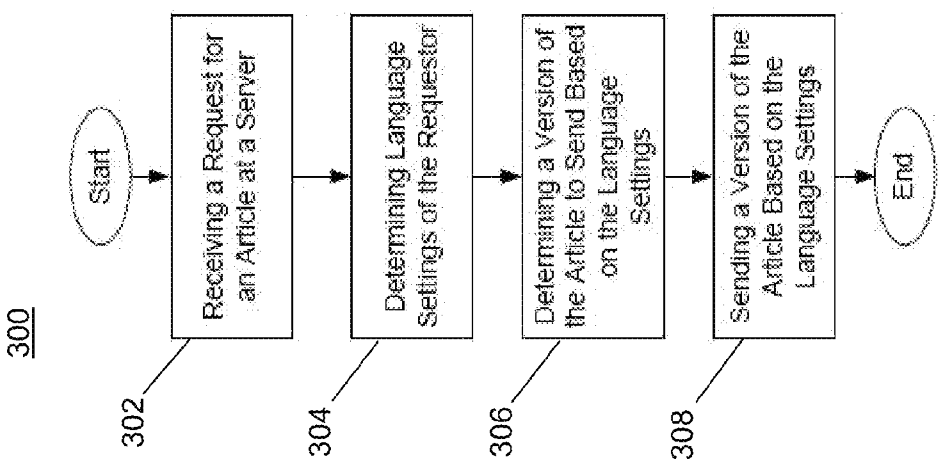
FIG. 3 shows a flowchart of an embodiment of a server side method for providing multi-lingual versions of knowledge base articles in a multi-tenant database system.

Server Side Method for Providing Multi-Lingual Versions of Knowledge Base Articles FIG. 3 shows a flowchart of an embodiment of a server side method 300 for providing multi-lingual versions of knowledge base articles in a multi-tenant database system. In step 302, the server receives a request from a user system for an article from a knowledge base stored on the server (server and user system will be discussed further in conjunction with FIG. 18). In step 304, a knowledge base manager on the server may determine the language settings of the requestor, for example through the language settings of the requestor's UI or browser. In step 306, the knowledge base manager may determine which language version of the article to send the requestor based on the language settings of the requestor. In step 308, the knowledge base manager of the server sends the appropriate language version of the requested article based on the language settings. If the language version of the article is not available, then the default master language article is sent.

In an embodiment, each of the steps of method 300 may be a distinct step. In other embodiments, method 300 may not have all of the above steps and/or may have other steps in addition to or instead of those listed above. The steps of method 300 may be performed in another order. Subsets of the steps listed above as part of method 300 may be used to form their own method. In an embodiment, there could be multiple instances of method 300.

Client Side Method of Interacting with the Multilinigual Knowledge Base

Figure 4:
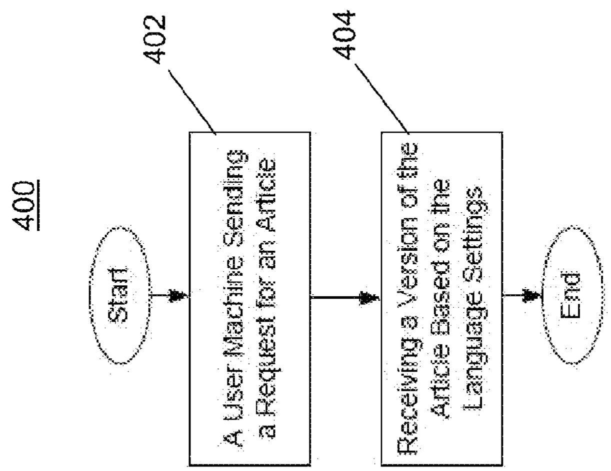
FIG. 4 shows a flowchart of an embodiment of a client side method for interacting with a multi-lingual knowledge base in a multi-tenant database system.

FIG. 4 shows a flowchart of an embodiment of a client side method 400 for interacting with a multi-lingual knowledge base in a multi-tenant database system.

In step 402, the client side user device (discussed in conjunction with FIG. 18) sends a request to the server for an article. The user request may be initiated through a page (e.g. a webpage or other page) with an input form or link to articles in the knowledge database. In step 404, the user system receives a language version of the requested article from the server system based on the user's language settings and the availability of translations in the knowledge base.

In an embodiment, each of the steps of method 400 may be a distinct step. In other embodiments, method 400 may not have all of the above steps and/or may have other steps in addition to or instead of those listed above. The steps of method 400 may be performed in another order. Subsets of the steps listed above as part of method 400 may be used to form their own method. In an embodiment, there may be multiple instances of method 400.

Figure 5:
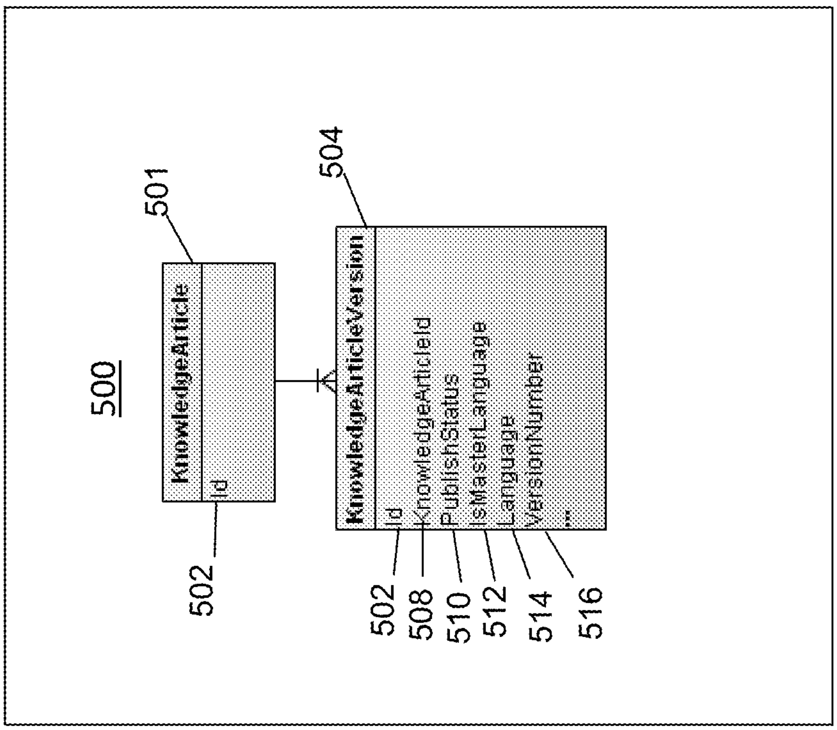
FIG. 5 shows a representation of an embodiment of articles modeled through two main unified data dictionary entities KnowledgeArticle (KA) and KnowledgeArticleVersion (KAV)

FIG. 5 shows an entity relationship diagram 500 for knowledge articles, which may be a portion of a database schema. Entity relationship diagram 500 diagram may include KnowledgeArticle 501, and KnowledgeArticle 501 may have Id 502. Entity relationship diagram 500 may also include KAV 504, which is a programming object (or table) having columns for KnowledgeArticleId 508, PublishStatus 510, IsMasterLanguage 512, Language 514, and VersionNumber 516. In other embodiments entity relationship diagram 500 may not have all of the elements or features listed and/or may have other elements or features instead of or in addition to those listed.

KnowledgeArticle 501 may be a table or object for knowledge articles. KnowledgeArticle 501 may be a table that lists all of the knowledge articles, and may include. Id 502 of Knowledge article 501 is an identification of an article to distinguish a given article from other articles in a knowledge base. Each article, from a knowledge base, may have a single KA row (or attribute) in the KA table (or object), KnowledgeArticle 501 of the database, where the row represents the article as a whole. The KA row may provide the article with a stable Id 502 and with a stable life span. The life span is of the whole article including all of the article's versions. In an embodiment, KA 502 is a primary key of KnowledgeArticle 501. Although KnowledgeArticle 501 is indicated as only having the attribute Id 502, KnowledgeArticle 501 may have other attributes. In at least one embodiment, articles in a knowledge base are modeled through two main unified data dictionary (UDD) entities—one UDD entity corresponding to KnowledgeArticle (KA) 501 and one UDD entity corresponding to KnowledgeArticleVersion (KAV) having KAV table 504) as shown in FIG. 5.

In embodiments, a KAV 504 is a child of KA 501 representing a specific article. A particular knowledge article in KA 501 may have a particular ID, which may be the same as the ID of a particular KAV table, KAV 504. KAV table (KAV 504) may also include columns for KnowledgeArticleId 508, PublishStatus 510, IsMasterLanguage 512, Language 514, and VersionNumber 516. In other embodiments KAV 504 may not have all of the elements or features listed and/or may have other elements or features instead of or in addition to those listed.

The KAV 504 is the version that contains the actual content of the article. An article version may be either "Draft," "Online" or "Archived" as defined by the KAV.PublishStatus field. KnowledgeArticleId 508 identifies the knowledge article. In an embodiment, Id 502 has the same KnowledgeArticleId 508 value and may be a common key via which information in the tables may be joined to form various views. PublishStatus 510 indicates whether an article has been published and available for viewing and/or may indicate the state within a state machine of an article, which may includes states, such as editing, archived, and/or published, for example. As an aside (and as explained elsewhere), during the editing state the article is in the draft state (and there may be two versions of the article), and when the article is in published state, the article is published the article is online and available for viewing to the general public. IsMasterLanguage 512 indicates whether the article is in the master or originally authored language. The Language 514 is the language the article version is in. VersionNumber 516 identifies which version of the article is being accessed.

When an article is first created, in addition to the KA row in the KA table of the database, a KAV row is also created as the first draft version in the KAV table 504. The first draft version may only be accessible to publishers, who have Manage Knowledge profile permission, also referred to as a knowledge manager. Once the knowledge manager has finished writing the content of the article, the knowledge manager may publish the draft article, which may make the article become online as indicated by its KAV.PublishStatus field. An article version that is online may be seen by users that have read-only access to the knowledge base (such as agents, portal users, etc.). If at a later time an article needs to be changed or updated, a knowledge manager (or "publisher") may create a new draft version from the existing online version, while still leaving the online version accessible. Once an article should no longer be available online it may be archived.

In embodiments, an article that has only been published in a single language may be referred to as mono-lingual article, the version of which would correspond to a single KAV row. However, in order to support multiple language versions of an article (a multi-lingual article), the multiple language version is now defined as a set of KAV rows, one row for the master language (or source language) which is the language in which the article was originally authored, and one row for each language in which the article has been translated. The KAV.IsMasterLanguage and KAV.Language fields provide indications of which article is written in the source language, and which articles are translated from the originally authored document through the KAV rows. In embodiments, the KAV rows for a specific version share a common version number accessible through the KAV.VersionNumber field.

Figure 6:
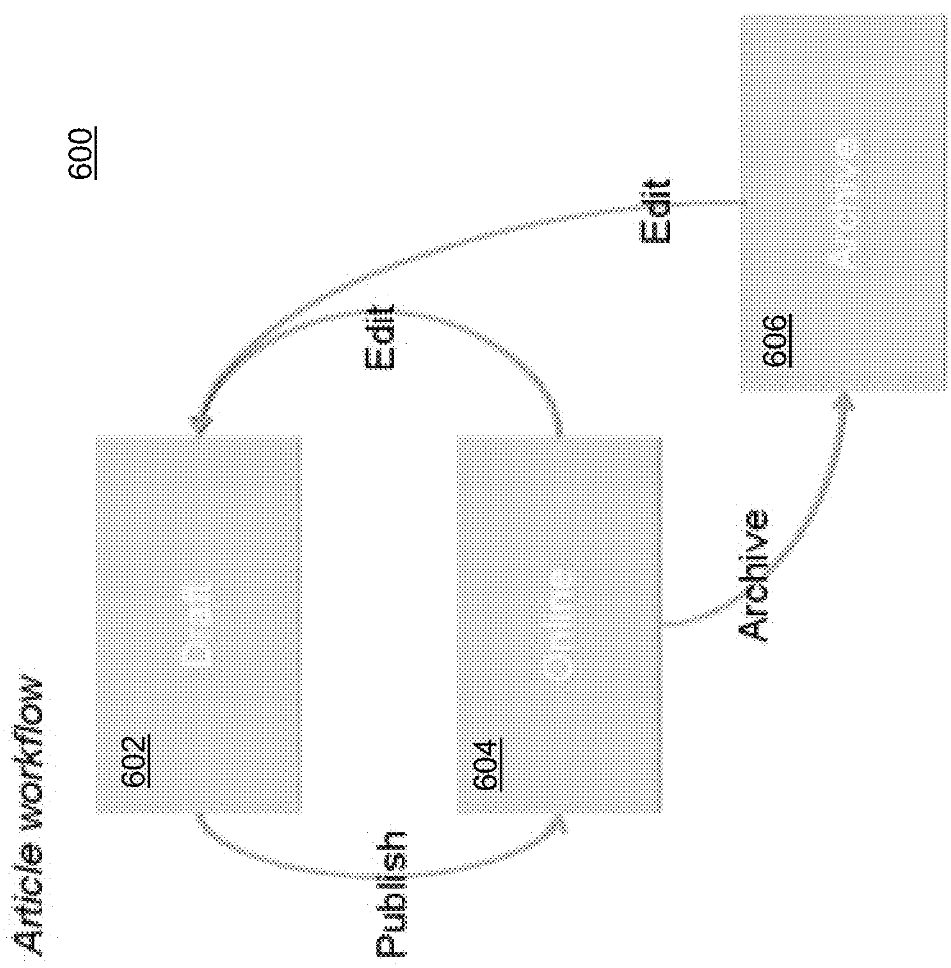
FIG. 6 shows an embodiment of an article workflow model for monolingual articles.

FIG. 6 illustrates a publishing workflow state diagram 600 for monolingual articles, that is articles that are only available in a single language in a knowledge base. Embodiments may utilize an article publishing process workflow to define a versioned life cycle for knowledge articles as the knowledge article moves between draft, online and archived states. The article publishing process workflow may be based on a statically defined state machine based on an approval process using metadata entities, using "KnowledgeArticle" as the target domain for the Process Definition. The process definition may be code that checks whether a transition from one state to another state is allowed to occur. The KnowledgeArticle is the abstract version of the article (which has an ID), and the version is a version of the concrete the article, which are parented to the KnowledgeArticle, and each version points to the KnowledgeArticle. The UDD determines what types of metadata fields are in the KA and KAV, and the metadata may be used to indicate the current state of the KA or KAV. The workflow is a state machine in that the metadata model consists of a set of nodes (states) and transitions that move articles between these nodes and manage their different version records. Unlike an approval processes, articles are always in a workflow state from the moment they are created. Deleting the article is the only way to make an article exit the workflow. Transitions are facilitated by allowing specific groups of users to perform those transitions. For example certain users may perform a publish transition that may move the current draft version of an article and making it available Online eventually replacing any existing online version of that article if it already exists.

The initial state of the article is draft 602. Articles in the state draft 602 are drafts of the articles that may need further work and/or review by others. In the monolingual state diagram, a draft 602 moves to an online state 604 by publishing the draft. Online state 604 is the state in which the article is published and available online. The article remains in online state 604 as long as the article is current. In addition, an online article 604 may transition to an archived state 606 when it is determined that the article is no longer current or needed. For example, if a new article is published with more complete information on the same subject, the earlier article may transition to archived state 606. Archived state 606 stores prior published articles that are no longer current or no longer needed in the knowledgebase. Alternatively, an article in the online state 604 may move to draft state 602 for further editing. For example, it may be discovered that there are many typos in the article in online state 602 or it may discovered that the information needs to be revised in light of new developments. Furthermore, an archived article 606 may also be edited, and move back to the draft state 602. For example, an article may be moved to the state archived article 606 due to lack of interest. Then at a later date, perhaps due to a change in technology, there is renewed interest in the subject of the article. In which case the article would be moved to draft state 602 so that the content could be reviewed to see if the article needs to be updated and revised prior to publishing.

Figure 7:
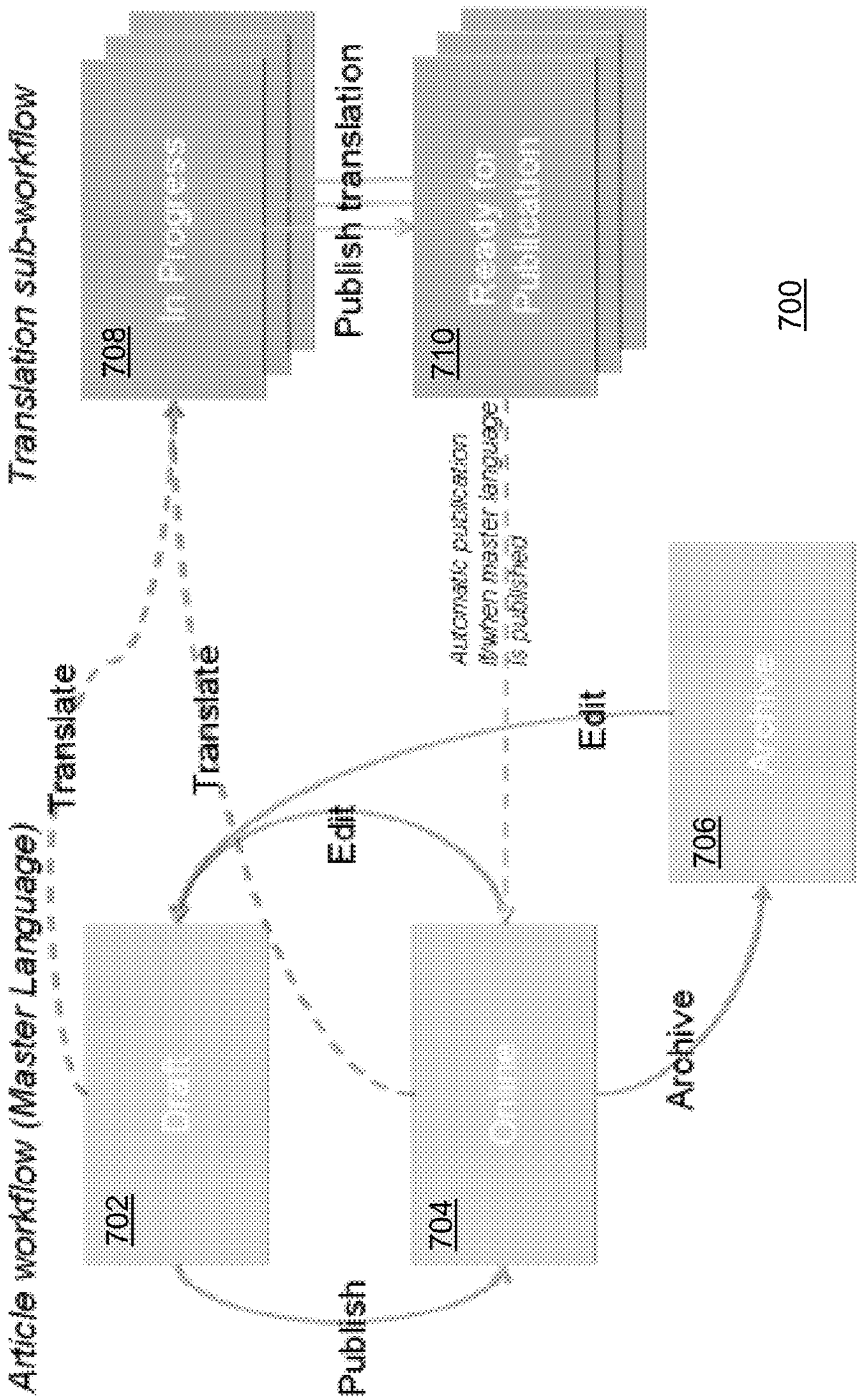
FIG. 7 shows an embodiment of an article workflow for modeling the translation process.

FIG. 7 illustrates an embodiment of a publishing workflow state diagram 700 that supports multilingual articles. The multiple language model for publishing multilingual articles is an extension of the state diagram of FIG. 6, and supports types of transitions and states related to the translations (in addition to the transitions discussed in FIG. 6) that may allow for the creation of translations and may spawn a sub workflow process for each translation. The sub workflow, models the life cycle of the translations as the translations are authored, either internally in the application or externally by a third party translation provider, until the translated articles are completed and may be made available online in the knowledge base together with the main source article. The article translation sub-workflow may be a process definition using “KnowledgeArticleVersion” as the target domain. The KnowledgeArticleVersion is the version of the article, which points to the KnowledgeArticle. The translation workflow model may serve to model the translation process lifecycle for KAV rows that represent translations of the master language row having the value KAV.IsMasterLanguage=false, because the translation is not the master language).

The translation sub workflow of FIG. 7 is initiated from the KnowledgeArticle (KA) publishing workflow (as shown in FIG. 6 for a single language) when a KAV translation is created, from an existing article in either a draft 702 or online state 704, as indicated by the arrows labeled translation connecting the states draft 702 and online 704 of the master document to the state translate 708 of the translation. In order to implement the translation sub workflow, translation-related transition types are included in the workflow model are PublishTranslation, automatic publication, and Translate/ReviseTranslation. When a translation is ready for publication the translation is transitioned, via the PublishTranslaiton transition, from the state translate 708 to the state ready for translation 710. If the master article has published (and is in the state online 704), the translation automatically transitions to the state online 704. Otherwise, the translation remains in the state of ready for publication 710, until the master document is published and then automatically transitions to the state of online. While the article is in the state of online or in the state of ready to publish, the article may be transitioned, via the Translate/ReviseTranslation transition, back to the translate 708 for revising the translation. Once in the state of online 704, the translation may be automatically archived if the master article is archived and transition to the state of archived 706 or may transition back to the state translate 708, if the translation needs to be revised.

More specifically, the transitions types PublishTranslation and Translate/ReviseTranslation may be included in the static enumerated type (enum) TransitionType. An enumerated type is a data type consisting of a set of named values called elements, members, or enumerators of the type. The enumerator names of the Transitions Type include identifiers that behave as constants in the language. A variable that has been declared as having an enumerated type may be assigned any of the enumerators as a value. Both of the transition types PublishTranslation and Translate/ReviseTranslation may be secured through a user interface (UI) by a user and/or group through the selection of “Setup/Articles/Action Security” and persisted in ProcessTransitionSecurity.

In the translation sub workflow embodiment shown in FIG. 7, there are two states (nodes) in the model, TranslationInProgress 708 and TranslationCompleted 710 (ReadyForPublication in diagram 7). TranslationInProgress 708 is the state for translations that are currently being written, and translation completed 710 is the state for translations that are finished being written. Furthermore, there are two transition types. One type of transition is PublishTranslation, which is the transitions that causes a translation to be published, and allows a translation to move from the state of TranslationInProgress 708 to the state of TranslationCompleted 710. Another type of transition is Translate/ReviseTranslation, which is the transition that results when it is determined that the translations needs to be revised. Translate/ReviseTranslation allows a translation to move from the state of TranslationCompleted (shown as Ready for Publication 710 in FIG. 7) to the state of TranslationInProgress state (shown as In Progress 708 in FIG. 7), which removes the translation from publication if the translations was published.

The workflow engine of embodiments may support the PublishTranslation transition type in the following manner. The workflow engine checks if the PublishTranslation is accessible from the current state of the workflow, and that the current user has the right to do the transition. If in the current state the PublishTranslation transition is valid (and the transition can only be valid if the translation is in the state ready for publication 710), the transition is made, and ProcessInstance is updated to reflect the transition change to a new state, and the translations completed_date is set to the current date. In an embodiment, the PublishTranslation is valid (and the translation is published) only if the article that corresponds to the translation has published. In an embodiment, if the article that corresponds to the translation has not published, the PublishTranslaiton is not valid (and the translation is not published). Thus, in an embodiment, once in the ready to publish state 710, the article remains there until the master article publishes. Next, the knowledge base is queried to check the master article’s KAV.PublishStatus for translation KAVs, which may involve finding an article with the same article id and version number, and for which IsMaster is true (as indicated by “KAV.PublishStatus” KAV is a table and PublishStatus is a column in the KAV table, which tracks the state of the KAV). After finding an article with the same article ID, version number for which IsMaster is true, the PublishStatus column is checked to see the status of the article, which could be Draft, Online or Archive, for example. If the master KAV for a translation is online, the translation KAVs are published (updating PublishStatus to Online, update version number, etc.), however if the master KAV is not online (e.g., KAV is a draft), then no update is needed for the KAV translations, and the translation is not published.

The workflow engine of embodiments may support the Translate/ReviseTranslation transition type in the following manner. The workflow engine checks that Translate/ReviseTranslation is accessible from the current state and that the current user has the right to do the transition. If in the current state the Translate/ReviseTranslation transition is valid, the transition is made, ProcessInstance is updated to reflect the transition change to a new state, and the translations completed_date is set to the current date. ProcessInstance may be a field in a table in which each record is a KA or KAV and the field of the table are used to keep track of the state of each KA or KAV. Furthermore, upon undergoing the Translate/Revise Translation transition any translations currently online are moved to back to the state of Draft 702, and the translations completed_date is set to null.

To support the management of translations in the KnowledgeArticle publishing process, the following changes to the mono-lingual workflow model and workflow engine may be required. Two additional transition types AddDraftTranslations and DeleteDraftTranslations are included in the static enum TransitionType. Both AddDraftTranslations and DeleteDraftTranslations may be accessed through the "Setup/Articles/Action Security" of the UI by users and/or groups and persisted in ProcessTransitionSecurity. In addition, new transitions of type AddDraftTranslations in the publishing process workflow model between the following states (nodes) are added:

Composition back to Composition

Published back to Published

WaitingPublication back to WaitingPublication as well as new transitions of type DeleteDraftTranslations in the publishing process workflow model between the following states (or nodes):

Composition back to Composition

Published back to Published

WaitingPublication back to WaitingPublication

The DeleteDraftTranslations is added to the KA Publishing workflow instead of relying on CRUD Delete on KAV. Articles either in draft 702 or archive 706 may be deleted, and translation in progress 708 may be deleted. Applications may need the ability to use CRUD (create, read, update, delete) operations to view and manipulate database rows. However, in embodiments for managing multi-lingual knowledge base CRUD operations may not be required to carrying out article management. As described above, embodiments of the KA publishing process manage the life cycle of the article as a whole controlling when versions may be created and deleted and by whom. For example creating a new draft for an existing article may only be allowed when the article is in the Published or Archived state, and the only users allowed to do so are those who have an entry in ProcessTransitionSecurity or are members of a group that are authorized to create a new draft. In a similar fashion, creating and deleting translations is only allowed when the article is in specific states and by users who have been authorized to do so through ProcessTransitionSecurity. Also, removing a draft translation is a very different proposition from deleting the master draft version, and an admin may likely want to secure the access differently. Such fine-grained access rules may not be defined using profile CRUD parameters. Furthermore, if instead of using transitions, a delete of translations with CRUD were implemented on KAV, the delete of translations with CRUD would require the delete to have an intimate hard coded knowledge of the KA publishing process knowing when to authorize the operation. In Addition, securing the operation for a set of users and groups for all the other transitions may not be possible with a solution based on the CRUD operation.

To support AddDraftTranslations transition type for the management of translations in the KnowledgeArticle publishing process, the following changes to the mono-lingual workflow model and workflow engine may be required as follows. Parameters that support bulk operations are added such as: List of {articleId, language, assigneId (owner/queue), due date (optional)}. A check may be performed whether the AddDraftTranslations is accessible from the current state, and that the current user has the right to execute the transition. A query may be performed to retrieve any existing translations (drafts and online) to determine whether it is O.K. to add a draft translation. If a draft translation does not exist, draft translation KAV objects are created under the following conditions:

i. If there is no online translation KAV for the requested language

1. Clone from the Master document (the master may be a draft or may be online). In performing the clone, standard fields such as channels, data category selections, and the title may be cloned or maybe marked with something like <To be translated>

2. Not cloned: create custom fields for the fields of the KAV.

ii. Else If there is an online translation KAV for the requested language

1. Clone from the master document upon a request for translation (the master may be a draft or may be online). During the cloning, standard fields such channels and data category selections are cloned.

2. Clone the title and custom fields from the online KAV translation.

iii. Insert new KAV translations

When a new draft version of an article is created or a new draft version of a translation is created, to save time and effort, first close of the master document or most recent version is created and may be used as the template for the new draft, and all of the field values are copied from the prior version or master document to the clone. Following the creation of the new KAV translations, the translation sub workflow is initialized for the new KAV translations. Finally, an assignment of the draft translation KAV objects is made to the requested user/queue with a specified due date.

To support DeleteDraftTranslations transition type for the management of translations in the KnowledgeArticle publishing process, the following changes to the mono-lingual workflow model and workflow engine may be required as follows. Parameters that support bulk operations are added such as: a list of article identifiers and the language of the articles {articleId, language}, a check that DeleteDraftTranslations is accessible from the current state and that the current user has the right to execute the transition, a query that finds existing draft translations for specified article ids and languages, which then deletes the draft translations.

In embodiments, the Publish, Archive, and RestoreToDraft may include options for creating a translation, publishing a translation, archiving a translation and restoring a translation to the draft state to handle translations. When a KnowledgeArticle (KA) is published and the master KAV is moved to online, an additional step is required. All draft KnowledgeArticleVersion (KAV) translations in the TranslationCompleted state for this version (same version number) should also be published, which may be done by joining to article query with a filter on completed_date!=null. If the article already existed online and is republished, new draft translations may replace existing online translation if a draft translation already existed for the same master document. However, if there are any existing online translations without a corresponding draft translation, the existing online translations should remain online. If what the publisher had said "impacts existing translations" while editing the draft master, an isOutOfDate flag may be cascaded to the remaining online translations at publication time (via a hidden flag maintained on the master).

The Archive transition type may include the following to handle translations. When a KA is archived and the master KAV is set to the Archived PublishStatus, translations of that article should also be set to Archived. Online translations may be archived. However, draft translations may be deleted (a user interface (UI) should provide explicit warning). All translations that are archived should exit the KAV Translation sub workflow.

The RestoreToDraft transition type may include the following to handle translations. When a KA is moved back to the draft state, a new master KAV draft is created. If a new draft translation is then requested, the new draft translation may be cloned from the corresponding archived translation if it exists. When new translations are created, the new translations may re-initialize the KAV Translation sub workflow and enter the TranslationInProgress state. When publishing a restored article, “extra” archived translations that aren't represented in the newly published translations may be moved back to the draft state. Archived translations that match a newly published translation may be deleted, as is the case with the archived master version.

It is noted that even if the workflow engine is capable of executing AddDraftTranslations in mass with any combination of article id and languages, the knowledge management UI may restrict the execution of AddDraftTranslations for performance reasons to allow either article ids in bulk for a specific language, or language in bulk for a specific article.

Figure 8:
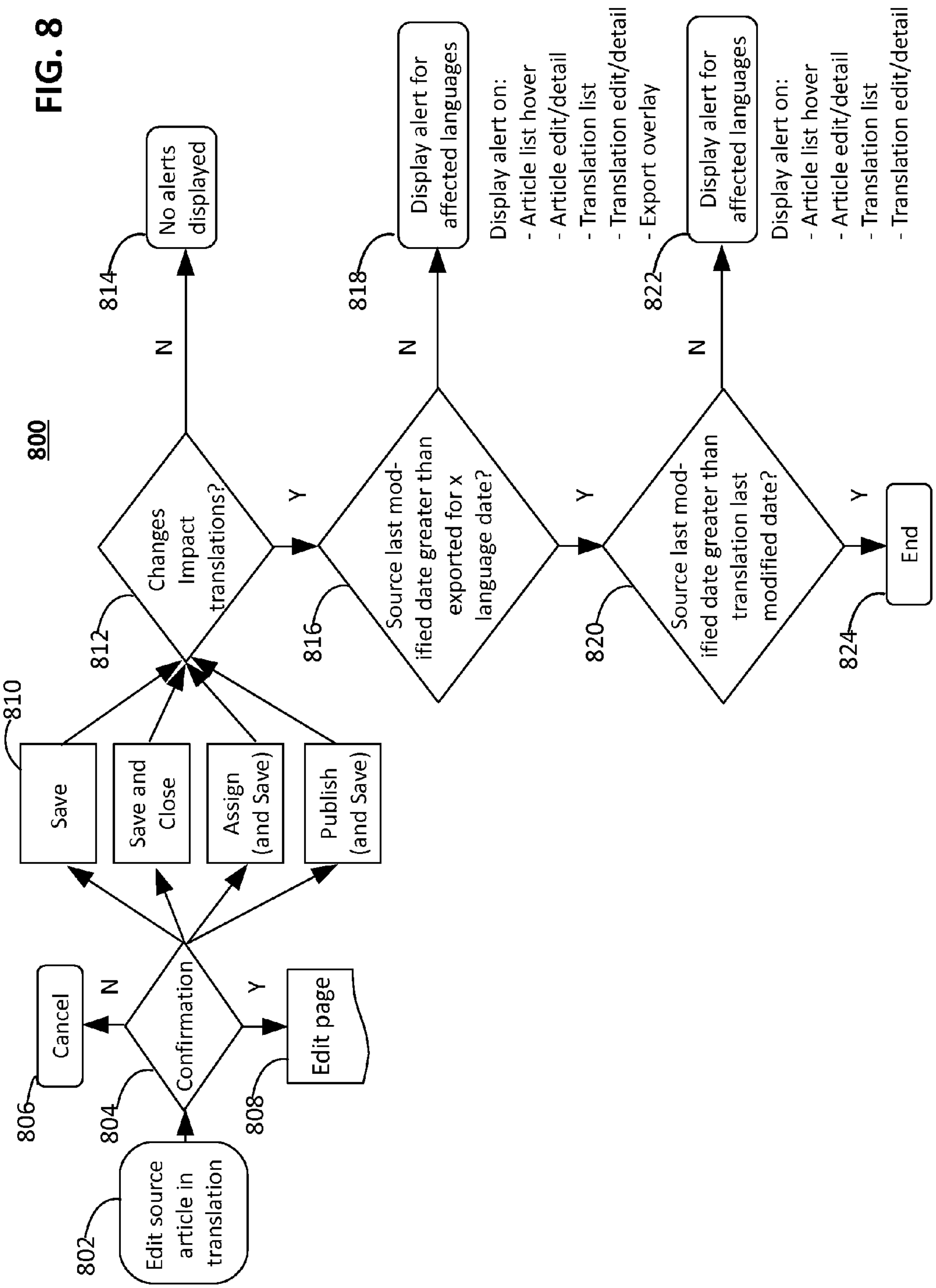
FIG. 8 shows an operational flow diagram illustrating an embodiment of a method for editing source articles in translation.

FIG. 8 shows an operational flow diagram illustrating an embodiment of a method 800 for editing source articles in translation. The method starts at step 802 with a request to edit a source article that is in translation. In step 804, a decision is made whether to allow the editing of the article. If the request is not confirmed (in decision block 804 is No), that the source article is in translation the process may be cancelled in step 806 and method 800 terminates. Returning to step 804, if the request for the translation is confirmed (in decision block 804 is Yes) the article is edited in step 808. In step 810 the edited article is saved, saved and cloned, assigned and saved, and/or published and saved. The article is saved and cloned if a translation is needed and no translation exists, so the cloned article may be used as a starting point for the translation. The assign node of step 810 is used if the article is assigned to a queue or to a user for translation. In step 812 a determination is made as to whether the changes impact the translation. If at step 812 it is determined that the changes to the source document do not impact an existing translation of the source document, then no alerts are displayed (in step 814 and method 800 terminates).

Returning to step 812, if at step 812 it is determined that the changes to the source document do impact the existing translations of the source document, then a determination is made at 816 if the source article was last modified at a date after the date exported for translation into one or more languages. If the source article was modified after the date a copy of the document was sent for translation, then an alert is displayed for affected languages (in step 818) on an article list hover, article edit/detail, translation list, translation edit/detail, and/or export overlay, for example, to indicate the that version of the article that was translated is out of date, and method 800 terminates. Returning to step 816, if the determination made at step 816 is that the source was an article that was last edited prior to being send to translation, then a determination is made at step 820 whether the source article was last modified at a date after the date that the translation was last modified. If the source article was last modified at a date after the translation was last modified date (820) then an alert is displayed for affected languages (in step 822) on the article list hover, article edit/detail, translation list, and/or translation edit/detail, because the translation is not longer valid, and method 800 terminates. Returning to step 820, if it is determined that the source article was not modified after the translation was last modified, then method 800 terminates without issuing any alerts in step 824. In another embodiment, although depicted as distinct steps in FIG. 8, steps 802-822 may not be distinct steps. In other embodiments, method 800 may not have all of the above steps and/or may have other steps in addition to, or instead of, those listed above. The steps of method 800 may be performed in another order. Subsets of the steps listed above as part of method 800 may be used to form their own method.

Screenshots:

The knowledge management tasks may be achieved through two views and two editors: the master language view and editor, which provide the same features as the one available for mono-lingual Knowledge plus translation requests, and the translation view and editor, which allows a user to do tasks related to translating an article In an embodiment, user actions available in the master language view may include: new, delete, assign, submit for translation, and publish. In master language view columns may include: title, language, type, assigned to (person in a queue), and due date (of translation). In master language view links may include: edit and preview.

In an embodiment, user actions available in the translation view may include: delete, assign, and publish translation. In translation view columns may include: title, language, ready for publication, type, assigned to (person in a queue), master title, Out of Sync flag, due date (of translation), last modification/translation date, last export date, and last import date. In translation view links may include: edit and preview. In translation view links may include: edit and preview.

Additional article actions that may be available in embodiments for managing and accessing a multilingual knowledge base include add translation, delete draft translation, and publish translation. The add translation may be used to request new translations of an article. The add translation action may be executed from the following places: from Master Draft View: Submit for translation; from Translated Draft View: Edit on ready for publication translations; from Master Online View: Submit for translation; and from Translated Online View: Edit. The add translation action may allow the content manager to keep or remove existing online translations. The delete draft translation may be available in Translated Draft View, and allows a user/system to delete an article translation. The publish translation action may be available in Translated Draft View, and allows a user/system to publish an article translation. It is noted that if the master version of an article is not yet been published, the article translation is moved to the status “ready for publication” and the translation may be published when the master version is published. It is noted that if the master version is published, the translation is then directly published.

Figure 9A:
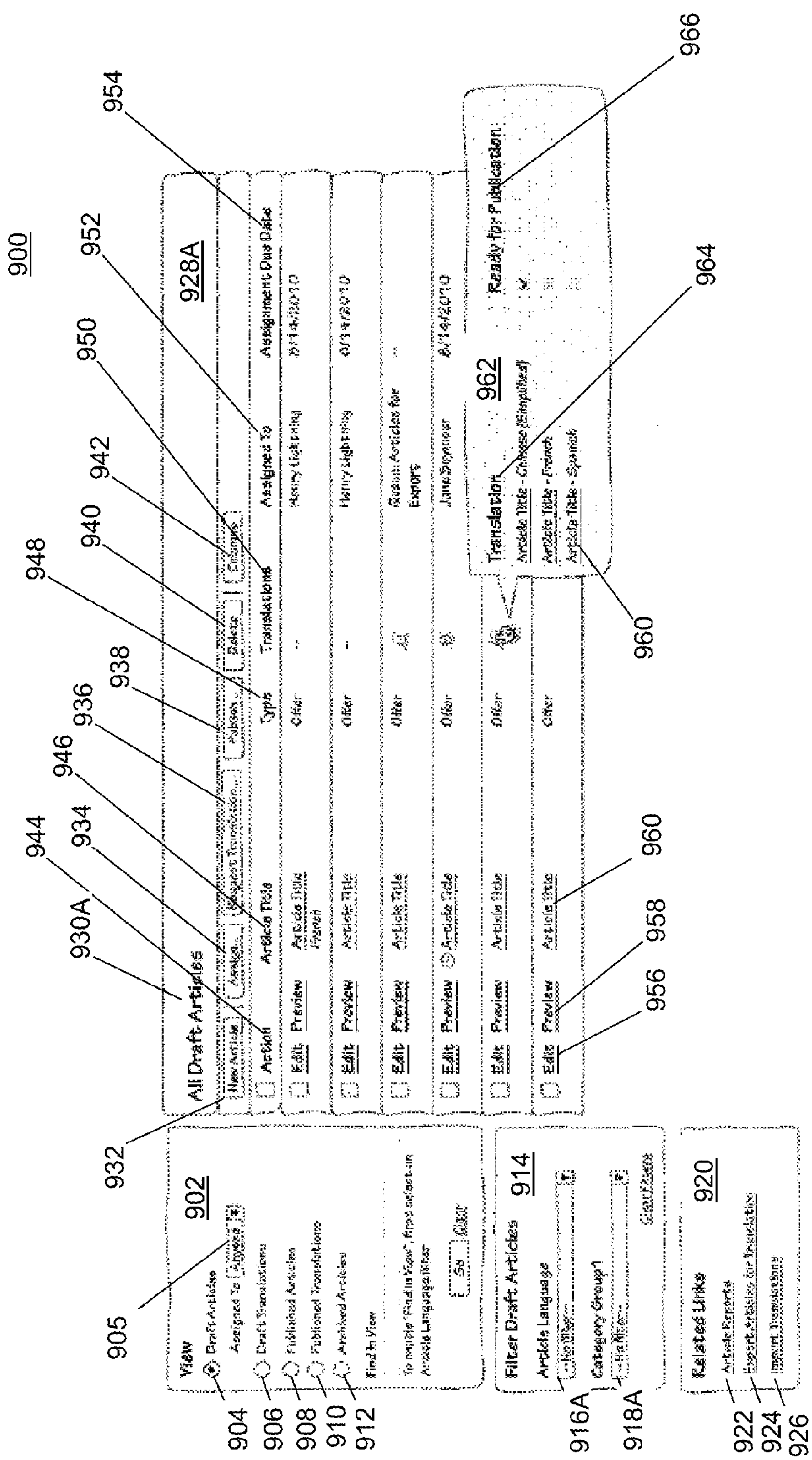
FIGS. 9A-9E show a series of screenshots of embodiments of article and translation views.

FIGS. 9A-9E show a series of screenshots of embodiments of article and translation views. FIG. 9A shows a screenshot 900A of an embodiment of a page of UI 900A for managing articles and translations. UI 900A may include article search tool 902, draft articles 904, article assignment menu 905, draft translations 906, published article selection 908, published article translations 910, archived articles 912, draft article filter 914, article language 916, category group 918, related links 920, article report link 922, export article for translation link 924, import translation link 926, view 928, view identifier 930, new article tab 932, assignment tab 934, request translation tab 936, publish tab 938, delete tab 940, columns tab 942, action column 944, article title column 946, type 948, translation column 950, assignment column 952, assignment due date 954, edit link 956, preview link 958, article title link 960, translation pop up 962, translations sub column 964, and ready for publication sub column 966. In other embodiments, webpage 900A may not have all of the elements listed and/or may have other elements instead of or in addition to those listed.

Although article search tool 902, draft articles 904, article assignment menu 905, draft translations 906, published article selection 908, published article translations 910, archived articles 912, draft article filter 914, article language 916, category group 918, related links 920, article report link 922, export article for translation link 924, import translation link 926, view 928, view identifier 930, new article tab 932, assignment tab 934, request translation tab 936, publish tab 938, delete tab 940, columns tab 942, action column 944, article title column 946, type 948, translation column 950, assignment column 952, assignment due date 954, edit link 956, preview link 958, article title link 960 appear in FIG. 10, FIG. 11, FIG. 13, FIG. 14, FIG. 15, and FIG. 16, since article search tool 902, draft articles 904, article assignment menu 905, draft translations 906, published article selection 908, published article translations 910, archived articles 912, draft article filter 914A, article language 916A, category group 918A, related links 920, article report link 922, export article for translation link 924, import translation link 926, view 928A, view identifier 930A, new article tab 932, assignment tab 934, request translation tab 936, publish tab 938, delete tab 940, columns tab 942, action column 944, article title column 946, type 948, translation column 950, assignment column 952, assignment due date 954, edit link 956, preview link 958, and article title link 960 are fully described in the following description FIG. 9A, these elements descriptions will not be repeated in FIG. 10, FIG. 11, FIG. 13, FIG. 14, FIG. 15, and FIG. 16.

UI 900A may be a webpage or other form of a user interface generated on a display of a user device for article access and translation in an article management tab. Article search tool 902 may enable a user to search for articles and their translations according to the state of the article and/or the article's translations. For example, article search tool 902 may be capable of searching for an article or translation according to whether the article and/or translation is in the state of draft, published, and archived for both the master and that translated articles. The draft article 904 may display the different available queues. Draft articles 904 as selected in FIG. 9A, may be used to view which articles that are assigned to a queue in server side system 100 with article assignment menu 905. Article assignment menu 905 may be a drop down menu and may be used to view articles according to where the article is assigned. An embodiment of article assignment menu 905 may include the following: anyone, user, queue 1, and queue 2 (expansion of drop down not shown in FIG. 9A). In embodiments, queues may need to be modified, and consequently, an administrator (of the tenant and/or of the multitenant database) may be given tools for creating queues for different knowledge articles versions. In other words, the queue may correspond to the "abstract" entity representing the knowledge article (an abstract entity refers to a programming object representing something for which multiple version may exist and so the programming object does not represent one concrete items, such as an article, but represents multiple versions of one article, the KAV table is a programming objects, which is "abstract" and exists at the entity level in the sense that multiple version of the KA may exist and be represented by the KAV table, etc.). Draft translations 906 may enable a user to view and search for articles that are in a draft translation state. Published article selection 908 may enable a user to view and search for articles that are in a published article state. Published article translations 910 may enable a user to view and search for translation of articles that have published. Archived articles 912 may enable a user to view and search for articles that are in an archived state.

Draft articles filter 914A may enable a user to add a keyword filter by entering a search term in the search box. The articles and/or translation returned will be those articles in the category selected, via article search tool 902 that includes the string entered via draft article filter 914A. In the embodiment shown in FIG. 9A filter parameters may be included, but are not limited to the article language, and the category or group the article belongs to. However, in other embodiments, articles and translations maybe searched for together. Article language 916A may be a pull down menu for selecting the language of the articles that the user would like to view. Category group 918 may be a pull down menu for setting filter parameters based on category or group for searching for archived articles. Category group 918A may be used to select a group to which the article sought belongs, so that only articles in that category group will be displayed.

Related links 920 may provide users with useful links related to managing multilingual articles. Article report link 922 may bring the user to a page for creating a report containing information about the status of various articles (e.g., whether each article is online, in the draft state, or archived) and/or may include information about the status of any translations (e.g, draft, ready to publish, online, or archived), via which the user with may track the status of the article and/or the article's translation. Export article for translation link 924 may provide a user with a link to a webpage or UI screen for exporting articles for translation and assigning the article to a queue or user. When an article is exported for translation, a copy of the article is sent to the translator or to a storage area to which a queue of translators has access, so that any translator in the queue may view, copy, and/or download the article, thereby allowing the translator to translate the article. Import translation link 926 may provide a user with a link to a webpage or UI screen for importing translations of articles that have been translated. In an embodiment, there may be a workspace and/or web portal, for example, where a translator may upload a finished translation. Once the finished translation is uploaded to the workspace or web portal or otherwise indicated as being complete, a tenant administrator may import the article to a storage area for translations in the ready to publish state.

View 928A may provide users with a tabular view of the articles selected via search tool 902 and draft articles filter 914A. The types of articles that are currently displayed in the view 928A may be based on the search selections chosen in draft translations 906, published article selection 908, published article translations 910, and archived articles 912 found in the article search tool 902, as will be shown in FIGS. 9B-9E. View identifier 930A may provide a verbal description of a characteristic or a category associated with the article found, such as by providing a user with the state of articles currently displayed by the view 928A. In the example of FIG. 9A, all draft articles are currently displayed no matter who assigned to, no matter the language, and no matter the category group to which the article belongs, because draft article 904 is selected and no value was entered for the article assignment menu 905, article language 914, or category group 916A. New article tab 932 may be selected to add a new article, and bring a user to a display page for carrying out the process for adding a new article to the state machine. Assignment tab 934 may be used to assign an article to a user or a particular queue for editing, and may bring the user to a web page that facilitates carrying out the assignment. The request translation tab 936 may be used to request a translation, and may bring a user to a web page for carrying out the process for requesting a translation of an article. Publish tab 938 may be used to publish an article, and bring a user to a display page for carrying out the process for publishing an article, thereby removing the article from the drafts state to the online state. Delete tab 940 may be used to delete an article in draft transition, and may bring a user to a display page for carrying out the deletion process for an article. Columns tab 942 may allow the user to add or reconfigure the columns in the view 928A. Action column 944 may allow a user select an action to perform on an article. In the embodiments shown in FIGS. 9A-9E, action shown, but are not limited to are edit and preview. Article title column 946 is a list of the titles of the articles in the selected state at denoted by view identifier 930A. Article title link 960 may allow the user to edit the title of the article that appears on the screen if the title link 960 is selected. Type 948 is a column that specifies a type of the article. For example, the type may have values of "offer," if the draft was offered to a particular entity to write, but the offer was not accepted In an embodiment, another type may be "accepted," which indicates that the offer was accepted. Translation column 950 may provide a user with information on available translations of articles. Assignment column 952 indicates the queue, user or other entity to which the article is assigned. In an alternative embodiment, assignment column 952 may be used by a user to assign an article to a queue for translation or other processing. Assignment due date 954 may be the date that processing on a article should be completed by. The edit link 956 may allow a user to edit the descriptive information about the article (e.g., the title) that appears in the user interface. The preview link 958 may allow a user to preview an article. Title 960 is the title of a translation in translation popup. In the embodiment of FIG. 9A, translation popup 962 may appear when the cursor hovers over or near an entry in the translation column 950. Translation pop up 962 may provide a user with a table showing a column listing translations available and whether the translations are ready for publication. The translation in translation popup 962 has the title listed in title 960. Translations sub column 964 lists the translations in translation popup 962. Publication sub column 966 indicates whether the translations of translation popup 962 are ready for publication.

Figure 9B:
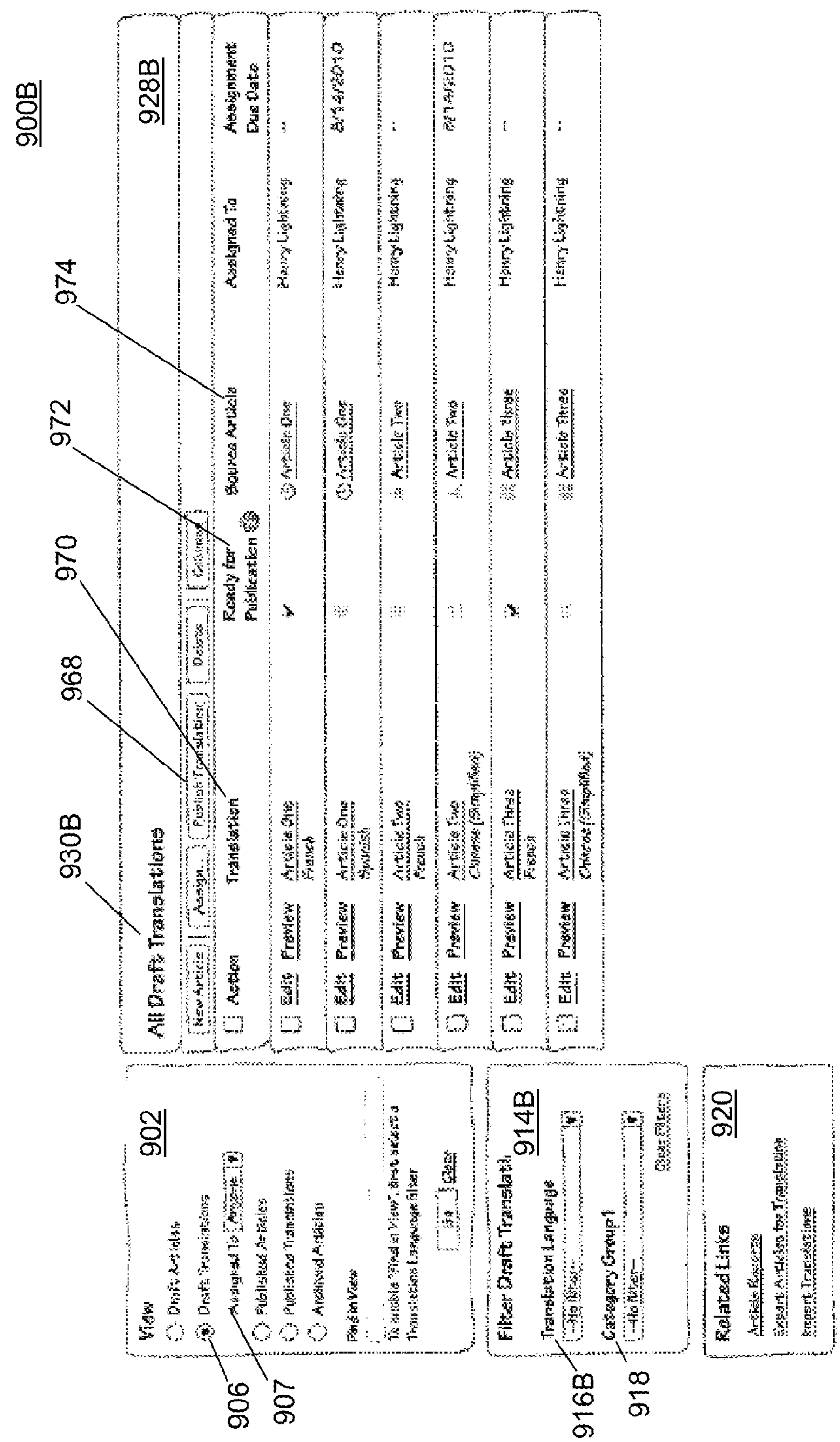

FIG. 9B shows a screenshot of webpage of UI 900B, the draft translations 906 is selected, and in response to the selection to the articles that are assigned to the queue, user, or other entity are displayed. Drop down assignment queue menu 907 may be used to select the articles viewed according to which queue, user or other entity that the article is assigned. An embodiment of drop down 907 may include the following: anyone, user, queue 1, and queue 2 (expansion of drop down not shown in FIG. 9B).

Filter draft translation articles 914B may enable a user to search for articles that are in a draft translation state based on search parameters set in the filters. In the embodiment shown in FIG. 9B filter parameters may included, but are not limited to translation language, and the category or group the article belongs to. The combination of the choices made in first draft translation articles 914B and article search tool 902 determine, which articles are displayed. Translation language search menu 916B may be a pull down menu for setting filter parameters based on language for searching for draft translated articles. Category group 918B may be a pull down menu for setting filter parameters based on category or group for searching for draft translated articles.

In response to the selection of draft translations 906, the view 928B may provide users with a tabular selection of actions for managing and viewing draft translations of articles in a multilingual knowledge base. The view identifier 930B in the embodiment of FIG. 9B reads "All Draft Translations" to provide a user with the purpose of the view 928B currently displayed on a user device. In the embodiment of FIG. 9B, draft translation articles are displayed. Publish translation tab 968 may be selected to bring a user to a display page for carrying out the process for publishing a translation of an article. Translation column 970 is a list of links to articles that are draft translations. Ready for publication column 972 indicates which translation drafts are ready for publication. Source article column 974 identifies the source or master article on which the translation is based.

Figure 9C:
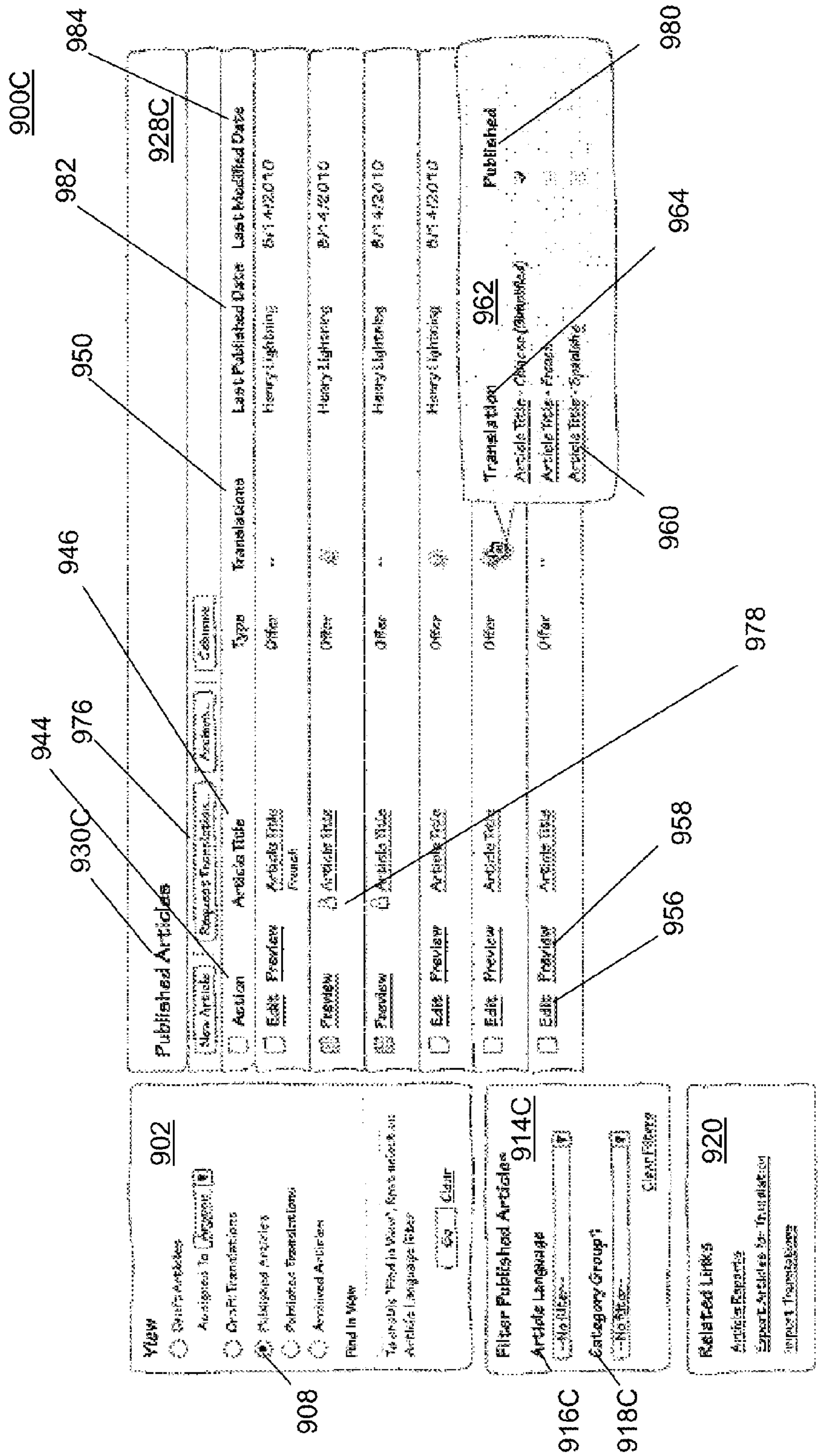

FIG. 9C shows an embodiment of a webpage of UI 900C, the published article view selection 908 is selected in the article search tool 902, and in response to published articles may viewed and managed for translation.

Filter published articles 914C may enable a user to search for articles that are in a published state based on search parameters set in the filters. In the embodiment shown in FIG. 9C filter parameters may included, but are not limited to article language, and the category or group the article belongs to. Article language 916C may be a pull down menu for setting filter parameters based on language for searching for draft translated articles. Category group 918C may be a pull down menu for setting filter parameters based on category or group for searching for draft translated articles.

In response to the selection of published article view selection 908, the view 928C may provide users with a view of the articles selected via search tool 902 and draft articles filter 914C. The view identifier 930C in the embodiment of FIG. 9C reads "Published Articles" to provide a user with a verbal description of a characteristic or category of the articles found, which are currently displayed in view 928C. In the embodiment of FIG. 9C, published articles are displayed. Request translation tab 976 may be selected to bring a user to a display page for carrying out the process for requesting a translation of a published article. In the article title column 946, an article may be locked as indicated by lock 978, and may only be previewed 958 and not edited 956 in the action column 944.

Translation column 950 may provide a user with information on available translations of published articles. In the embodiment of FIG. 9C, the selection of an icon in the translation column 950 may provide the user with a translation pop up 962. Translation pop up 962 may provide a user with a table showing a column listing translations available in translations sub column 964 by title 960, and if the articles by language are published in publication sub column 980. The last published column 982 may indicate the last published date of an article. The last modified date column 984 may provide a last modified date for an article.

Figure 9D:
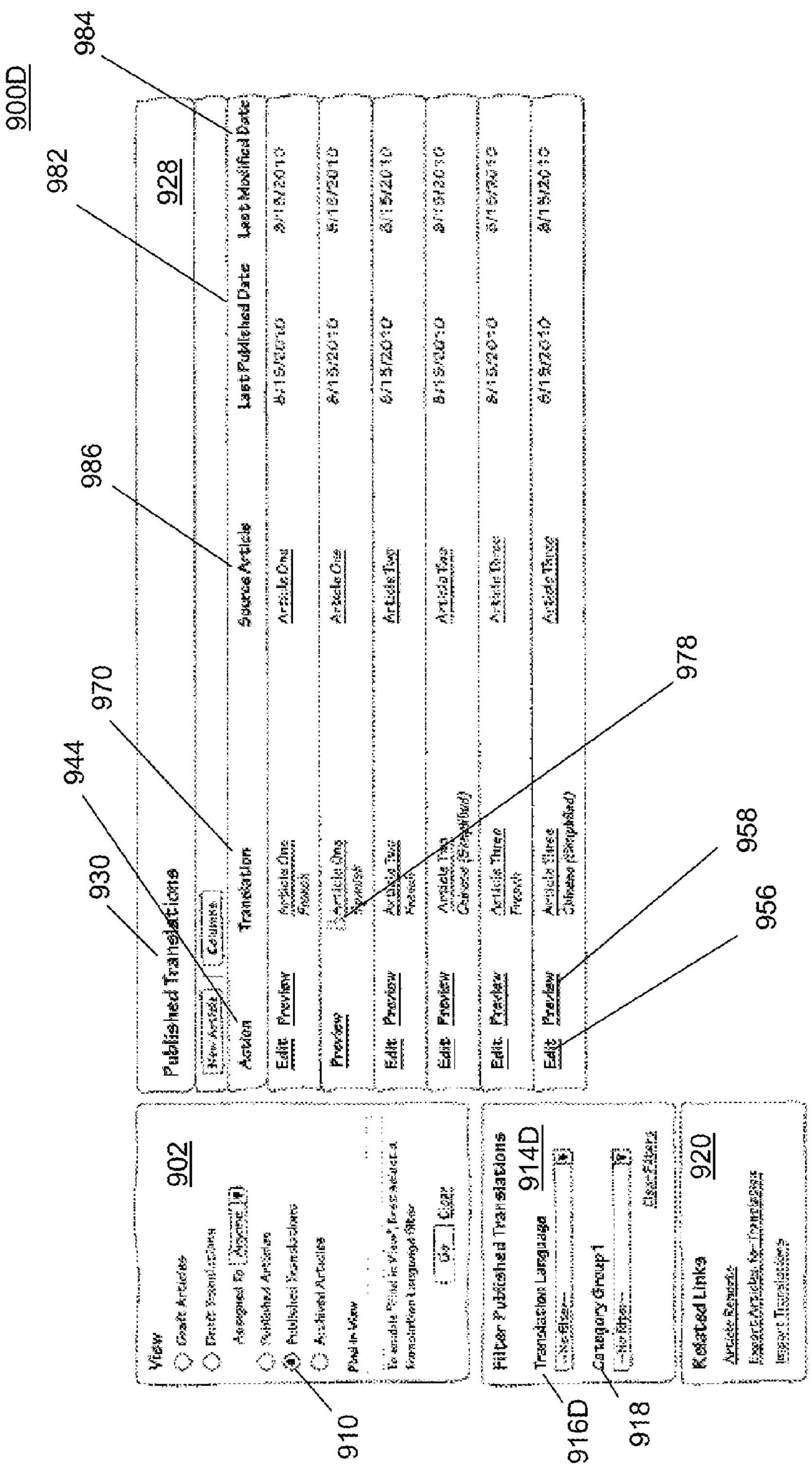

FIG. 9D shows an embodiment of a webpage of UI 900D, the published translation view selection 910 is selected in the article search tool 902, and in response to published translations of articles may viewed and managed for translation.

Filter published articles 914D may enable a user to search for articles that are in a published state based on search parameters set in the filters. In the embodiment shown in FIG. 9D filter parameters may included, but are not limited to translation language, and the category or group the article belongs to. Translation language search menu 916A may be a pull down menu for setting filter parameters based on language for searching for draft translated articles. Category group menu 918D may be a pull down menu for setting filter parameters based on category or group for searching for draft translated articles.

In response to the selection of published translation view selection 910, the view 928 may provide users with a view of the articles selected via search tool 902 and draft articles filter 914A. The view identifier 930 in the embodiment of FIG. 9D reads "Published Translations" to provide a user with the purpose of the view 928 currently displayed on a user device. In the embodiment of FIG. 9D, published translations of articles are displayed. In the translation column 970, an article may be locked as indicated by lock 978, and may only be previewed 958 and not edited 956 in the action column 944. Translation column 970 may provide a user with information on available translations of published translation of articles. The last published column 982 may indicate the last published date of an article. The last modified date column 984 may provide a last modified date for an article. Sources article column 986 may be a list of links to a source or master articles that are the source of the published translations.

Figure 9E:
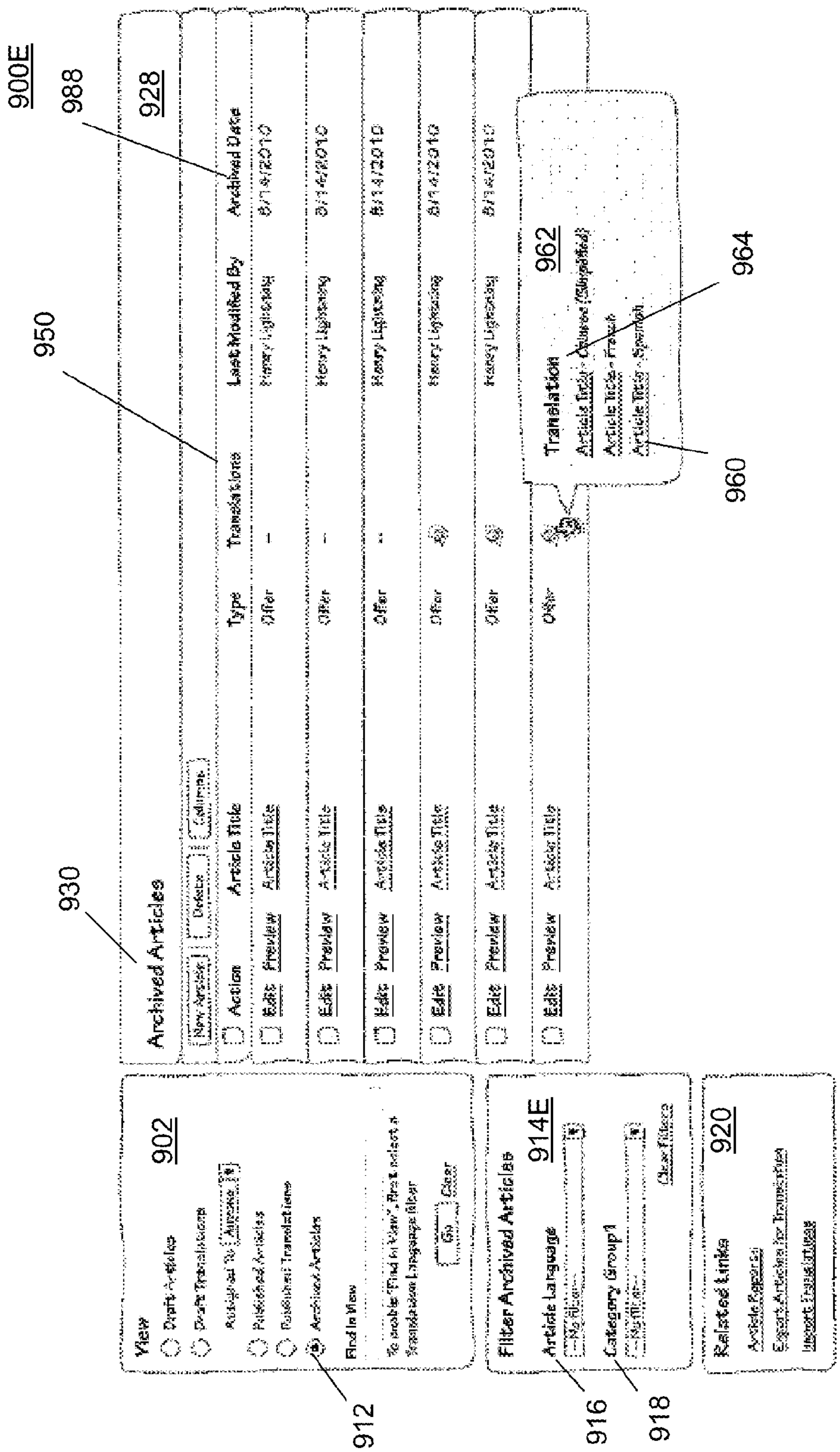

FIG. 9E shows an embodiment of a webpage of UI 900E, the archived article view selection 912 is selected in the article search tool 902, and in response to archived articles may viewed and managed for translation.

Filter archived articles 914E may enable a user to search for articles that are in a archived state based on search parameters set in the filters. In the embodiment shown in FIG. 9E filter parameters may be included, but are not limited to article language, and the category or group the article belongs to. Article language 916 may be a pull down menu for setting filter parameters based on language for searching for draft translated articles. Category group 918 may be a pull down menu for setting filter parameters based on category or group for searching for draft translated articles.

In response to the selection of archived article view selection 912, the view 928 may provide users with a view of the articles selected via search tool 902 and draft articles filter 914A. The view identifier 930 in the embodiment of FIG. 9E reads "Archived Articles" to provide a user with the purpose of the view 928E currently displayed on a user device. In the embodiment of FIG. 9E, archived articles are displayed. Translation column 950 may provide a user with information on available translations of archived articles. In the embodiment of FIG. 9E, the selection of an icon in the translation column 950 may provide the user with a translation pop up 962. Translation pop up 962 may provide a user with a table showing a column listing translations available in translations sub column 964 by title 960. The archived column 988 may indicate the last archived date of an article.

Figure 10A:
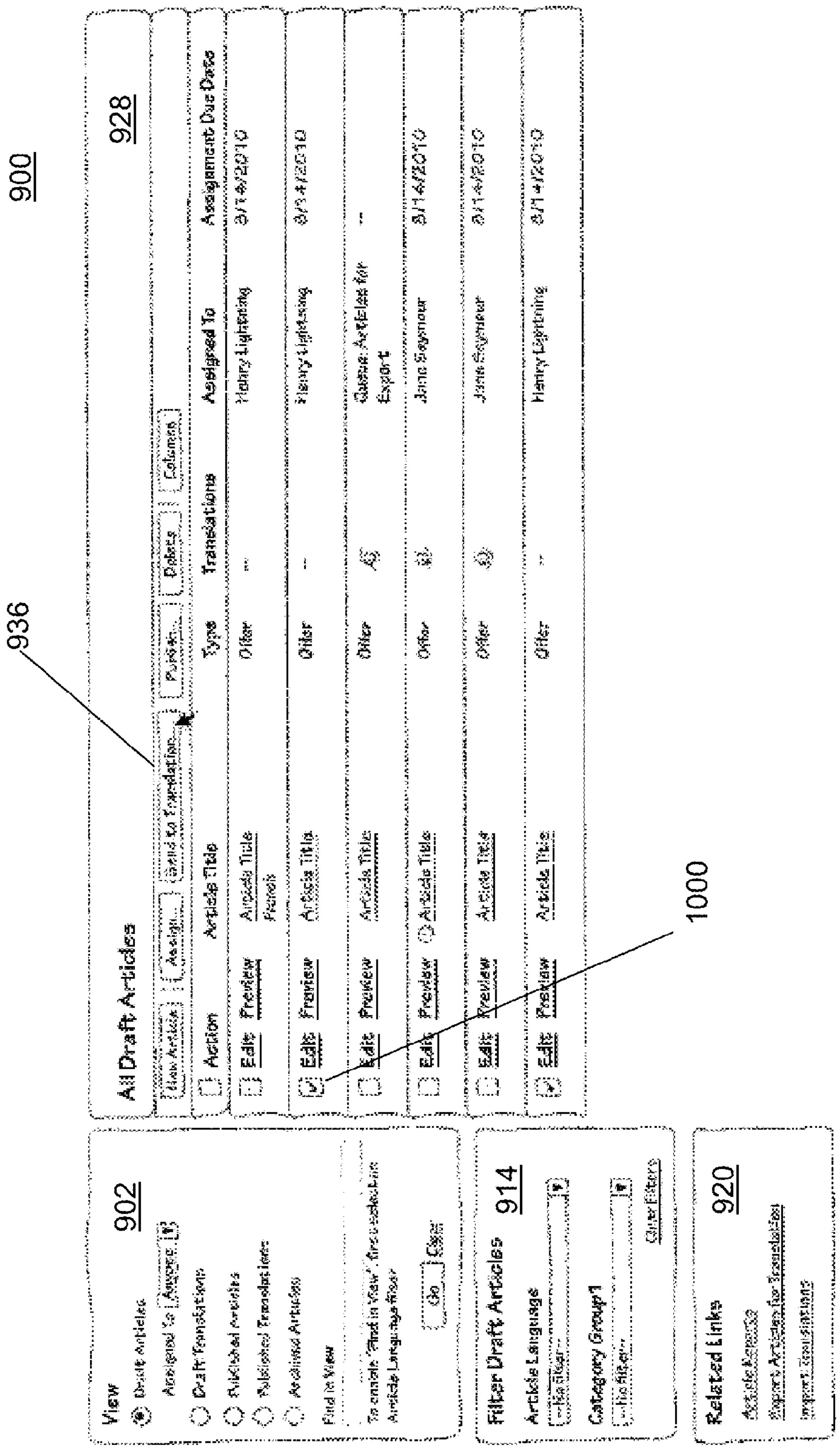
FIGS. 10A-10C show a series of screenshots of embodiments of webpages of a user interface for translating articles.
Figure 10B:
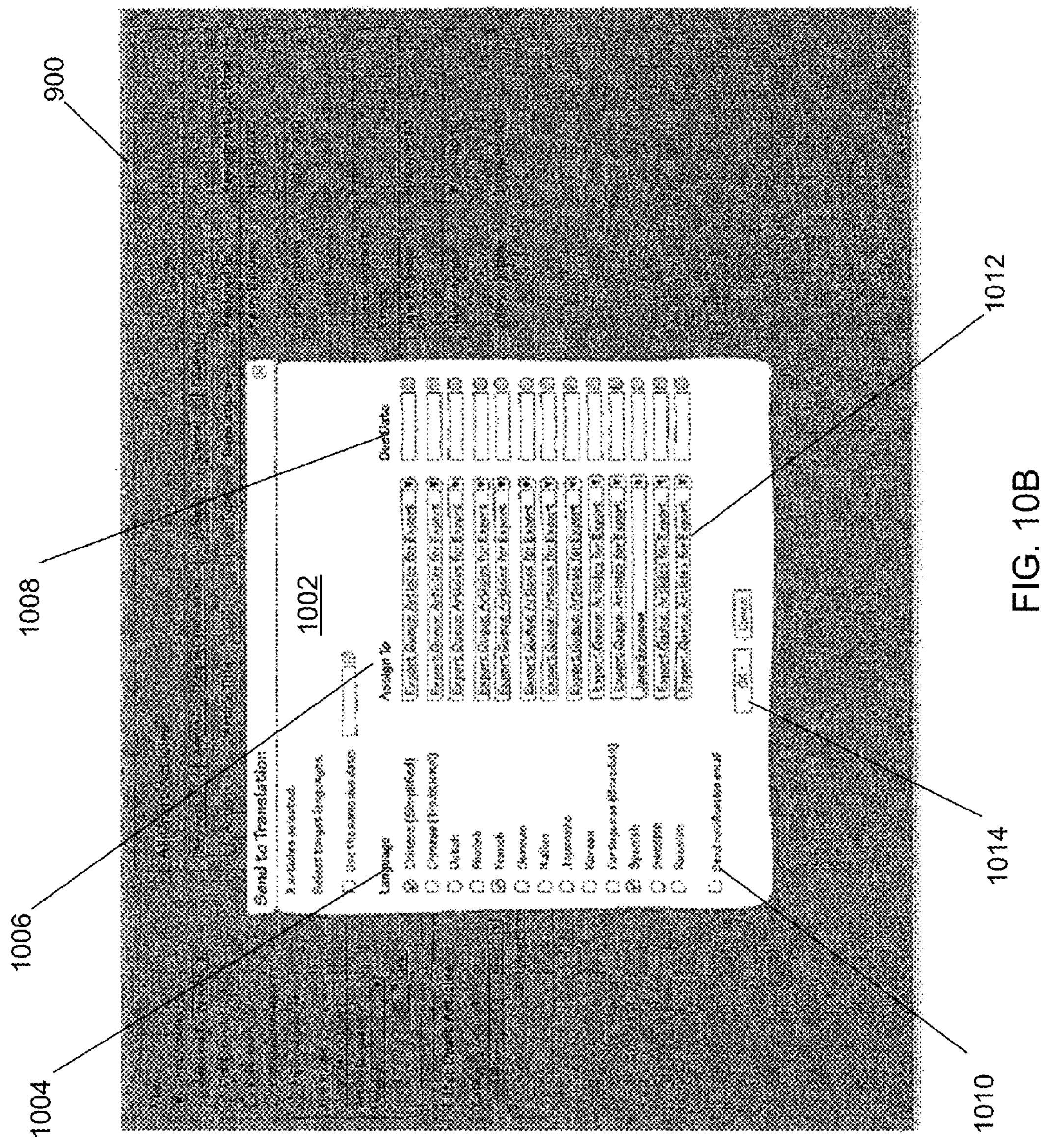
Figure 10C:
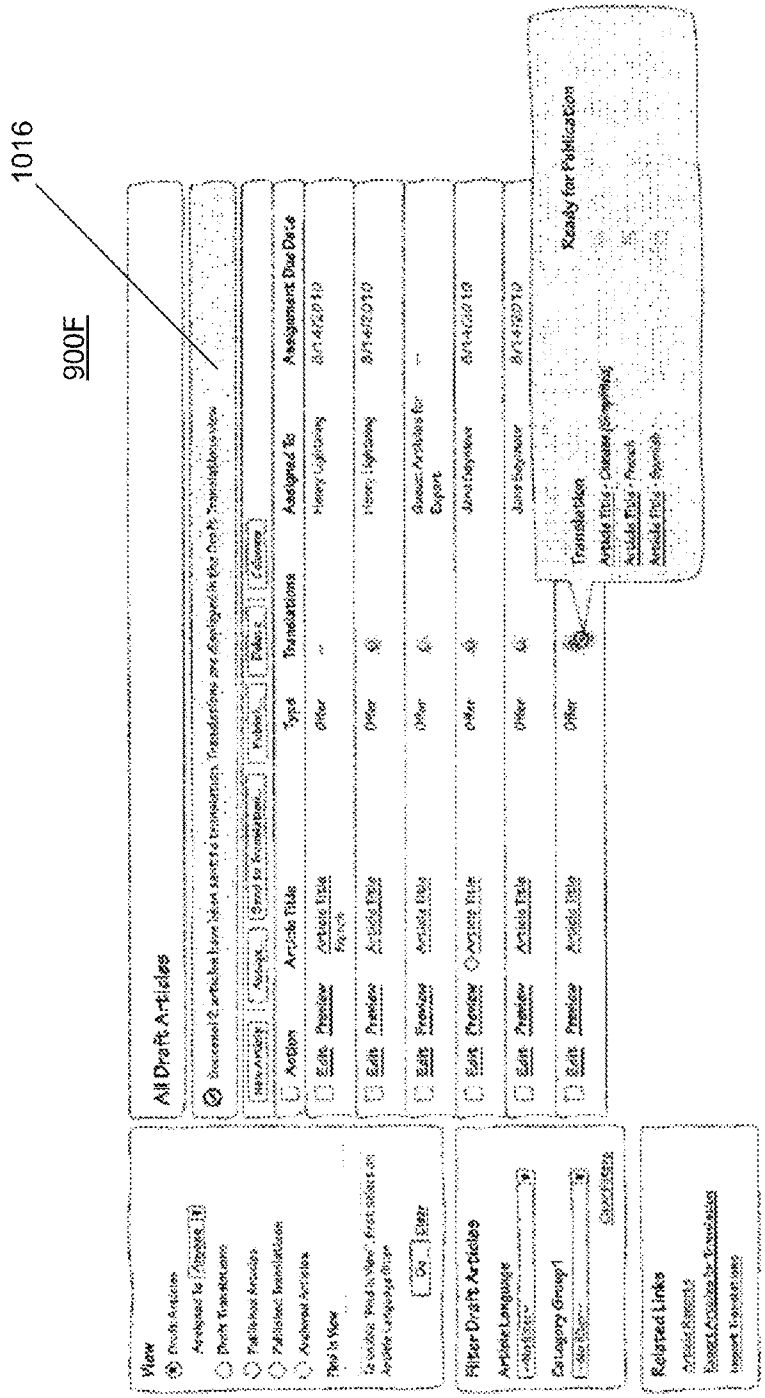

FIGS. 10A-10C show a series of screenshots of embodiments for translating articles. FIG. 10A shows an embodiment of the UI 900A of FIG. 9A for "All Draft Articles" 930 is shown with an article row 1000 checked or selected. Also shown the request (send to) translation tab 936 is also selected and may be used to request a translation, and bring a user to an overlay display page of a send to translation page 1002 shown in FIG. 10B, below for carrying out the process for requesting an article translation.

FIG. 10B shows a screenshot 1002 of an embodiment of a send to translation page 1002 overlay. Screenshot 1002 may include language selection column 1004, assignment column 1006, due date column 1008, email notification 1010, drop down assignment queue menu 1012, confirmation button 1014. In other embodiments, overlay page 1002 may not have all of the elements listed and/or may have other elements instead of or in addition to those listed.

The screenshot of FIG. 10B may be an embodiment of a webpage or other form of user interface 1002, which may be generated on a display of a user device for sending draft articles to be translated. Language selection column 1004 may be used to select target languages for an article to be translated into. Assignment column 1006 is used to assign the translation task to a queue. Drop down assignment queue menu 1012 may be used to assign the translation task. Due date column 1008 is a requested or required date that the translation should be completed by. Email notification 1010 may be used to notify the requestor when a translation of an article has been completed. Selection of confirmation button 1014 may send a user back to the UI 900A of FIG. 9A as shown in FIG. 10C.

FIG. 10C shows a screenshot of a webpage of an embodiment of UI 900F which includes status bar 1016 that appears to inform a user that the selected articles from the sent to translation overlay page 1002 have been successfully sent.

Figure 11A:
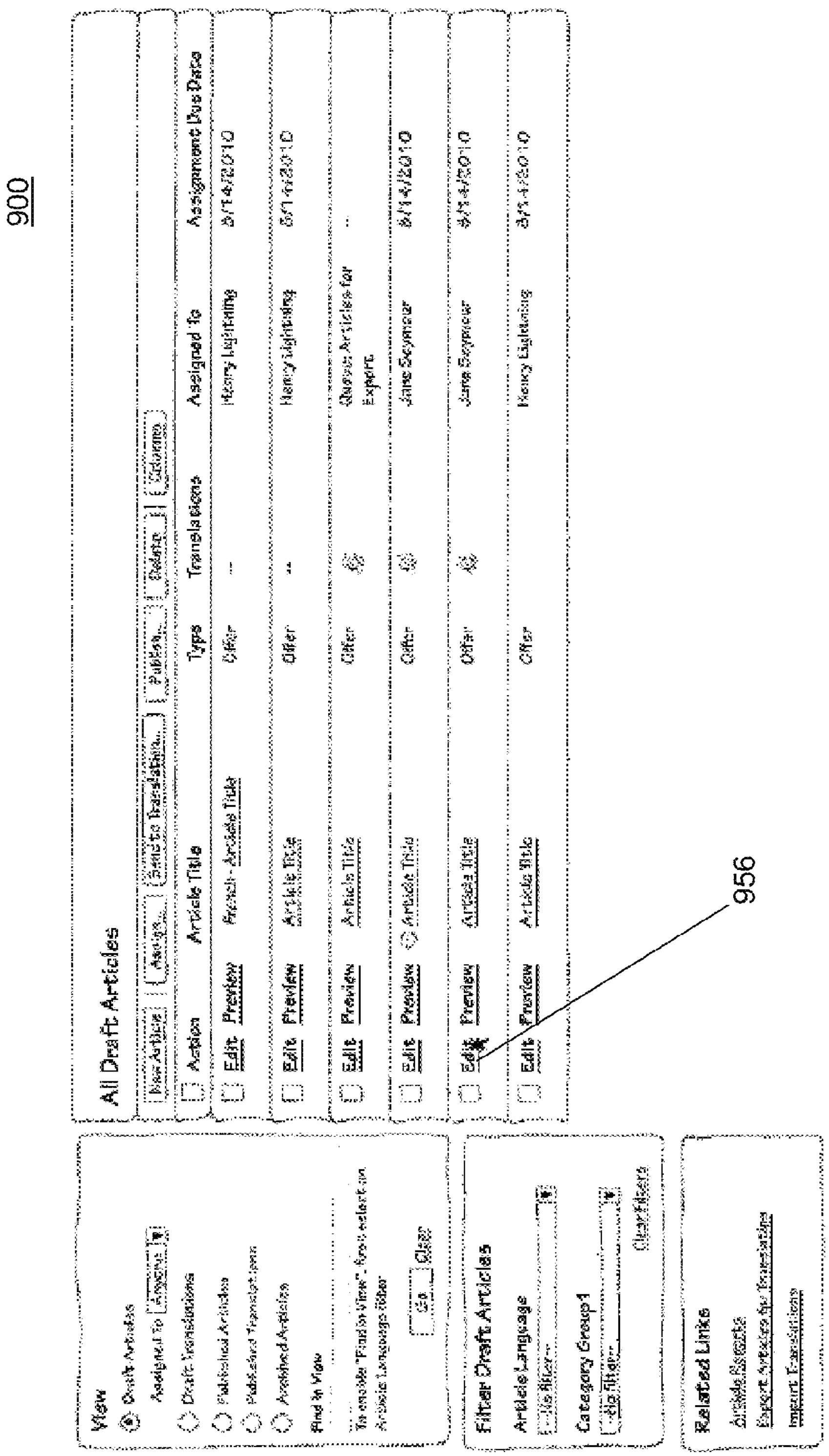
FIGS. 11A-11R show a series of screenshots of embodiments of webpages of a user interface for editing a source article in translation.
Figure 11B:
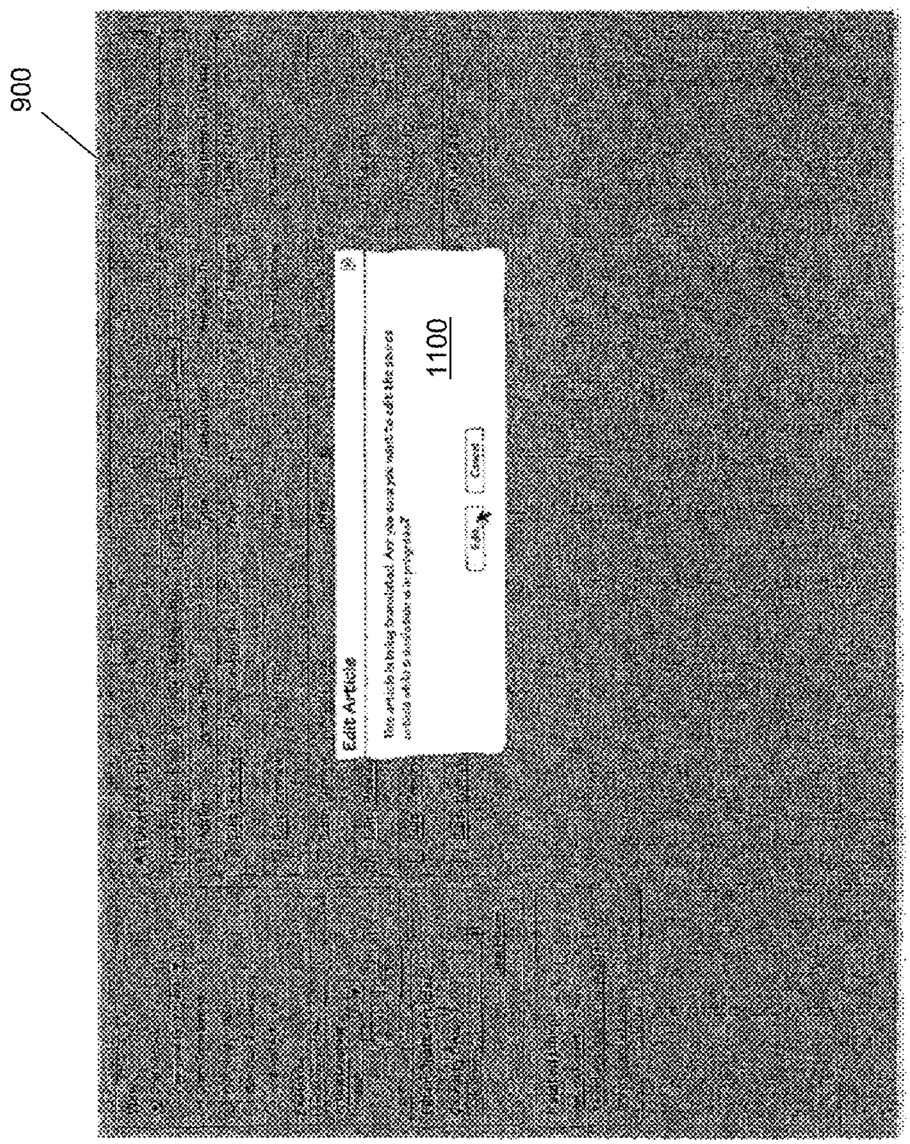
Figure 11C:
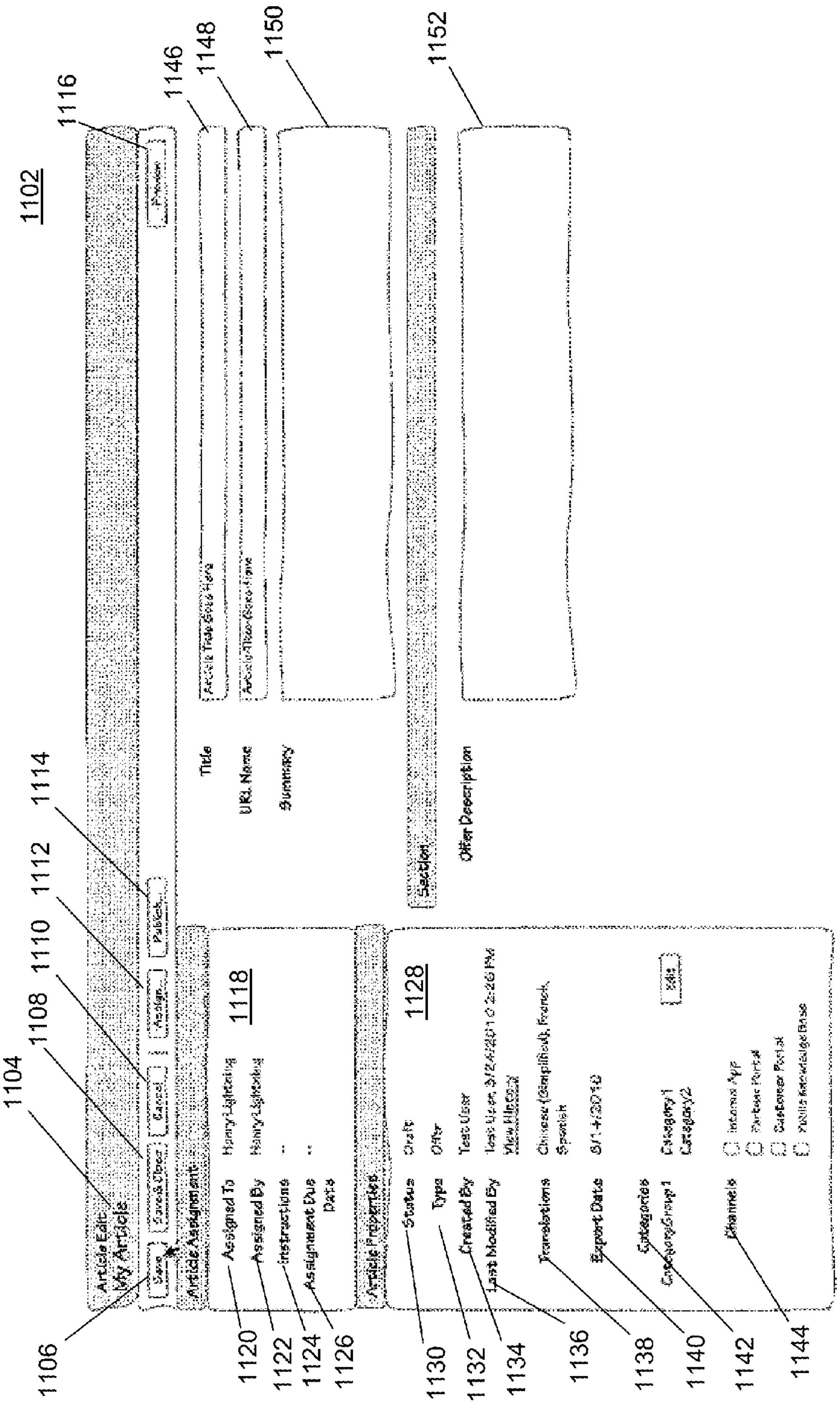
Figure 11D:
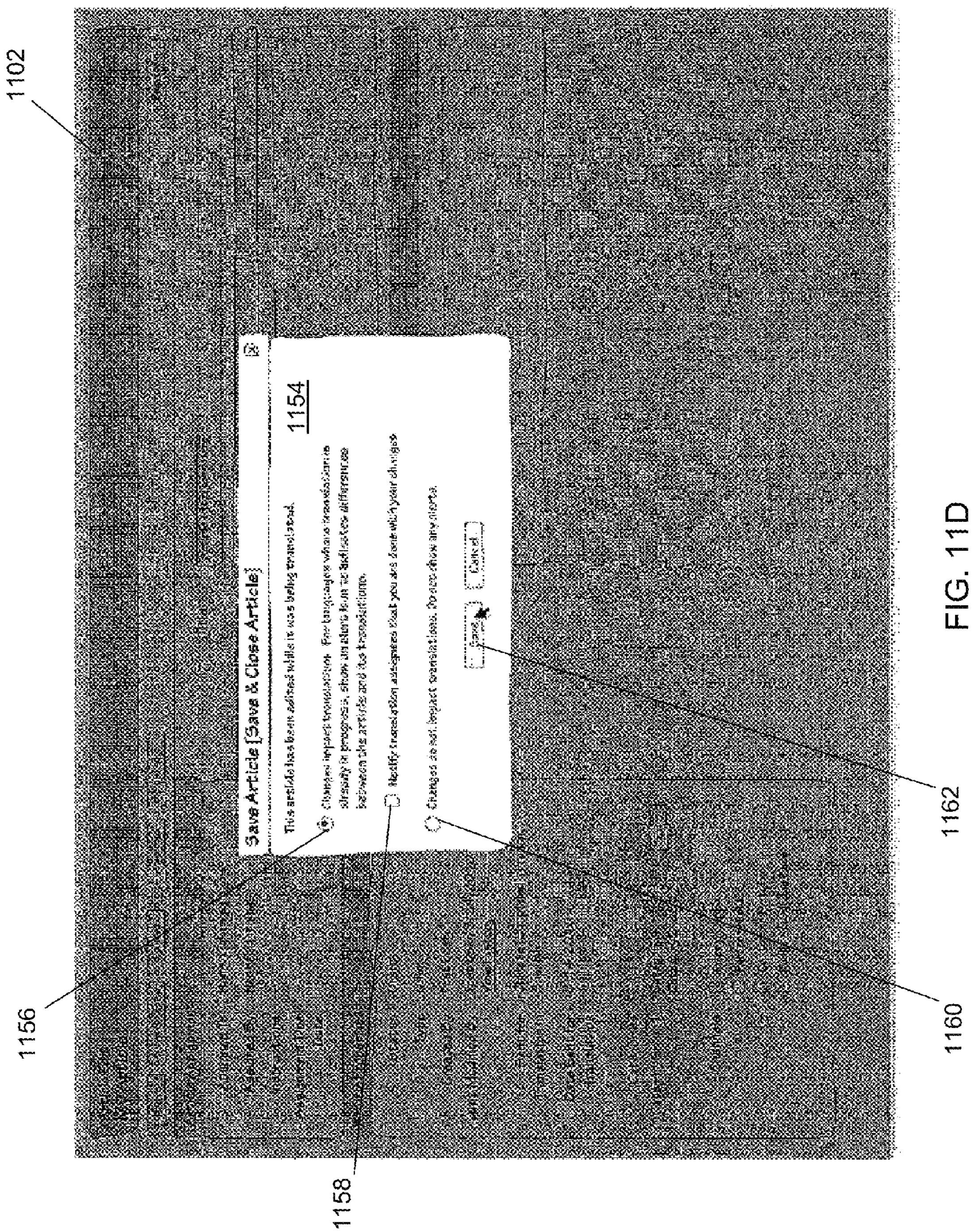
Figure 11E:
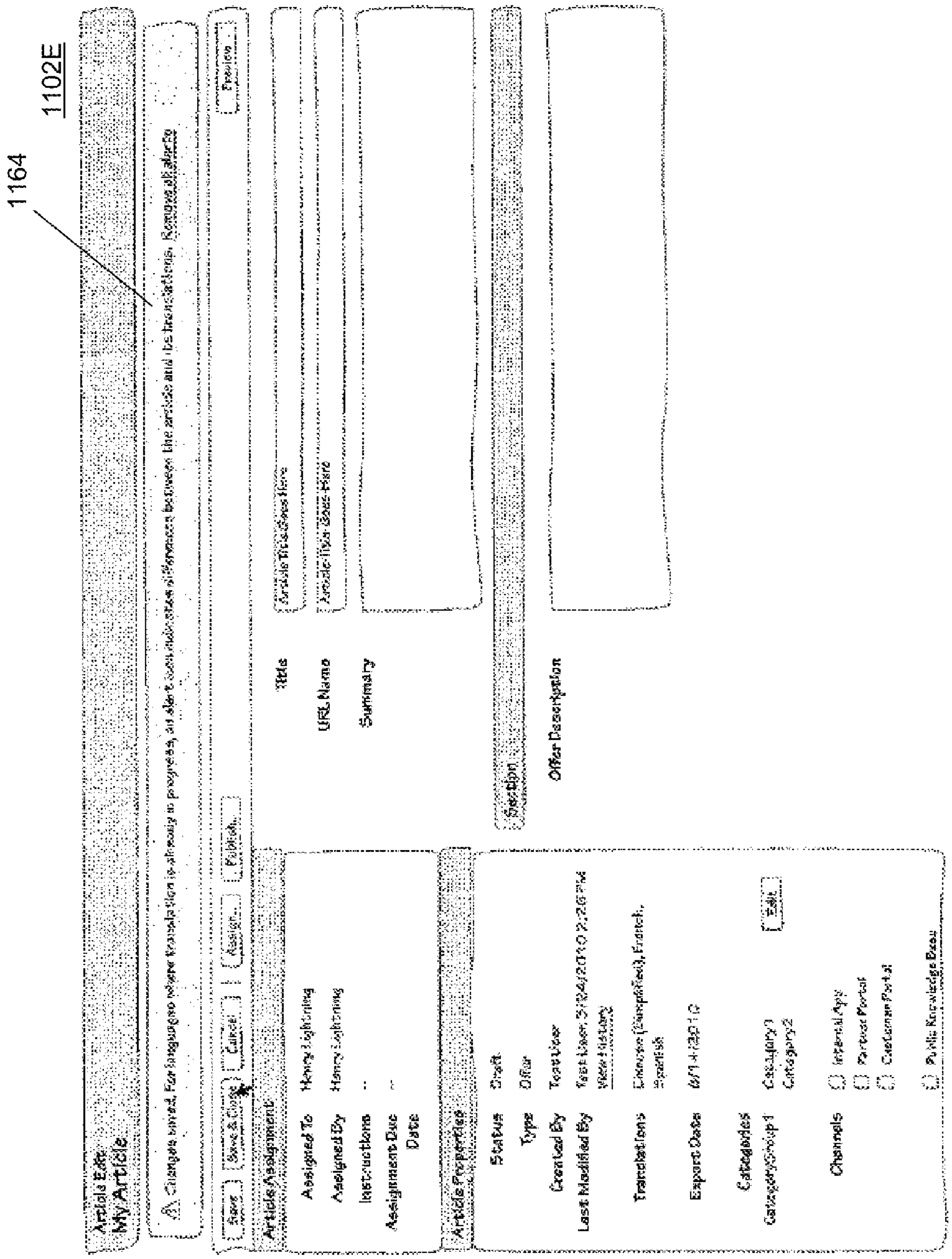
Figure 11F:
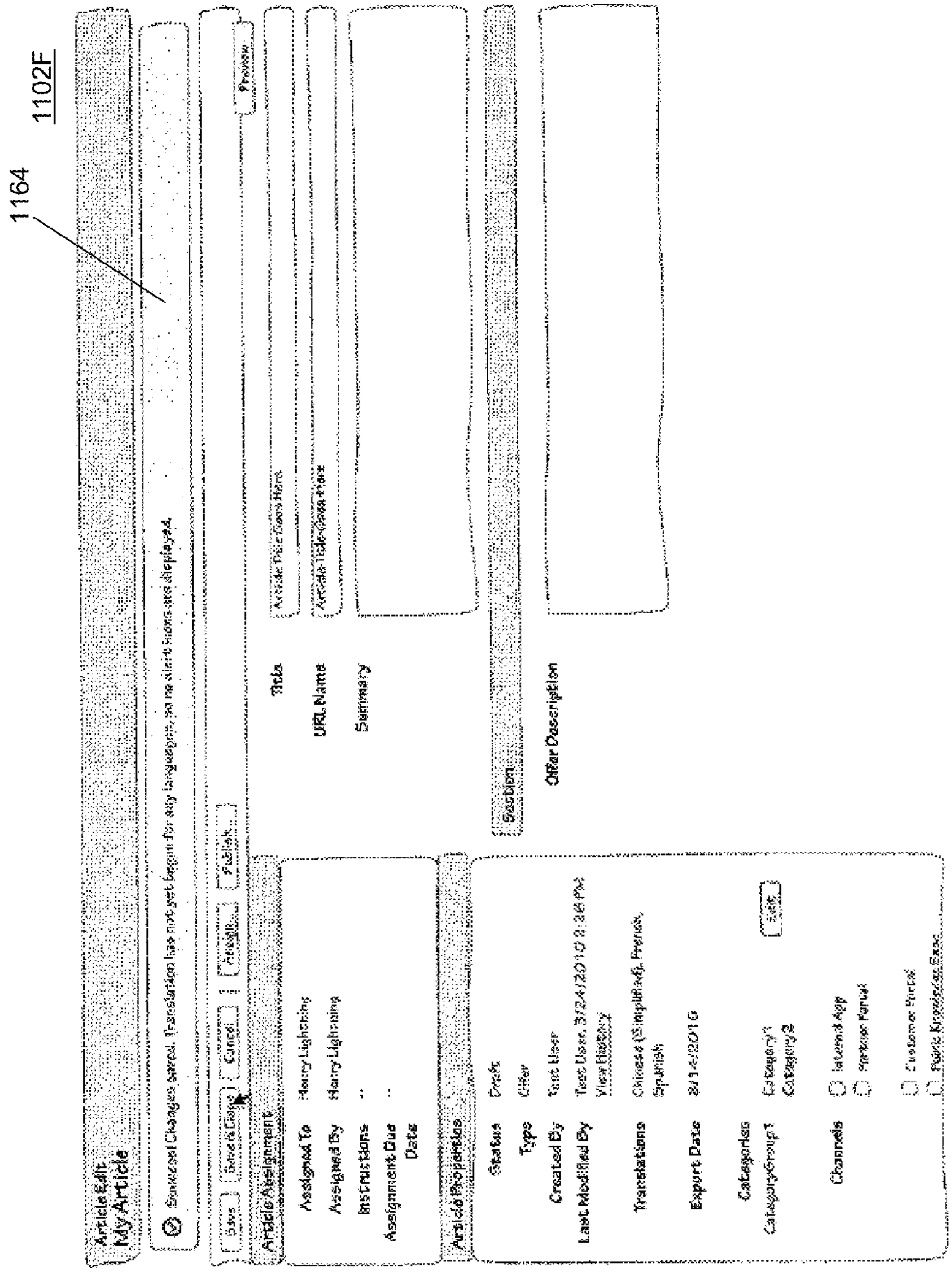
Figure 11G:
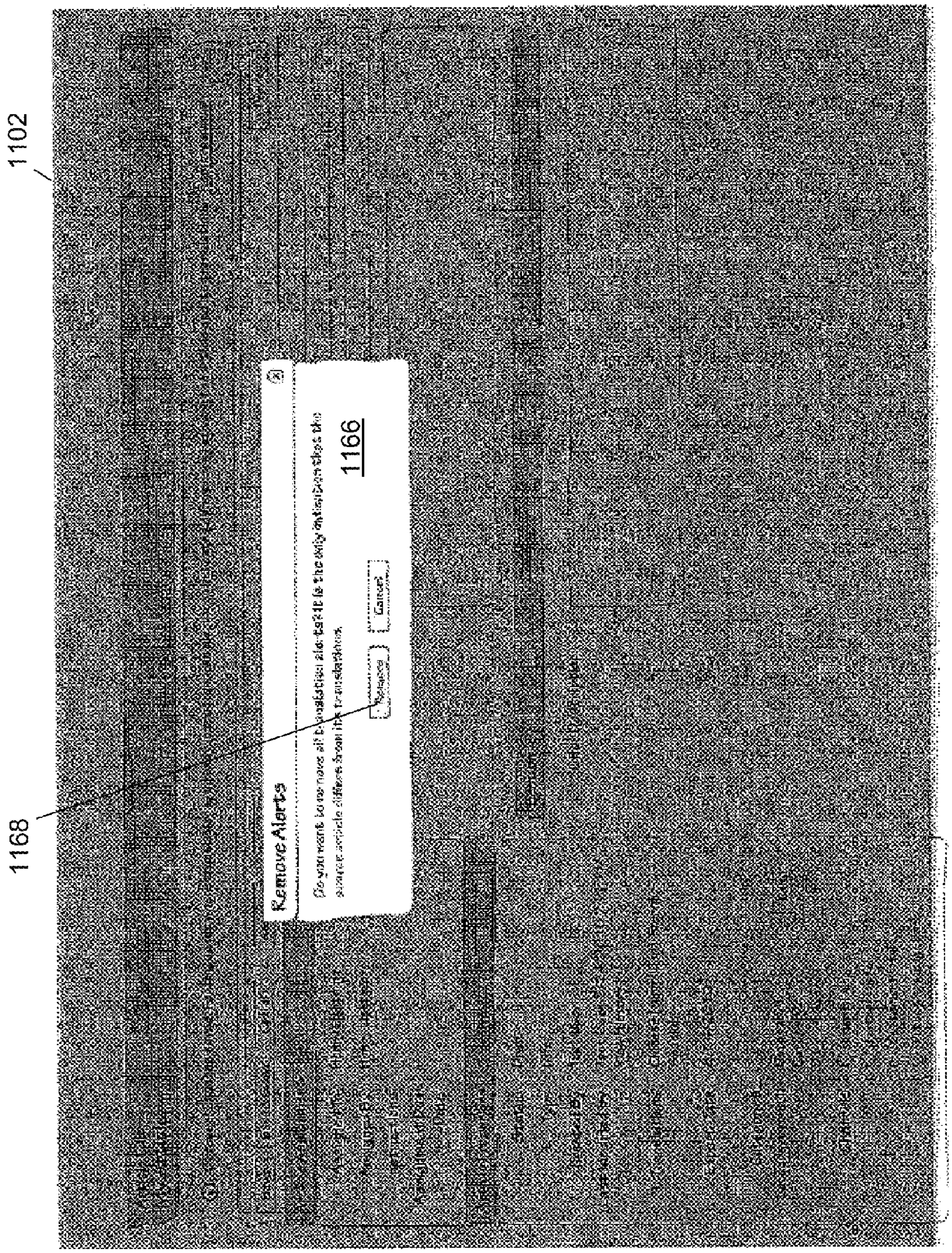
Figure 11H:
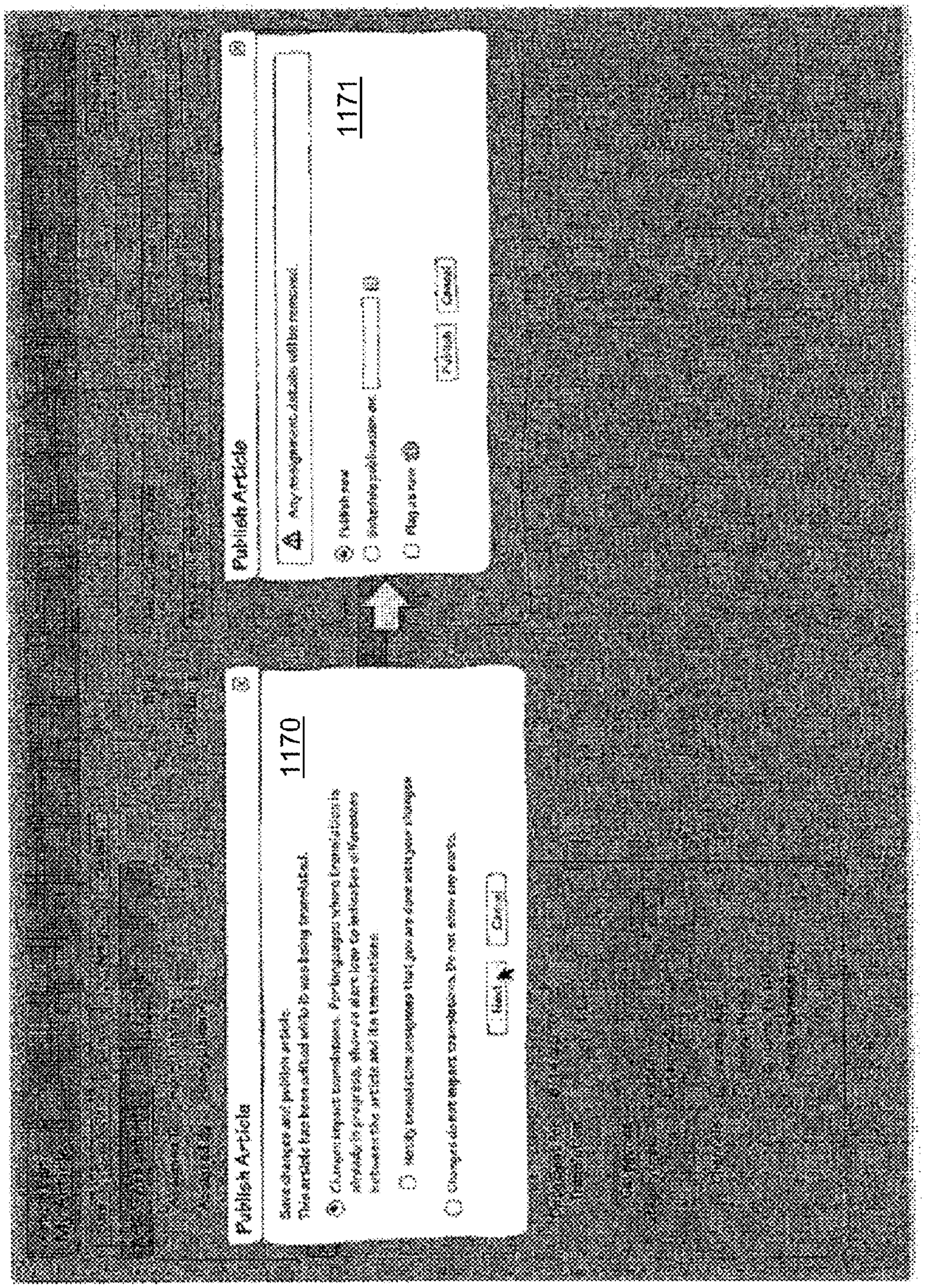
Figure 11I:
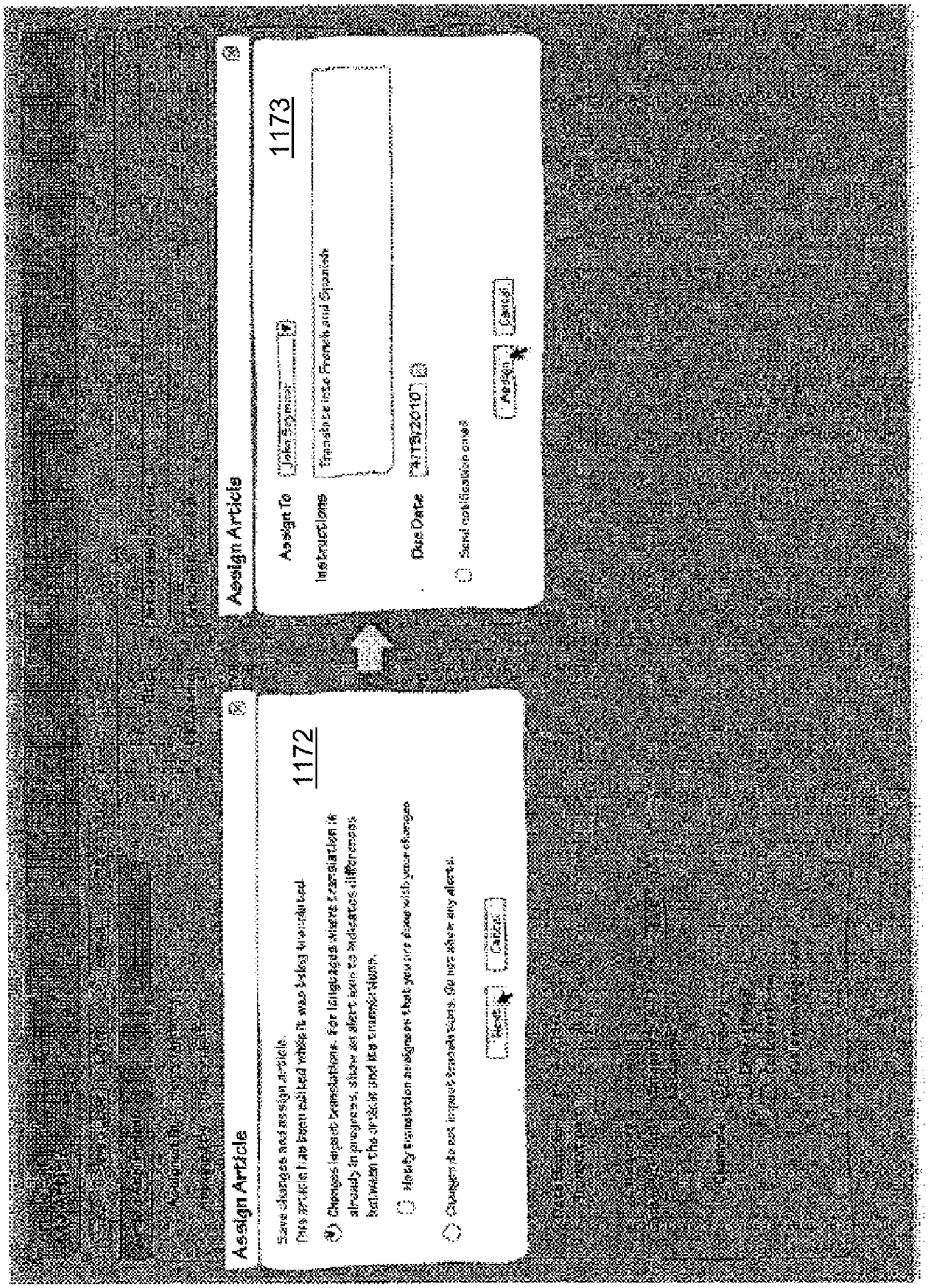
Figure 11J:
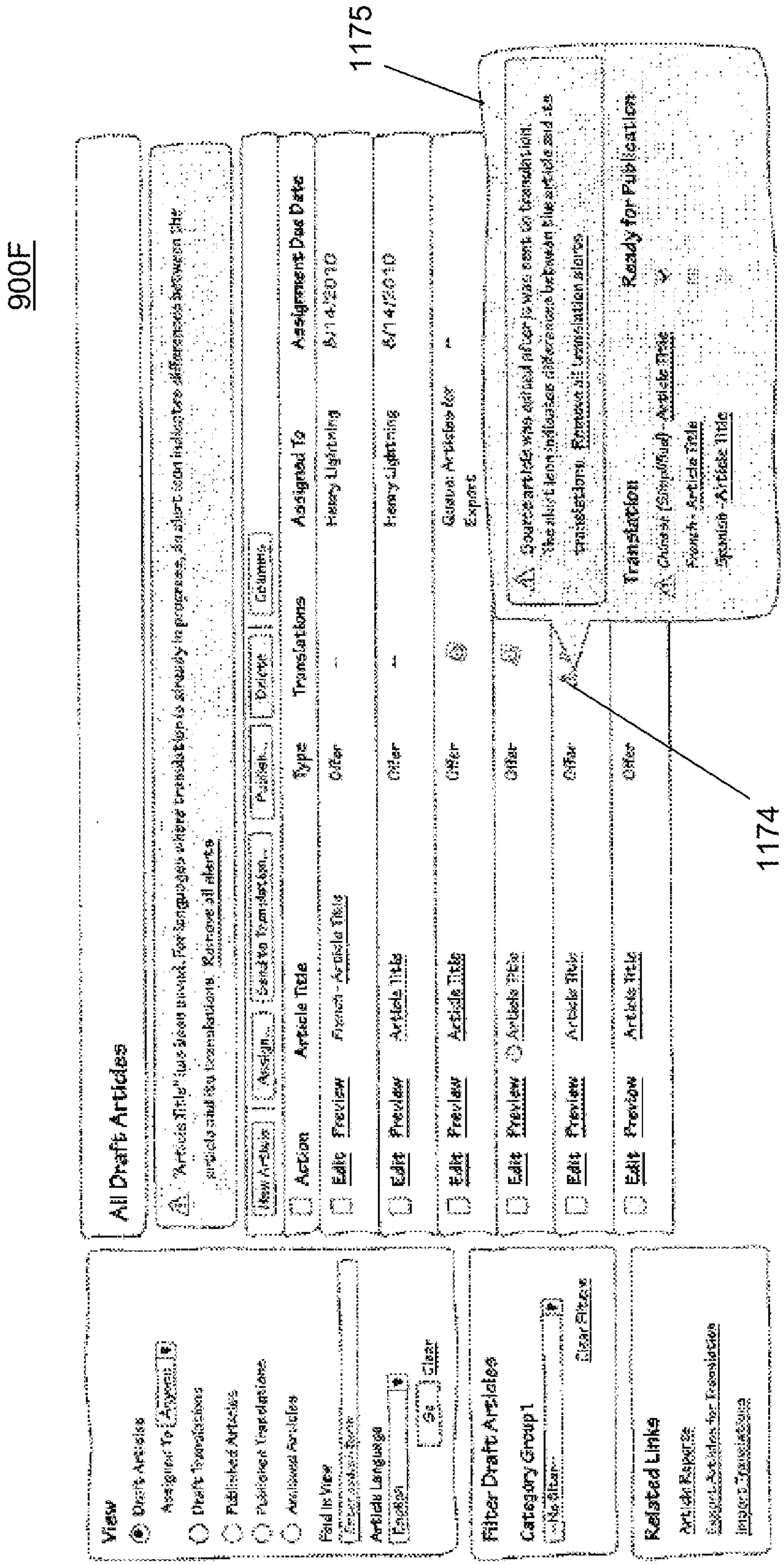
Figure 11K:
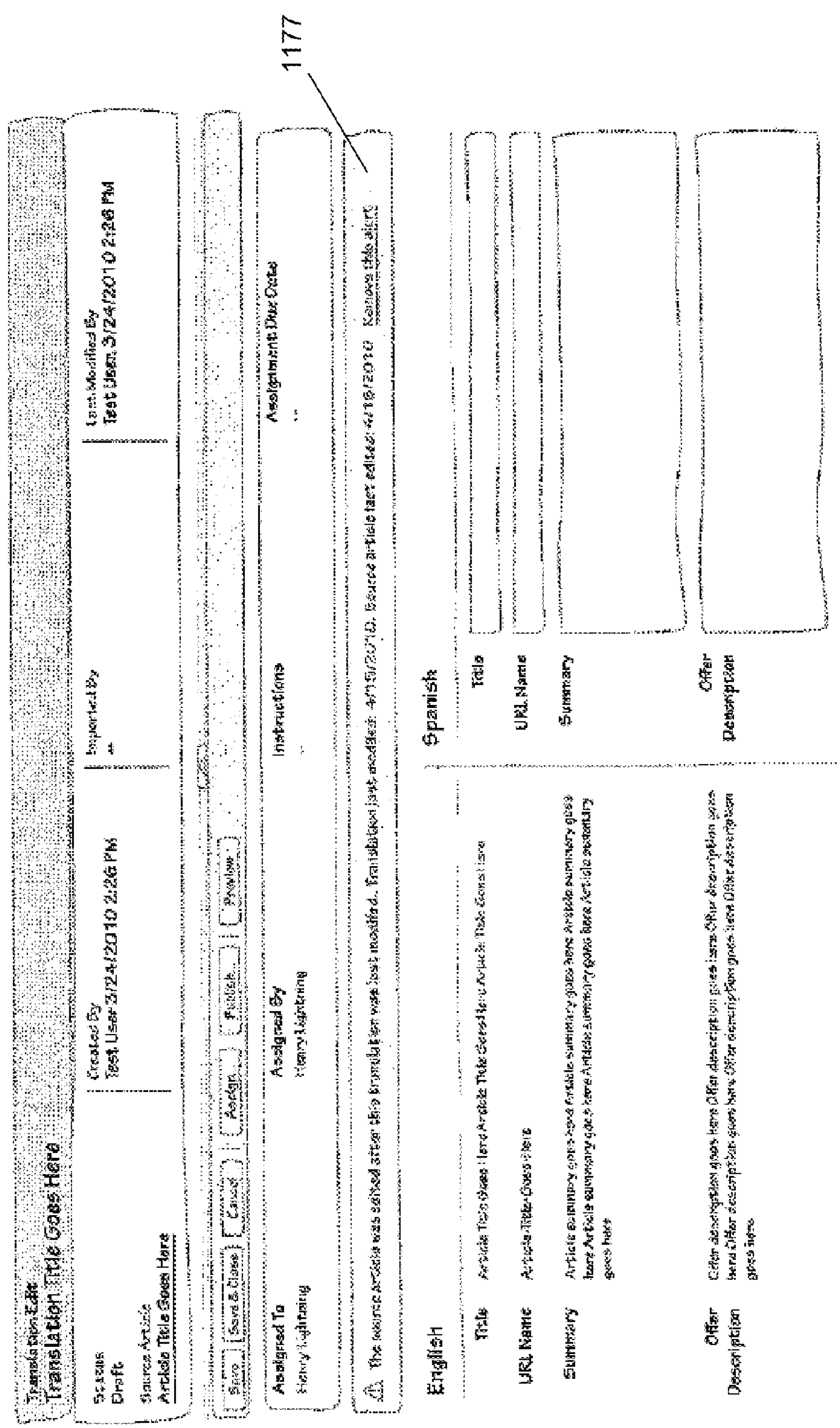
Figure 11L:
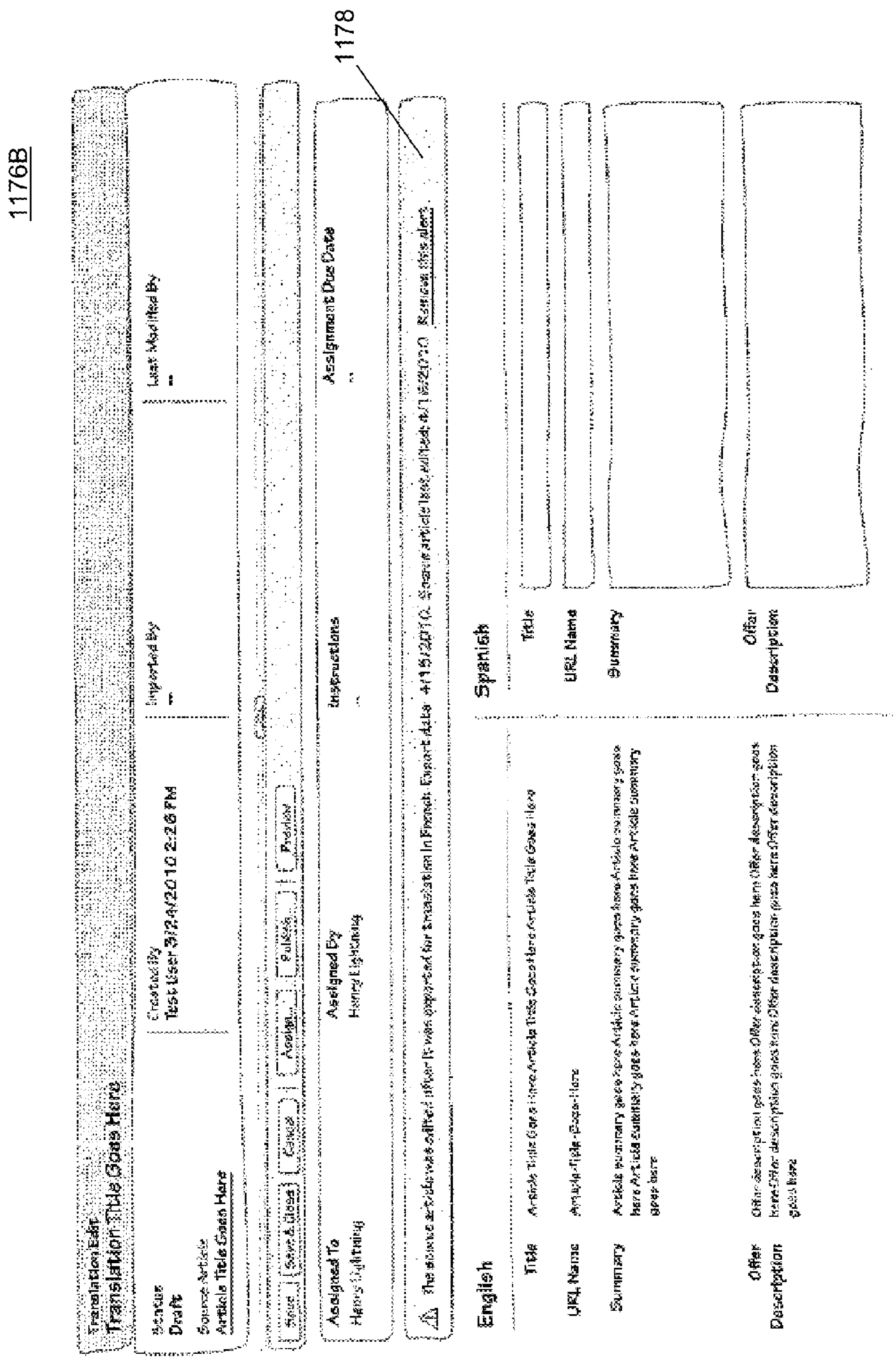
Figure 11N:
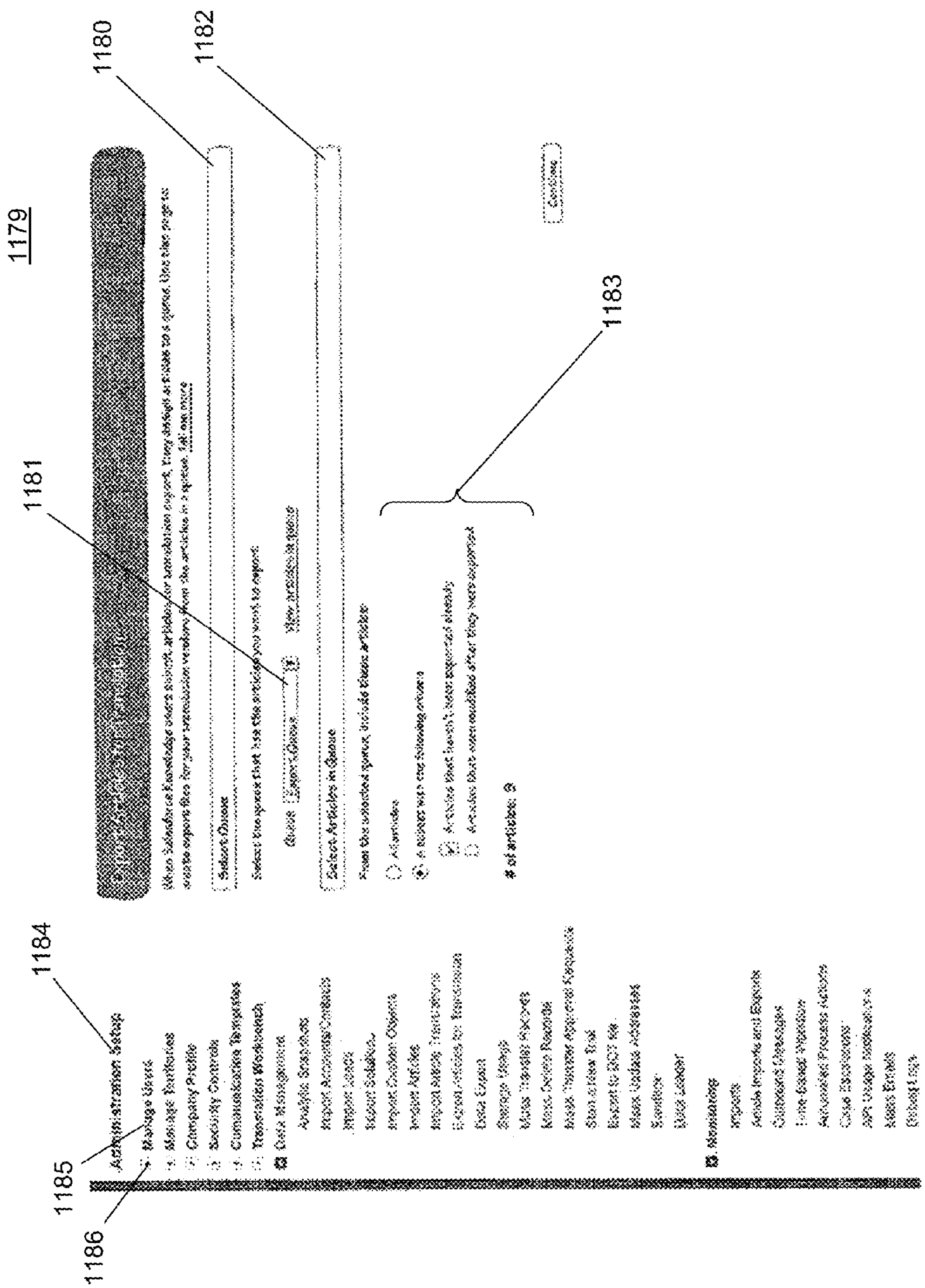
Figure 11O:
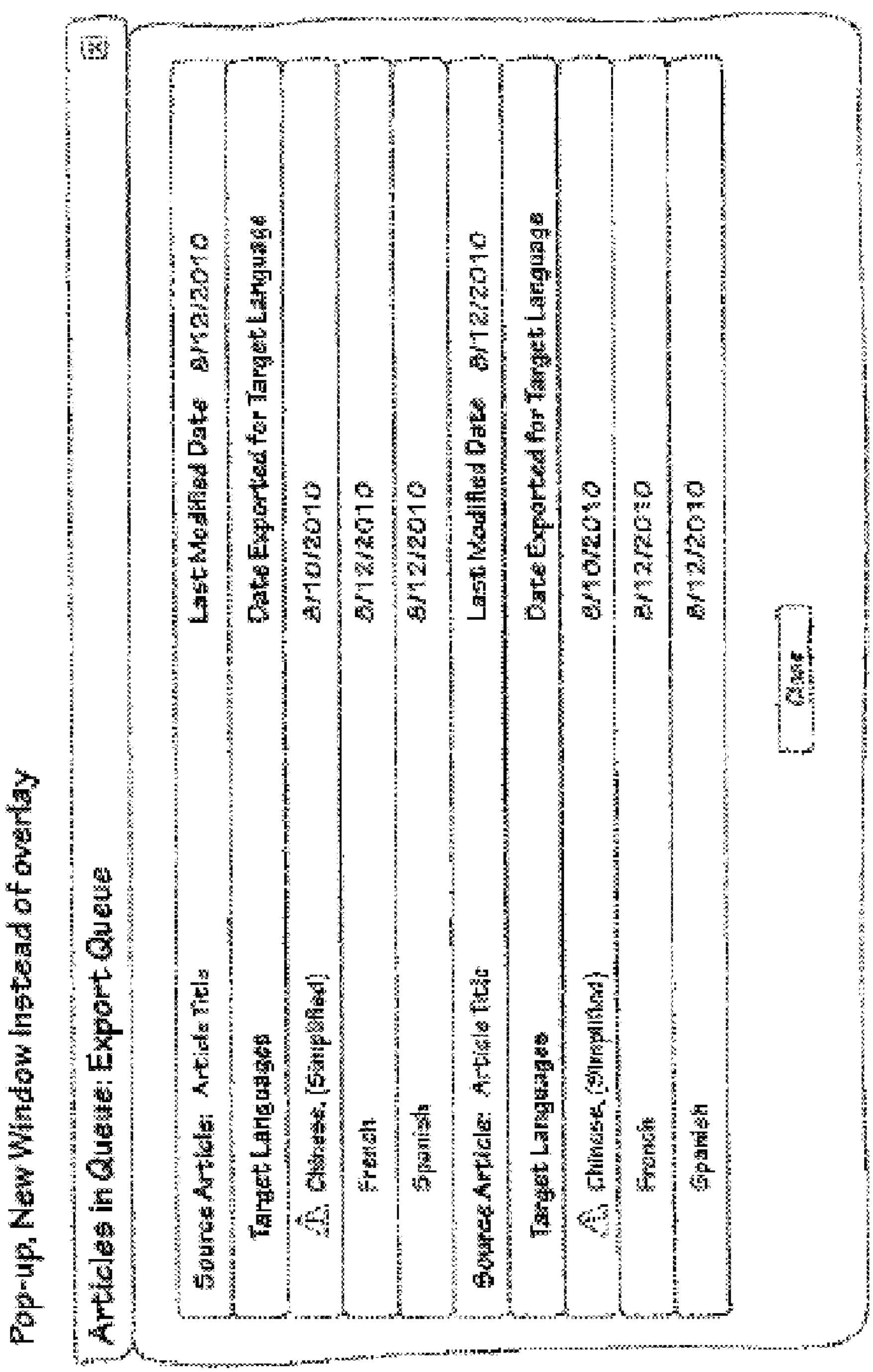
Figure 11P:
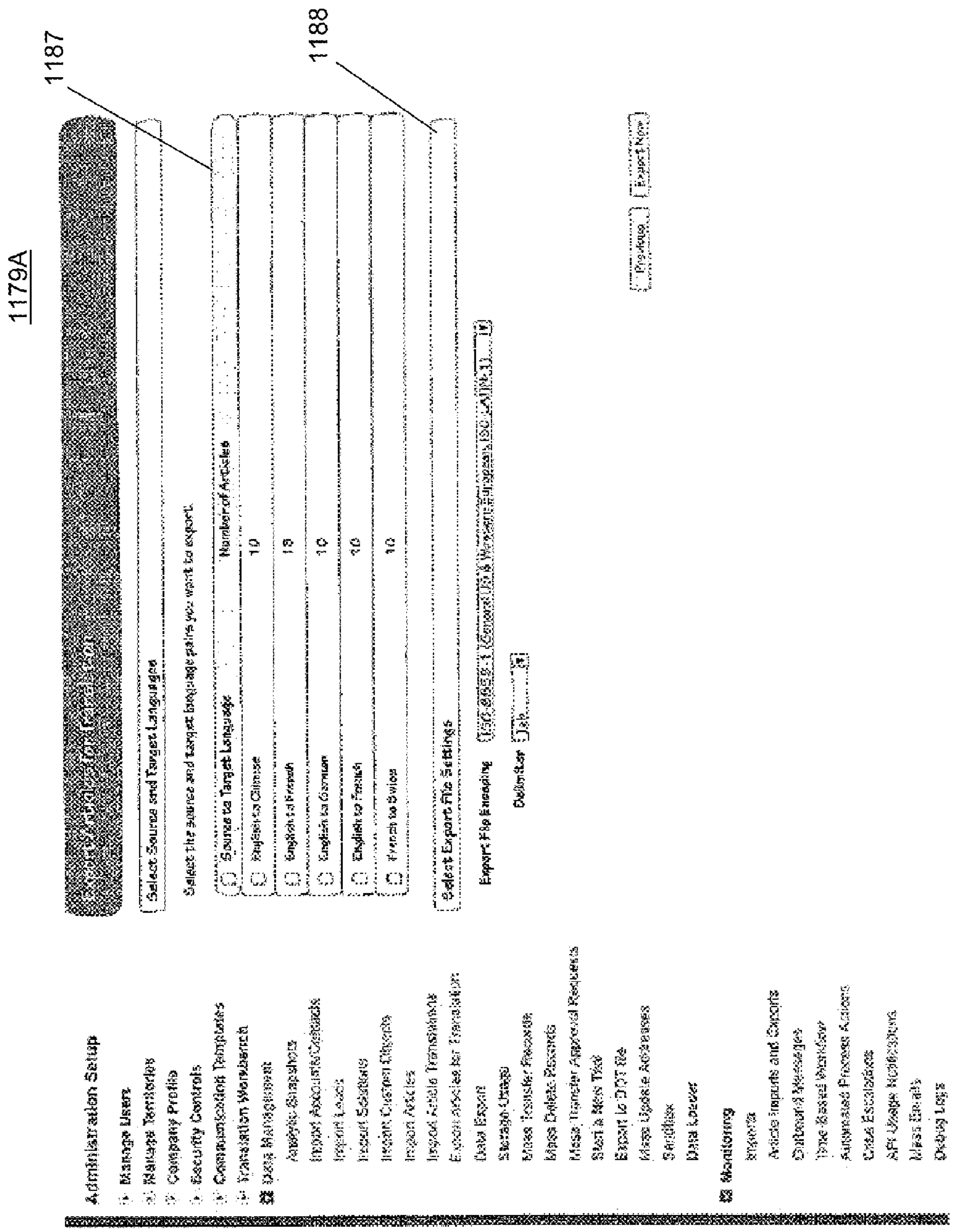
Figure 11Q:
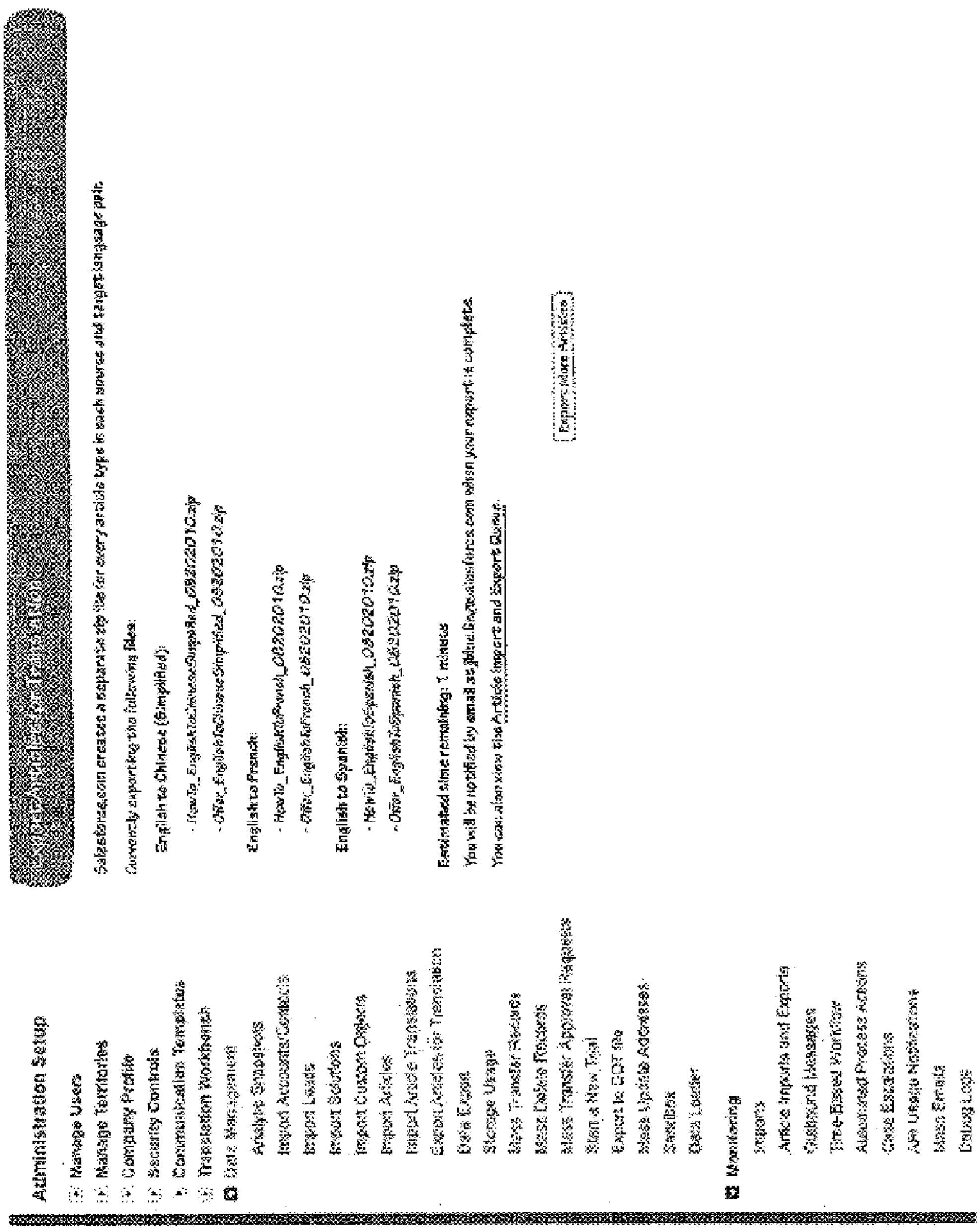
Figure 11R:
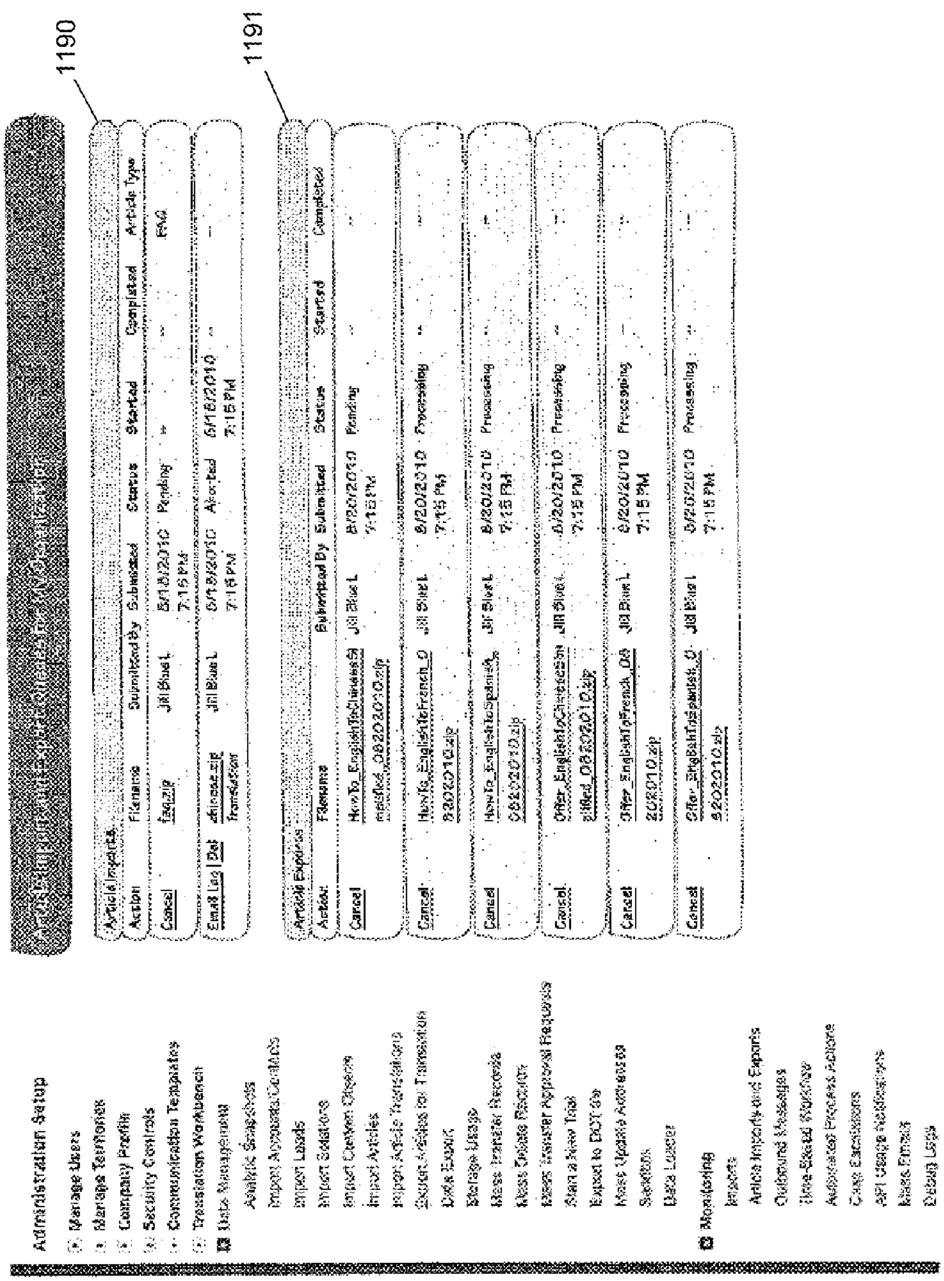

FIGS. 11A-11R show a series of screenshots of embodiments related to editing information about a source article in translation and assigning the article to an entity for revision. In the embodiment of FIG. 11A, which is a screenshot of FIG. 9A discussed above, a user selects the edit link 956, which may bring the user to an overlay display page of an edit advisory page 1100 shown in FIG. 11B. The edit advisory page 1100 informs the user that the article is being translated, and asks if the user wants to edit the information listed about the source article while a translation on the source is in progress.

FIG. 11C shows a screenshot of an embodiment of a user interface 1102 that stores information about details of an article. Screenshot 1102 may include page title 1104, save tab 1106, save & close tab 1108, cancel tab 1110, assign tab 1112, publish tab 1114, preview tab 1116, article assignment section 1118, assign to 1120, assigned by 1122, instructions 1124, assignment due date 1126, article properties 1128, status 1130, type 1132, created by 1134, last modified by 1136, translations 1138, export date 1140, categories 1142, channels 1144, title 1146, URL name 1148, summary 1150, offer description 1152. In other embodiments, webpage 1102 may not have all of the elements listed and/or may have other elements instead of or in addition to those listed.

In the embodiment of FIG. 11C the screenshot is an embodiment of a user interface 1102 that provides details of the article. Page title 1104 may provide the user with the title of the article to be edited. Save tab 1106 may allow the user to save the changes to the information about the article. Save & close tab 1108 save and closes the edit page 1102. The cancel tab 1110 cancels the changes made to the information about the article in user interface 1102. The assign tab 1112 assigns the editing task to a queue, user, or other entity. The publish tab 1114 may be used to publish an edited article. The preview tab 1116 may allow the previewing of an article that is being edited. The article assignment section 1118 provides details of whom an article was assigned to for editing including, assign to whom 1120, assigned by which party 1122, instructions for the editing 1124, and assignment due date 1126. The article properties 1128 section includes the status 1130 of the article to be edited (draft, published, archived), type 1132, article created by 1134, last modified by 1136, translations available 1138, export date of the article to be edited 1140, categories 1142, and channels (internal application, partner portal, customer portal, knowledgebase) 1144. The title 1146 is the name of the article. URL (universal resource locator) name 1148 is a Web searchable name of the article. The summary 1150 may provide a synopsis of the articles contents. The offer description 1152 may describe the particulars offered to a particular entity to write and/or edit the article. The elements of FIG. 11C are repeated in FIGS. 11E and 11F, and their description will not be repeated with reference to FIGS. 11E and 11F.

The selection of the save tab 1106 may generate the overlay page 1154 of FIG. 11D that advises users that the article was being edited while a translation of the article was ongoing. The user may have the option of notifying people that their editing or changes will impact translations in progress (1156), and alerts may be issued (1158) to indicate differences between the newly edited article and translations based on the unedited version of the article, or the user may indicate that the edits will not impact existing translations (1160). The selection of the save button 1162 closes the overlay 1154, and returns the user to FIG. 11E.

FIG. 11E illustrates a screenshot 1102E with an information bar 1164 with an alert that informs a user that the changes were saved, and that the languages for which translations were already in progress, an alert icon indicating the differences between the article and translations based on the article has been generated. Conversely in FIG. 11F, the screenshot 1102F has an information bar that informs the user that the changes were successfully accomplished, and no translations have been started for the article thereby no alerts are required.

FIG. 11G illustrates an overlay for removing alerts 1166. The overlay 1166 may provide the user with the option to remove translation alerts, while warning them that the alerts are the only indication that the source article potentially differs from the translations. The remove button 1168 removes the alerts.

FIG. 11H illustrates overlays 1170 and 1171 for publishing articles that have been edited, and have translations that are in progress.

FIG. 11I illustrates overlays 1172 and 1173 for assigning articles to a queue that have been edited for translation FIG. 11J illustrates UI 900F with an alert 1174, which expands into a pop up window 1175 when the alert is selected to show which translations were affected by the edits to the source document.

FIGS. 11K and 11L both illustrate translation edit details screenshot 1176A and 1176B, respectively, with information fields and selections, which were explained with reference to similar screenshots previously and will not be explained in detail here. In screenshot 1176A of FIG. 11K, a user is alerted (1177) that the source article was edited after the translation was last edited. In screenshot 1176B of FIG. 11L, a user is alerted (1178) that the source article was edited after it was exported for translation.

FIG. 11M is an example of an email notification that may be generated in response to the user checking off an email notification selection such as 1010 shown in FIG. 10B.

FIG. 11N illustrates an administrative screenshot 1179 for exporting articles for translation. Administrative Screenshot 1179 may include queue selection section 1180, queue pull down menu 1181, select article in Queue section 1182, article selection criteria 1183, administrative setup section 1184, control categories 1185, and expander icons 1186. In other embodiments, webpage 1179 may not have all of the elements listed and/or may have other elements instead of or in addition to those listed.

Queue selection section 1180 allows a user to select translation queues that have articles they want to export. Queue pull down menu 1181 is a list of current export queues with articles to translate that may be selected. Select article in Queue section 1182 allows a user to select which articles in a selected queue to be exported. Article selection criteria 1183 are parameters of which articles to select from the selected queue to export. Administrative setup section 1184 provides management controls for various functions and users. Control categories 1185 are the various functions and users available for the administrator to control. Expander icons 1186 are selected to provide further subcategories under each of the control categories. The administrative setup section 1184 also appears in FIGS. 11P, 11Q, 11R, 12A, and 12B, and the description for administrative setup section 1184 will not be repeated in FIGS. 11P, 11Q, 11R, 12A, and 12B.

FIG. 11O is a pop-up in a new window and is not an overlay of "Articles in Export Queue" which provides information on source articles and the target languages for article in export queue for translation.

FIG. 11P illustrates an administrative screenshot 1179A for exporting articles for translation. Menu 1187 allows the user to select source and target language pairs for export. Menu 1188 allows the user to select export file settings.

FIG. 11Q illustrates an administrative screenshot 1179B for exporting articles for translation. Screenshot 1179B provides a user with information on the articles currently being exported.

FIG. 11R illustrates an administrative screenshot of "Articles Import and Export Queues for My Organization" 1189 of an overview of articles that are being imported and exported in the queues. Article import section 1190 provides information and status on articles in the process of being imported, or have been aborted. Article export section 1191 provides information and status on articles in the process of being exported.

Figure 12A:
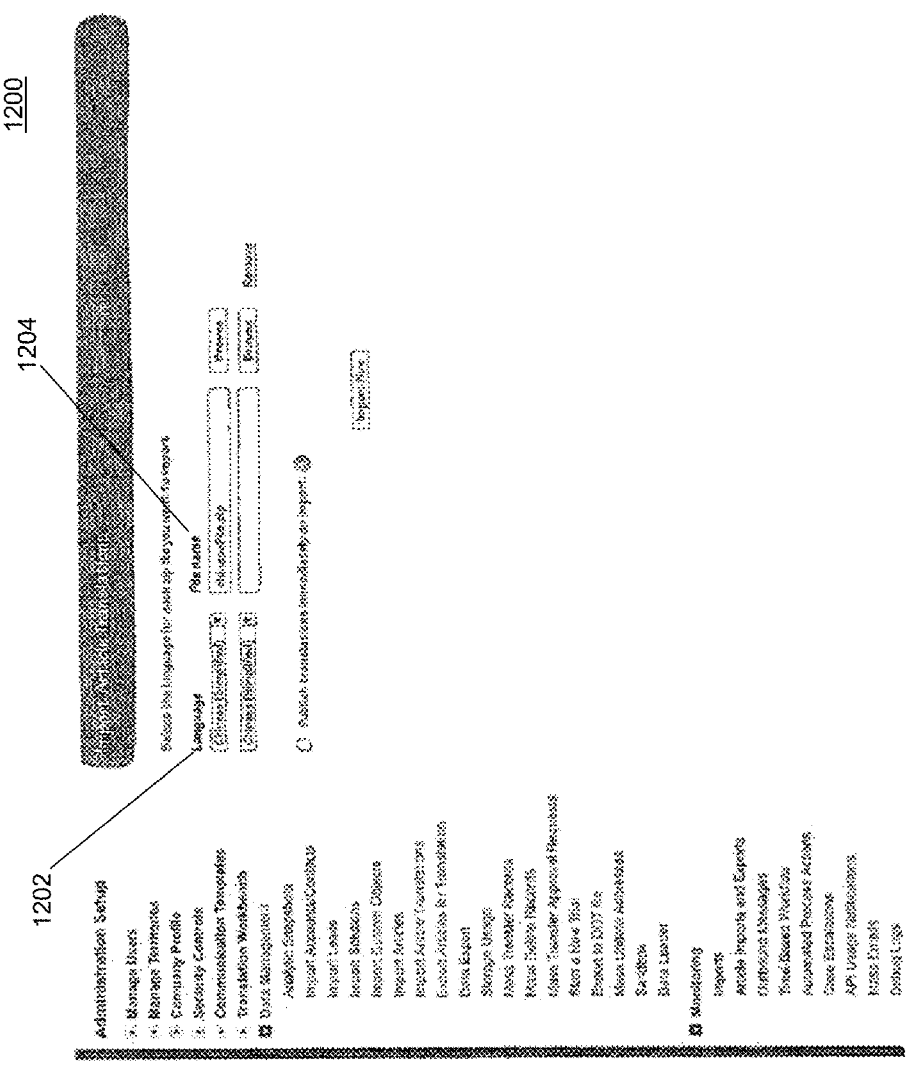
FIGS. 12A-12B show a series of screenshots of embodiments of webpages of a user interface for importing articles.
Figure 12B:
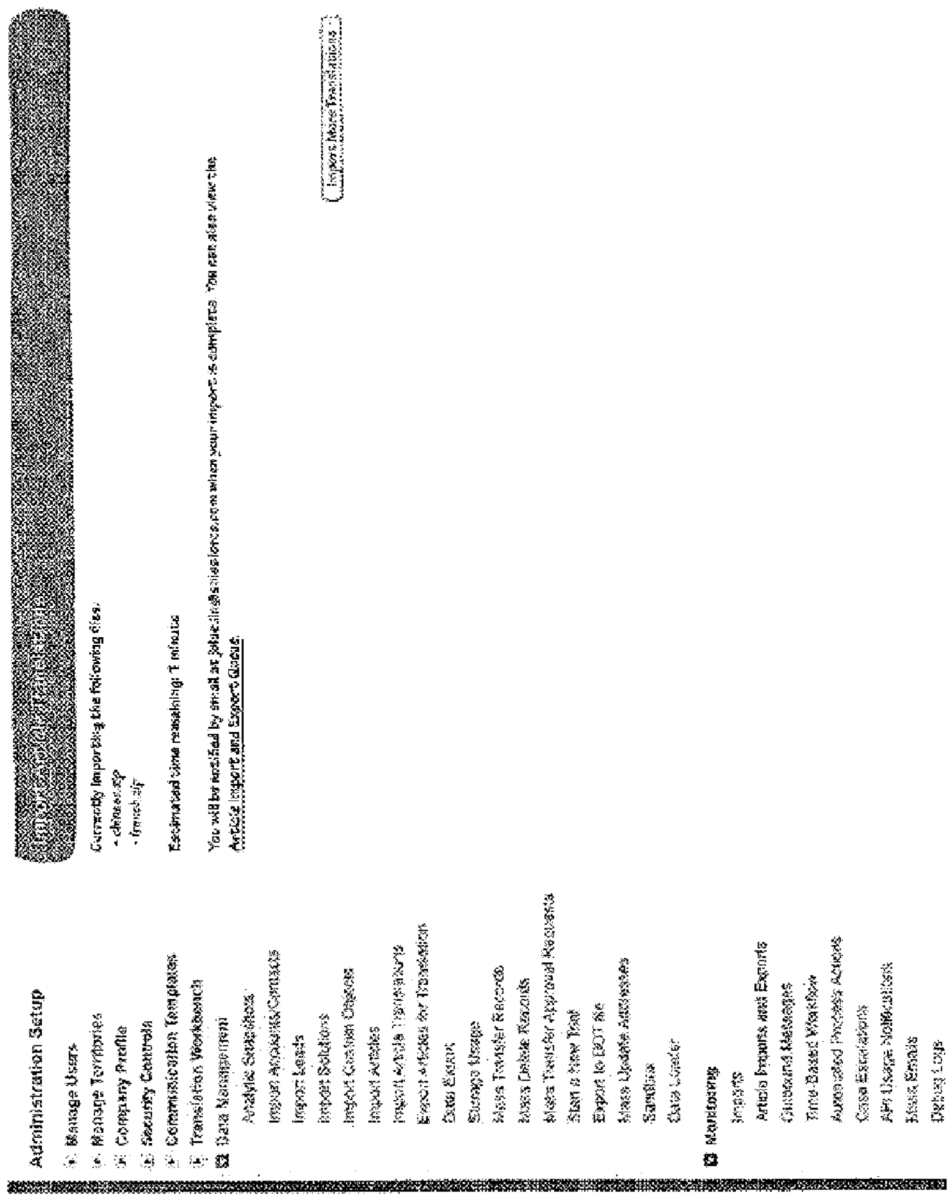

FIGS. 12A-12B show a series of screenshots of embodiments for importing articles by an administrator. FIG. 12A illustrates a screenshot of "Import Article Translations" 1200 that provides the user with the ability to select languages for each file to be imported. Language selection 1202 is a series of pull down menus for setting import languages. File name 1204 displays the filename associated with the language selected for import.

FIG. 12B illustrates a screenshot of "Import Article Translations" 1200A that provides the user with information on which files are currently being imported including the file names and time left until the importing is completed. A user may also be notified by email when the import is completed.

Figure 13A:
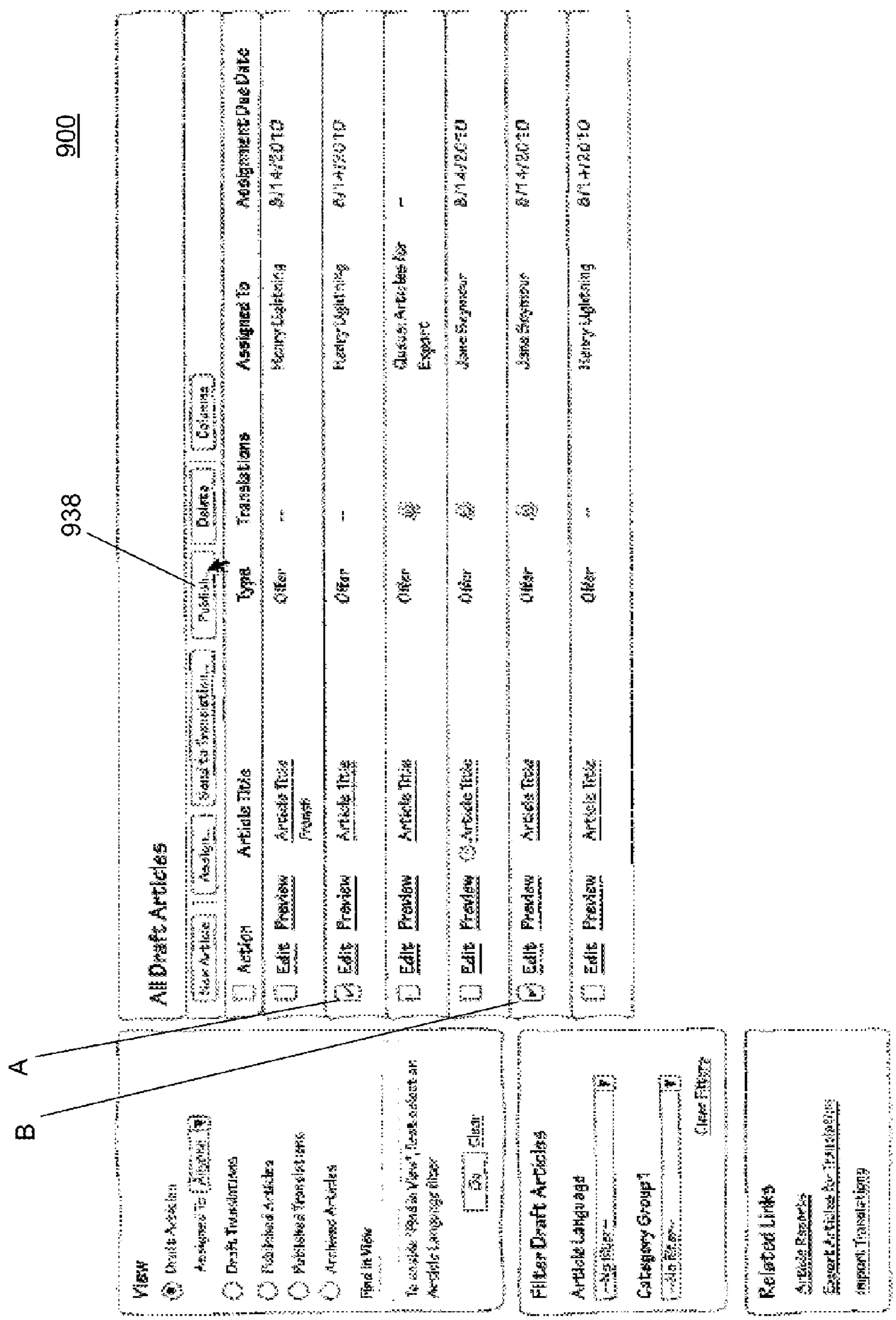
FIGS. 13A-13C show a series of screenshots of embodiments of webpages of a user interface for publishing articles.
Figure 13B:
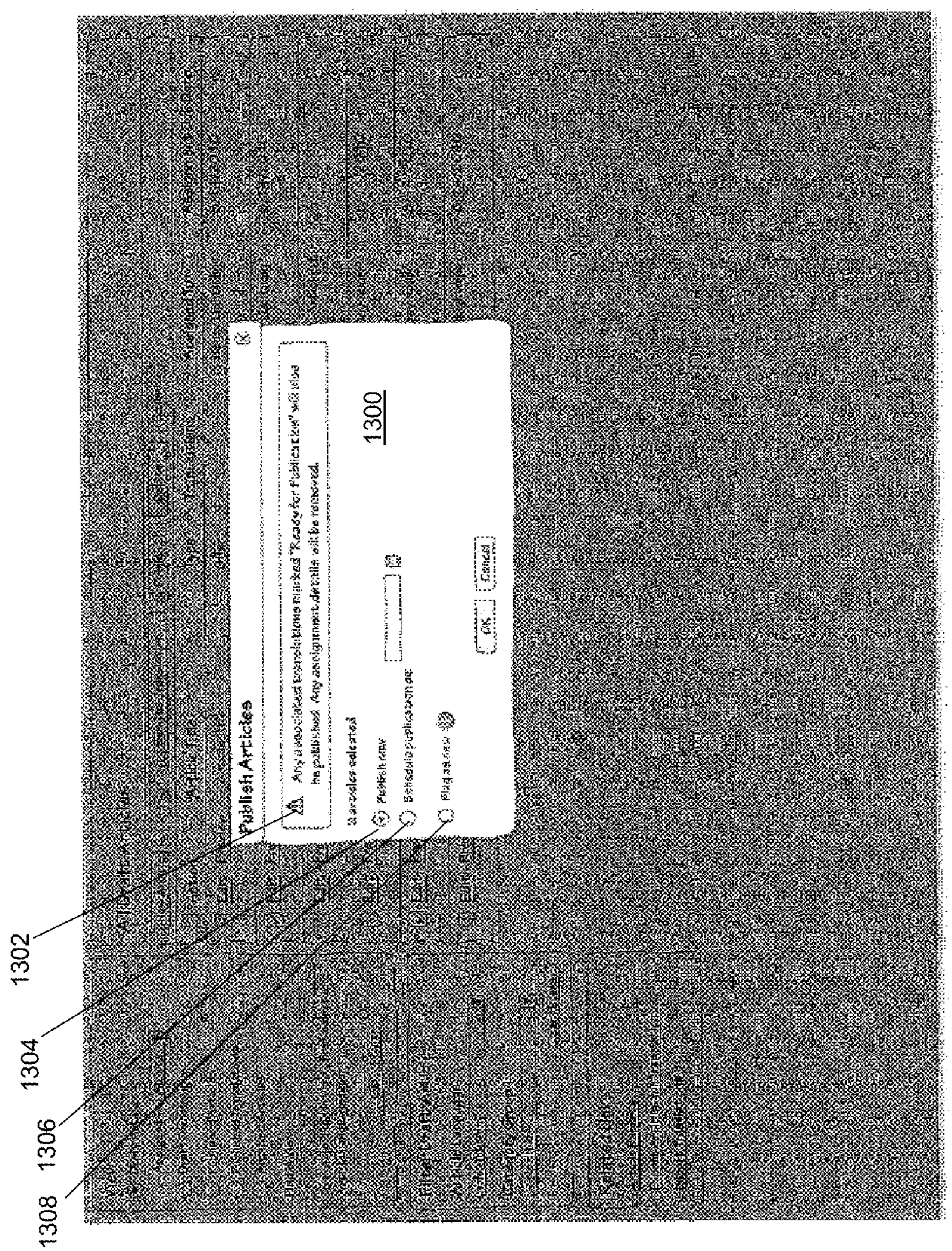
Figure 13C:
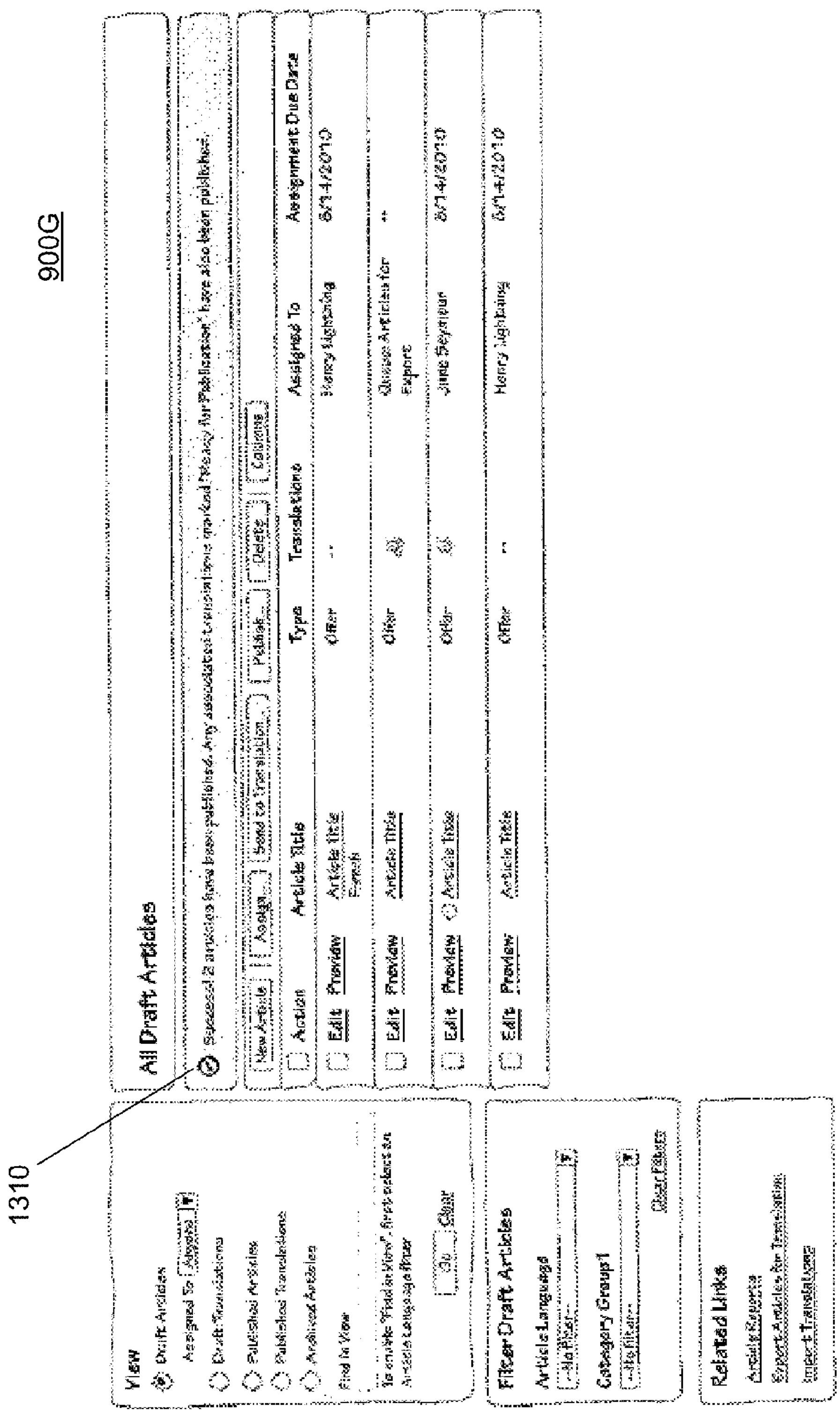

FIGS. 13A-13C show a series of screenshots of embodiments for publishing articles. FIG. 13A shows an embodiment of a webpage of UI 900A that includes a list of all draft articles. UI 900A of FIG. 13A shows publish tab 938 being selected causing the publish articles overlay 1300 shown in FIG. 13B to be displayed. Also shown are two rows selected with check marks (A, B) that represent two articles selected for publication.

In FIG. 13B the publish article overlay 1300 informs the user through an alert box 1302 of information related to the publish action. The user may chose to publish now 1304, schedule publication on a specified date 1306, or flag as a new publication.

In FIG. 13C a UI 900G of an embodiment of a translation view and editor is shown with a notification 1310 that the two selected articles have been successfully published.

Figure 14A:
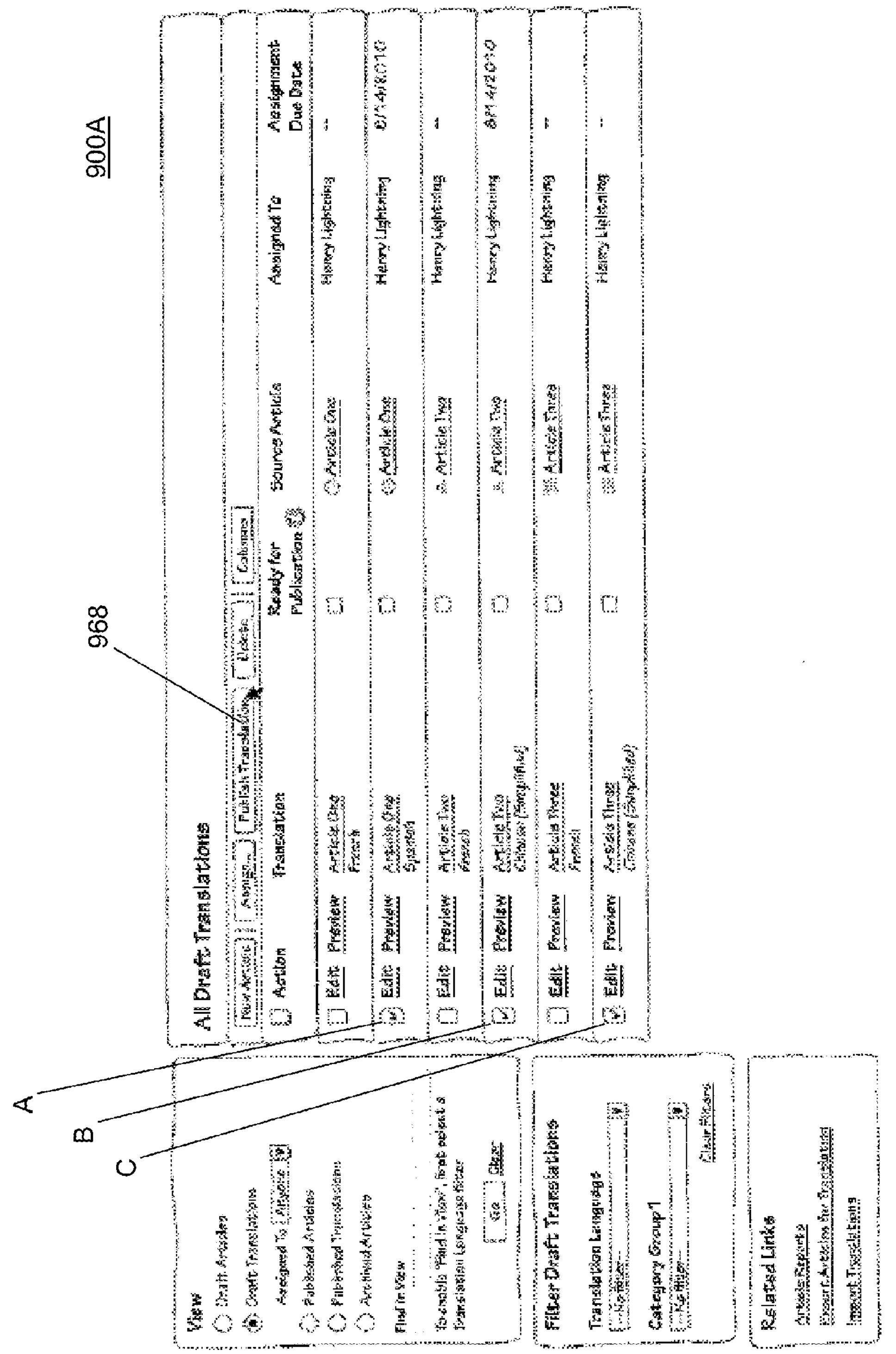
FIGS. 14A-14C show a series of screenshots of embodiments of webpages of a user interface for publishing translations.
Figure 14B:
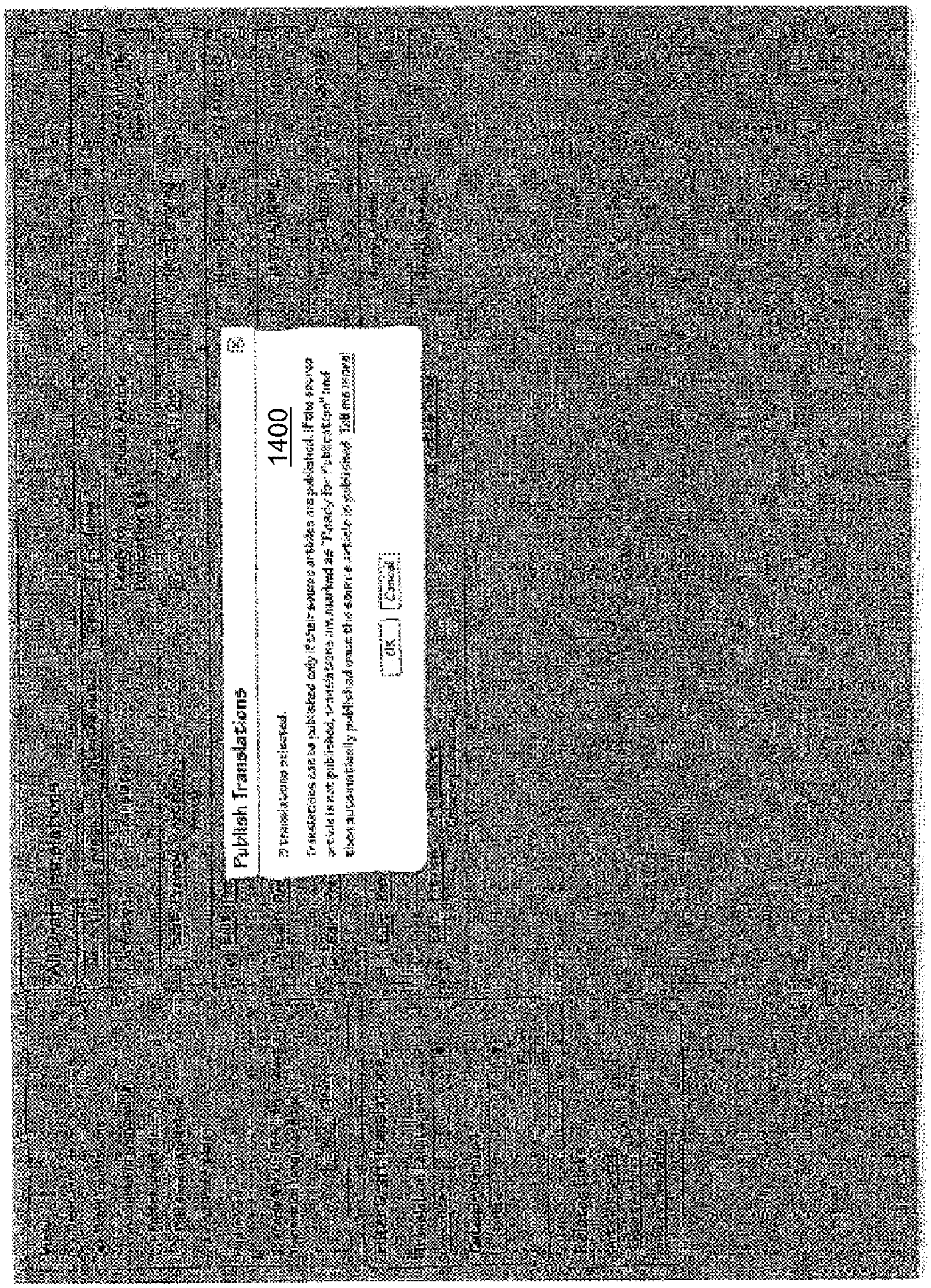
Figure 14C:
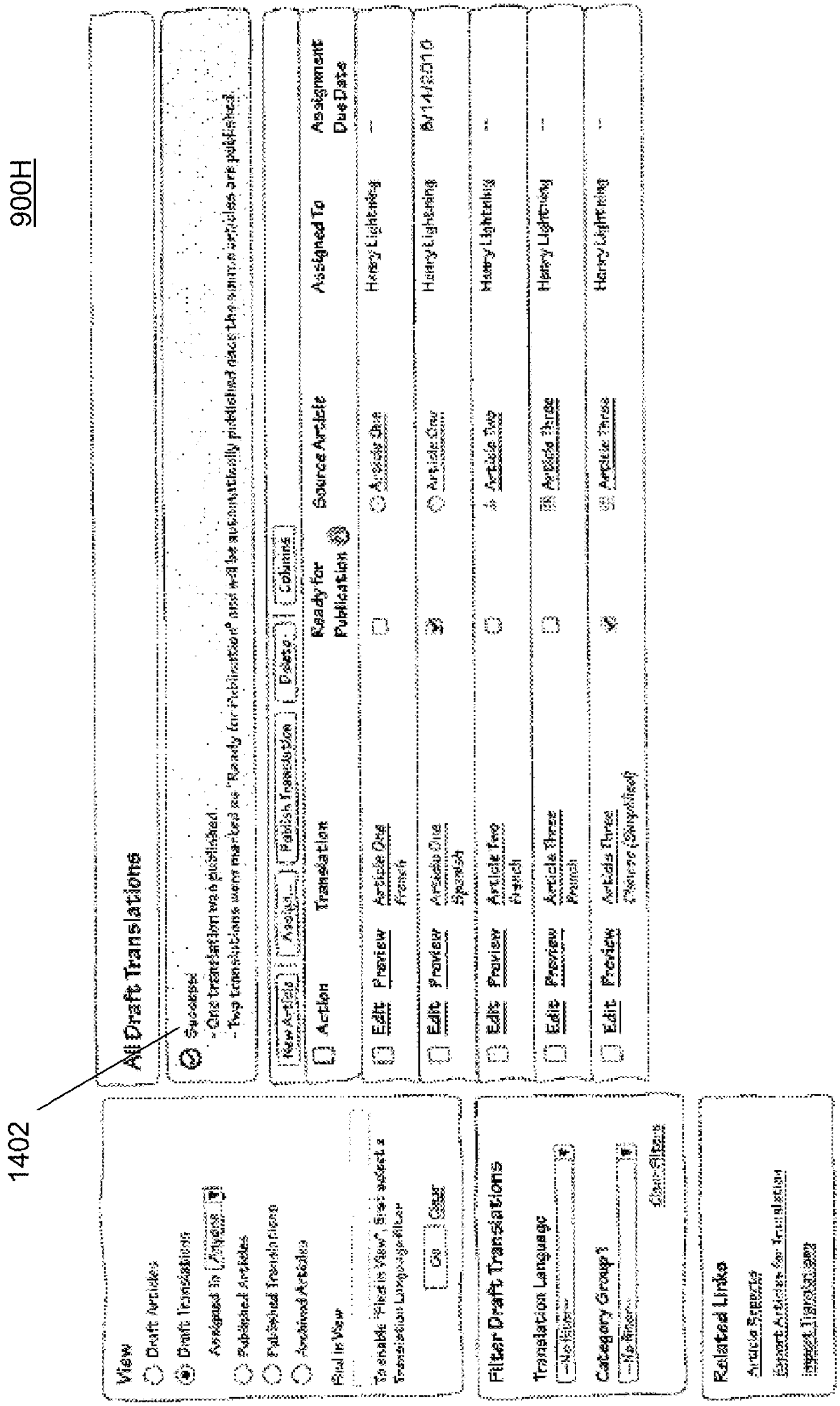

FIGS. 14A-14C show a series of screenshots of embodiments for publishing translations. In FIG. 14A a UI 900B of an embodiment of a translation view and editor is shown with the publish translation tab 968 being selected causing the publish translation overlay 1400 shown in FIG. 14B. Also shown are three rows selected with check marks (A, B, C) that represent three articles selected for translation In FIG. 14B the publish translation overlay 1400 informs the user that three translations are selected and that translations can be published only if their source articles are published, or as ready for publication if the source article has not been published.

In FIG. 14C a UI 900H of an embodiment of a translation view and editor is shown with a notification 1402 that one selected translation has been published, and two translations are ready for publication.

Figure 15A:
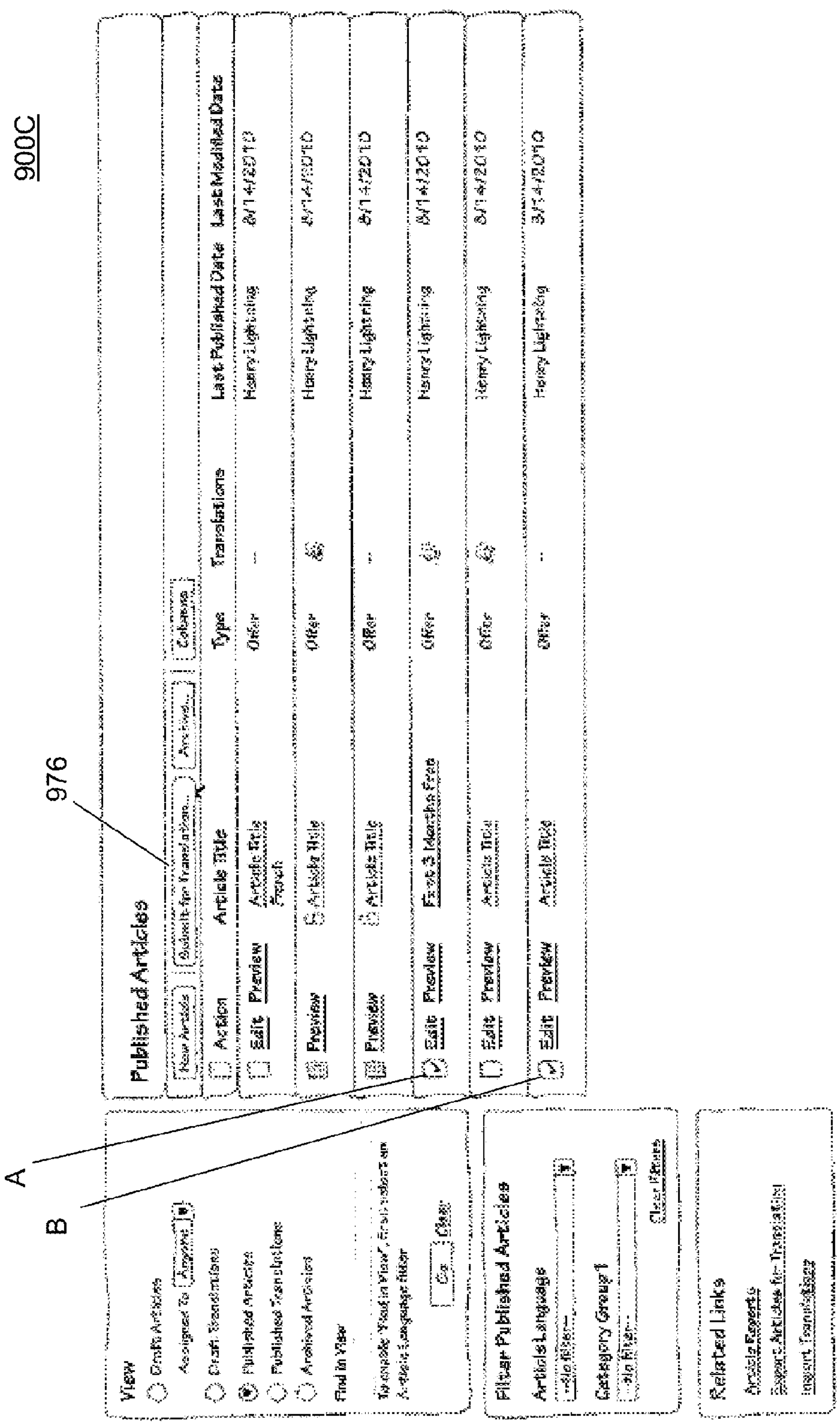
FIGS. 15A-15C show a series of screenshots of embodiments of webpages of a user interface for translating from a published view.
Figure 15B:
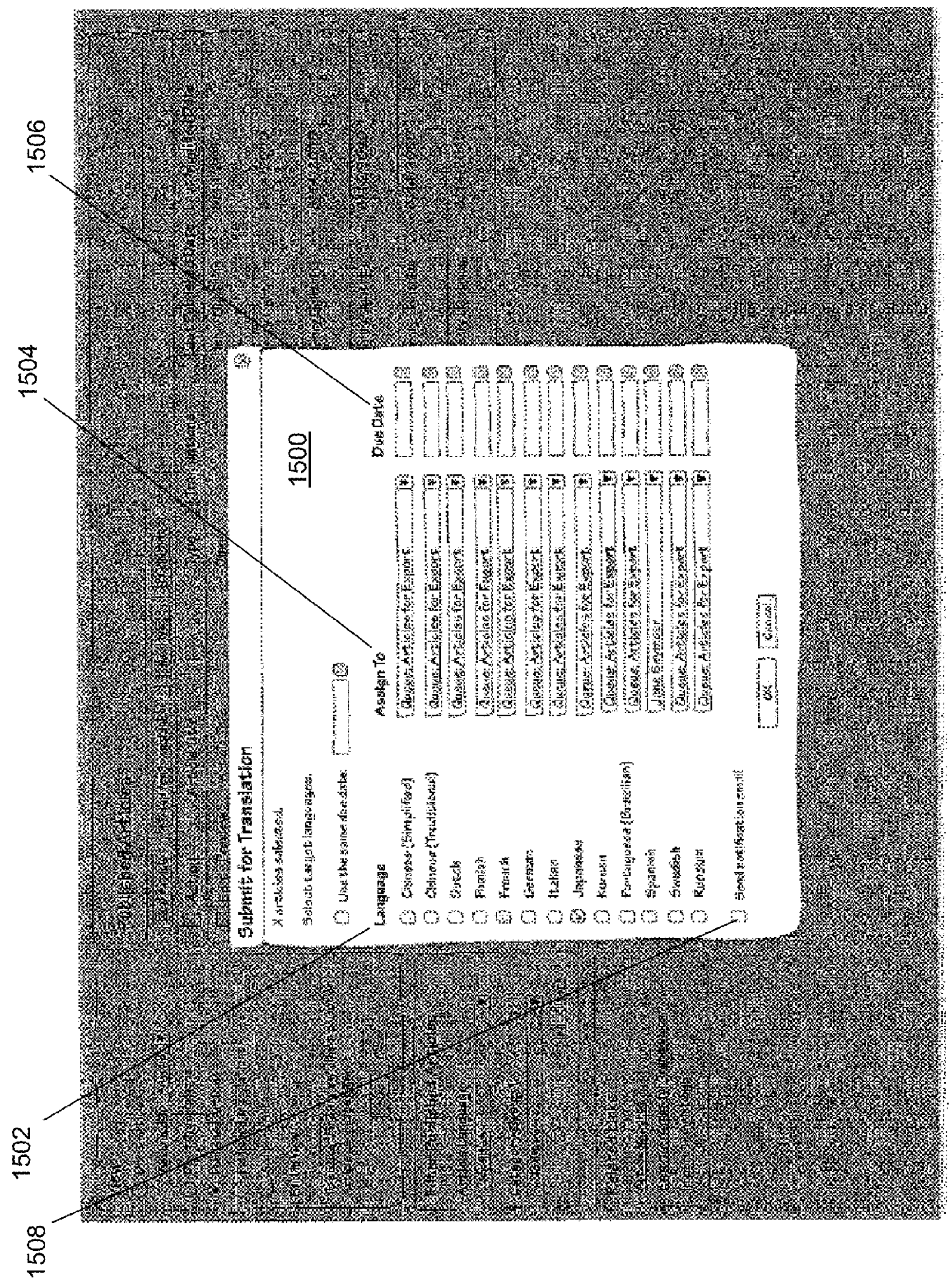
Figure 15C:
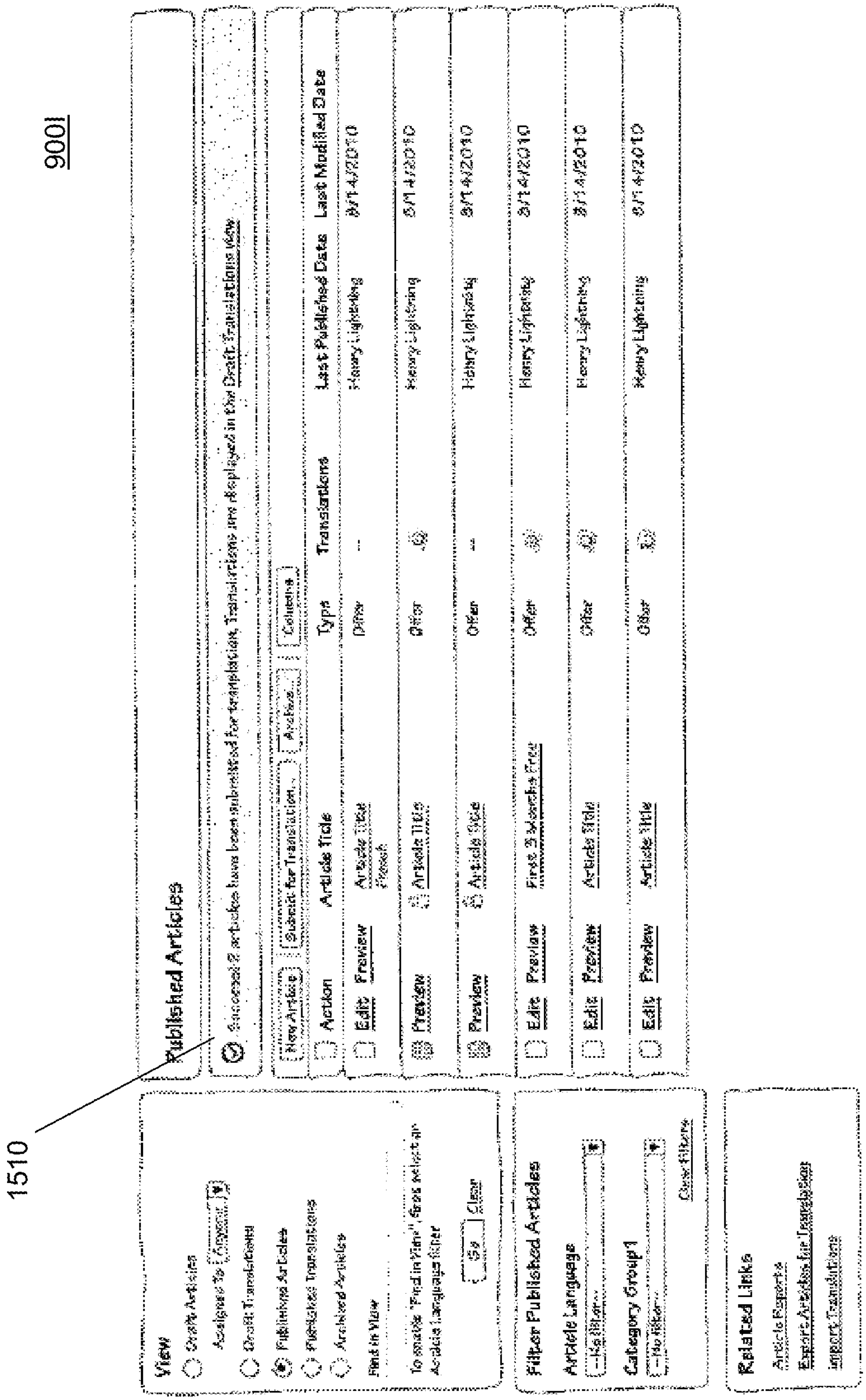

FIGS. 15A-15C show a series of screenshots of embodiments for translating from published view.

In FIG. 15A a UI 900C of an embodiment of a translation view and editor is shown with the submit for translation tab 976 being selected to bring up the submit for translation overlay 1501 shown in FIG. 15B. Also shown are two rows selected with check marks (A, B) that represent two articles selected for translation.

In FIG. 15B the submit for translation overlay 1501 allows the user to select target languages 1502, assign the translation to a queue through a drop down menu 1504, and assign a due date 1506. In addition the user may choose to have a notification email 1508 sent upon a translation completion of an article.

In FIG. 15C a UI 900I of an embodiment of a translation view and editor is shown with a notification 1510 that the two selected translations have been submitted for translation.

Figure 16A:
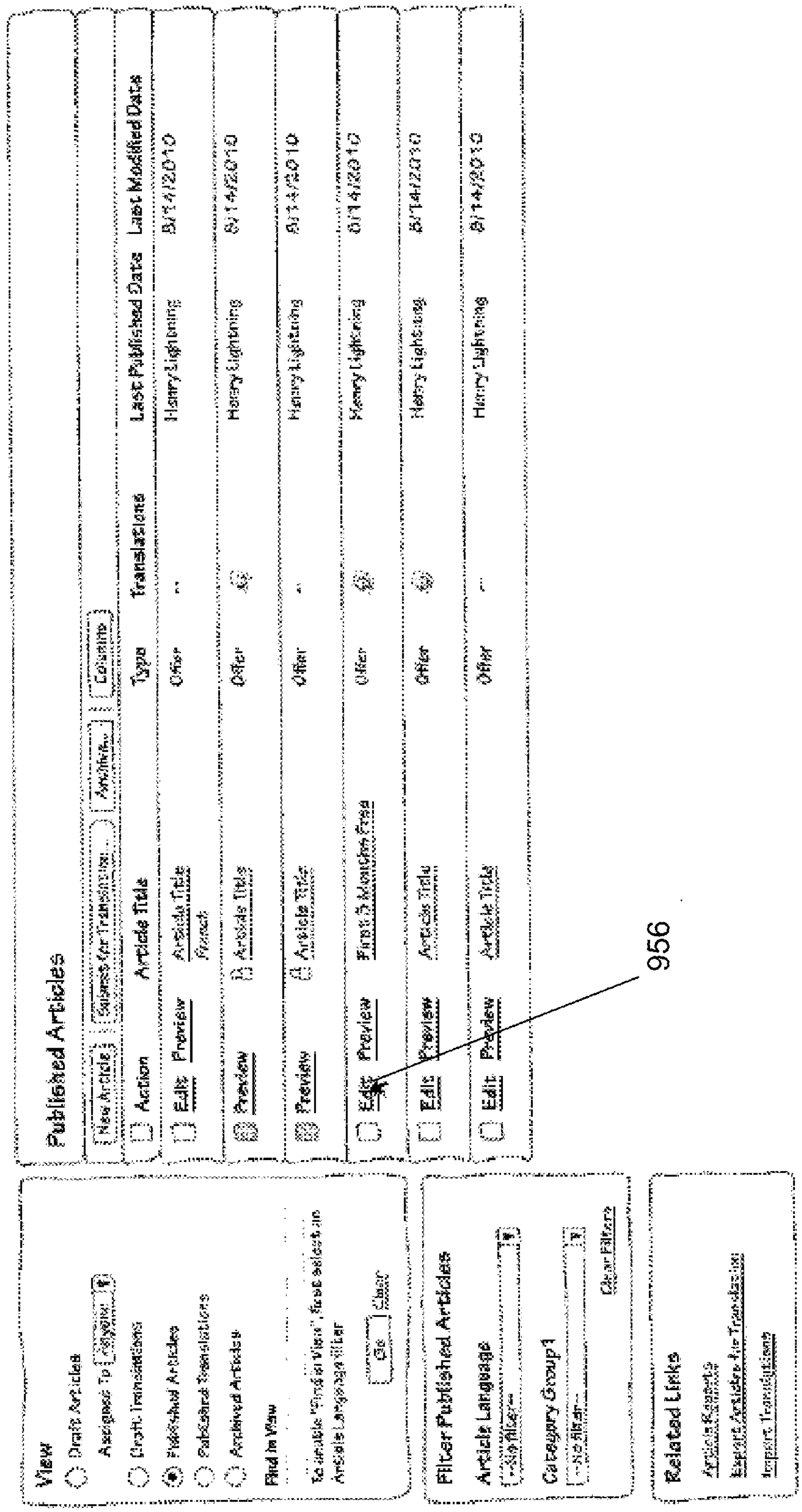
FIGS. 16A-16H show a series of screenshots of embodiments of webpages of a user interface for editing published articles and translations.
Figure 16B:
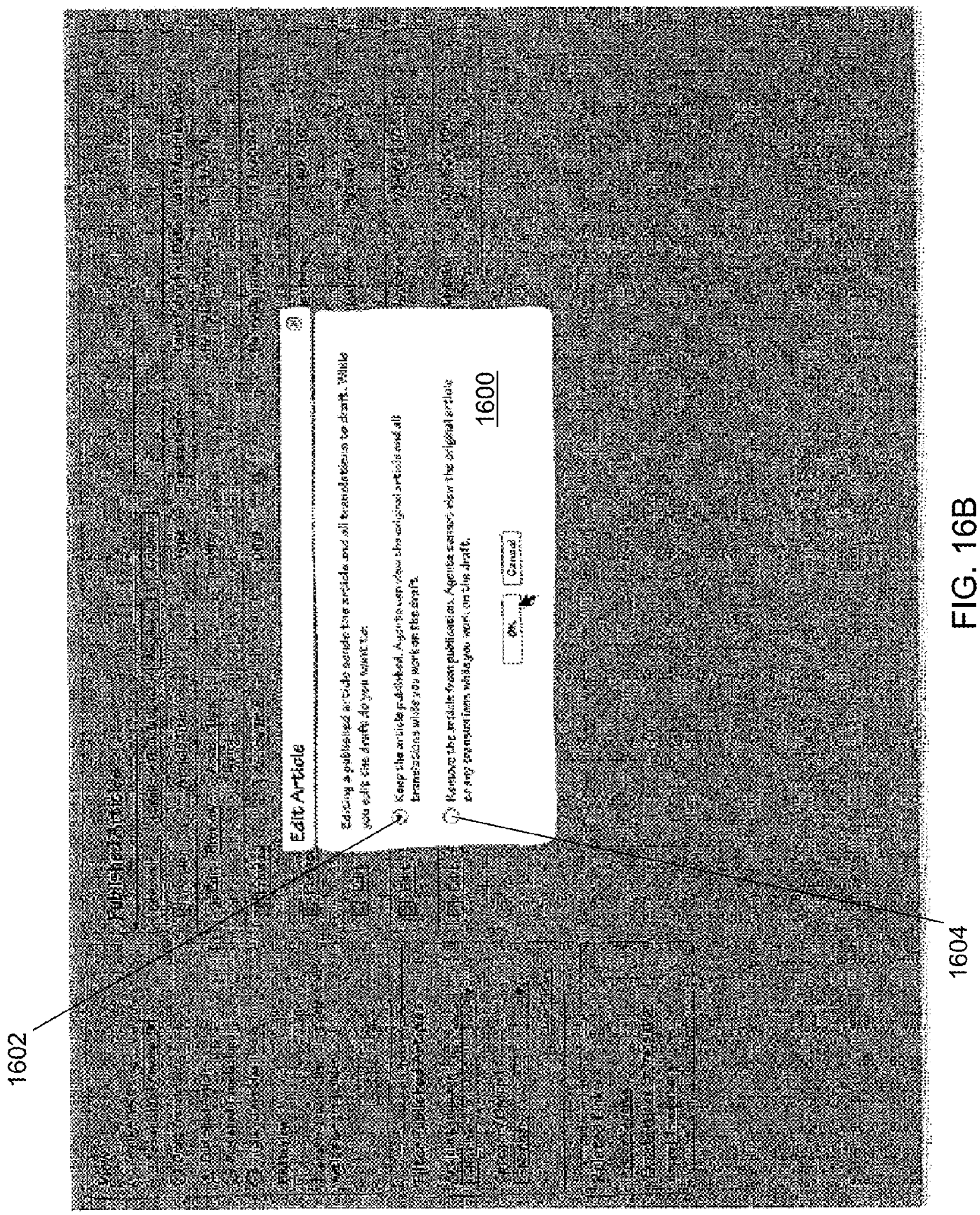

FIGS. 16A-16H show a series of screenshots editing published articles and translations;

In FIG. 16A a UI 900C of an embodiment of a translation view and editor is shown with the edit link 956 being selected to bring up an edit article overlay 1600 shown in FIG. 16B.

In FIG. 16B the edit article overlay 1600 informs the user that editing a published article sends the article and all translations of that article to draft, and asks the user whether they want to keep the article published (selection 1602), or remove the article (selection 1604) while work is done in draft status.

Figure 16C:
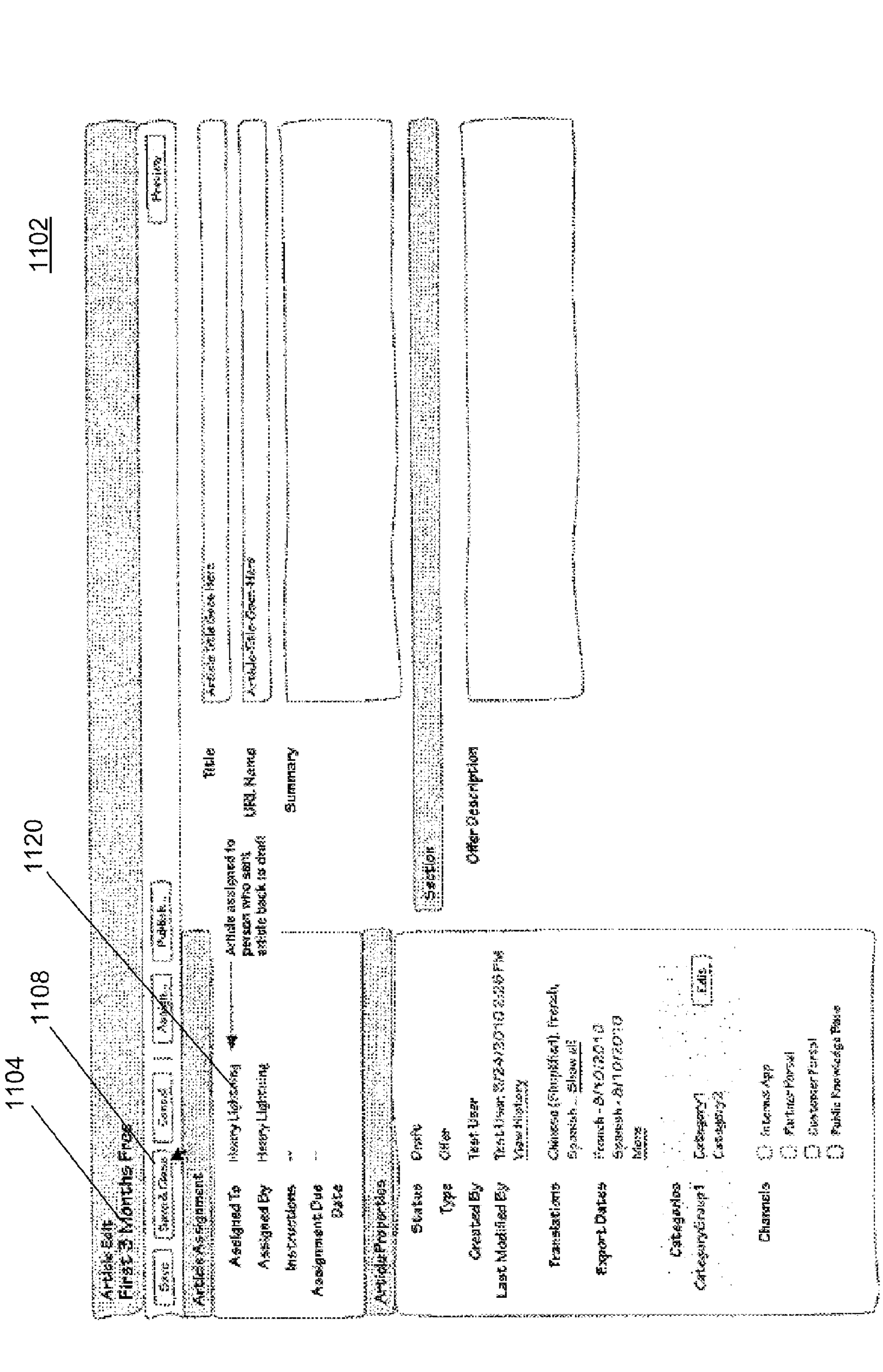

FIG. 16C shows the embodiment of FIG. 11C of screenshot 1102 that provides details of the article to be edited. In FIG. 16C, the page title 1104 provides the user with the title of the article to be edited which in this case is "First 3 Months Free". In the embodiment shown in FIG. 16C, the save & close tab 1108 is being selected and saves and closes the edit page 1102. The assign to whom 1120 show that article is assigned to the person who sent the article back to draft.

Figure 16D:
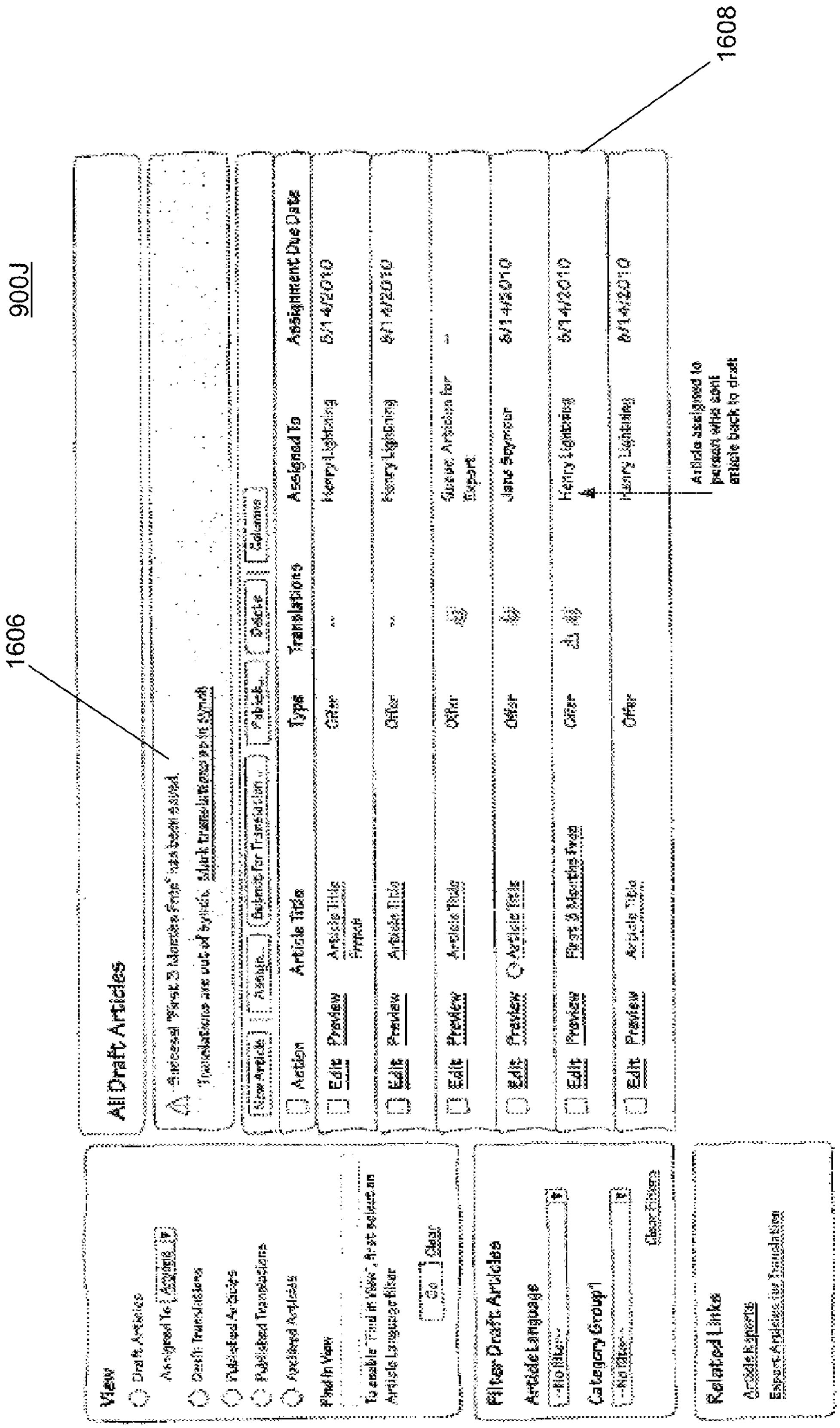

FIG. 16D shows UI 900J with an alert notification (1606) that the article "First 3 Months Free" has been successfully saved, but translations are now out of sync (translation does not match updated article). The row designated by 1608 shows the article "First 3 Months Free" and the assignment to the person sent the article back to draft.

Figure 16E:
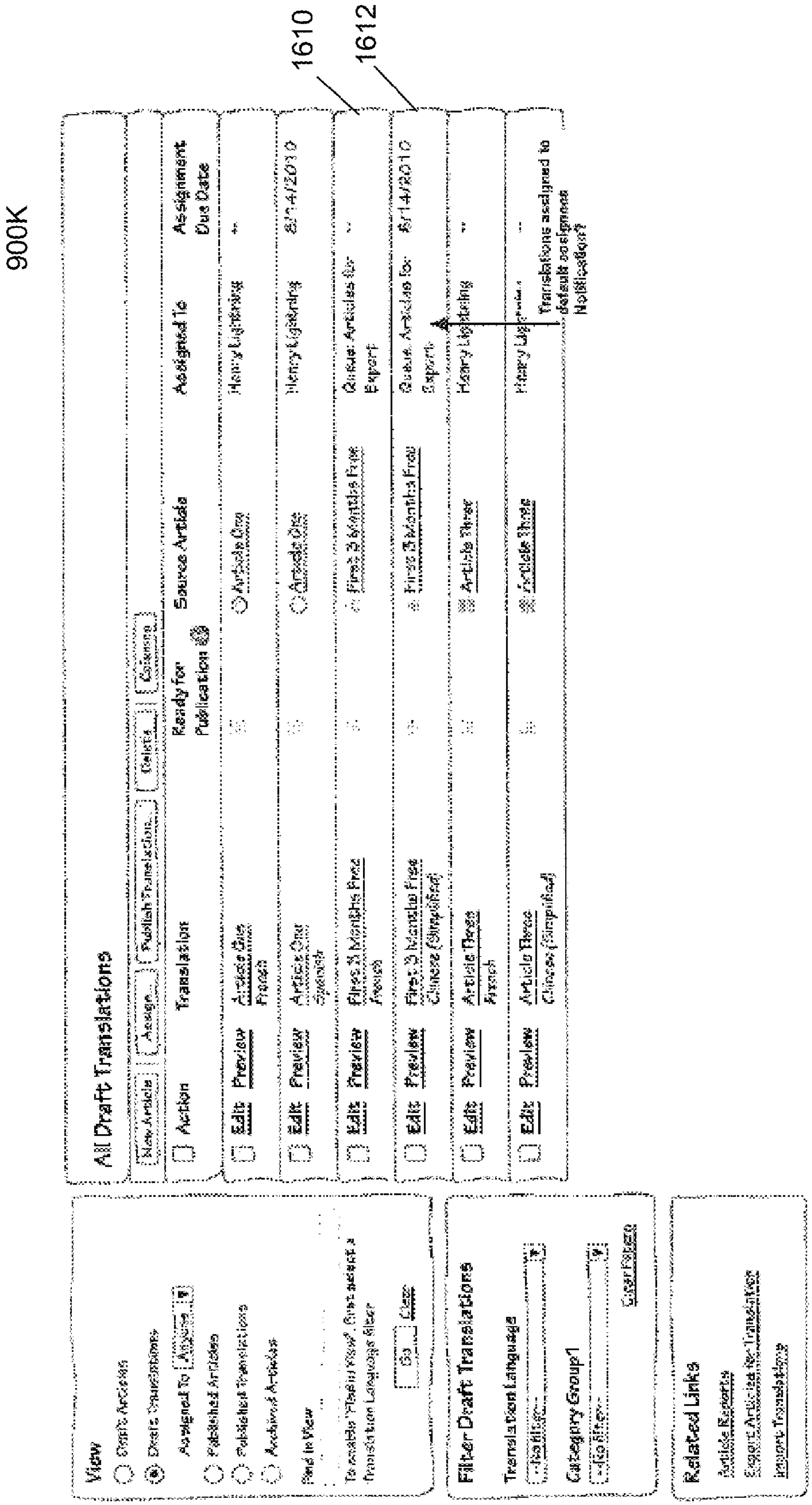

FIG. 16E shows UI 900K of "All Draft Translations" listing translations to be process for draft source articles. Rows designated by 1610 and 1612 are translations for the article "First 3 Months Free" awaiting export.

Figure 16F:
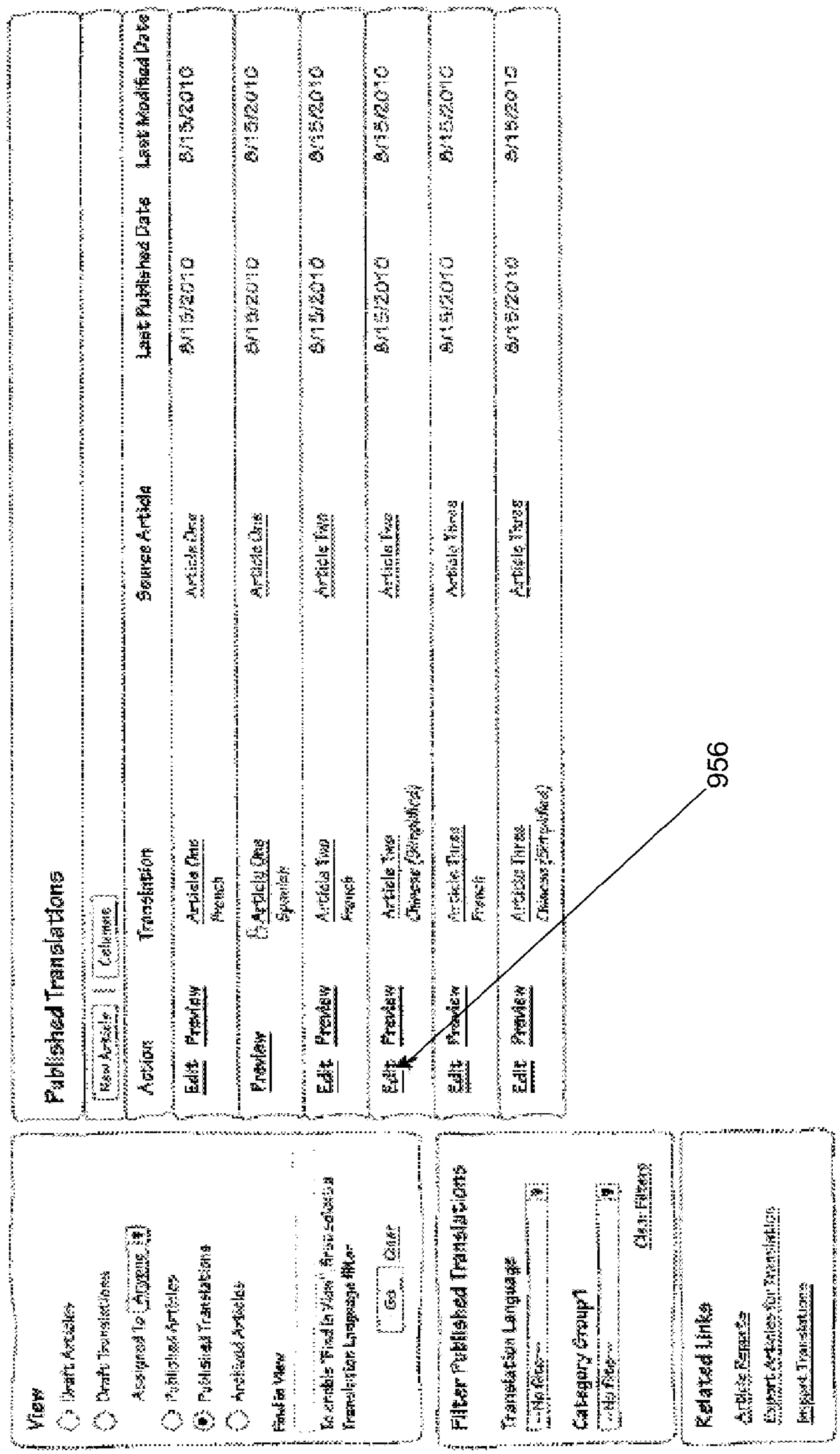
Figure 16G:
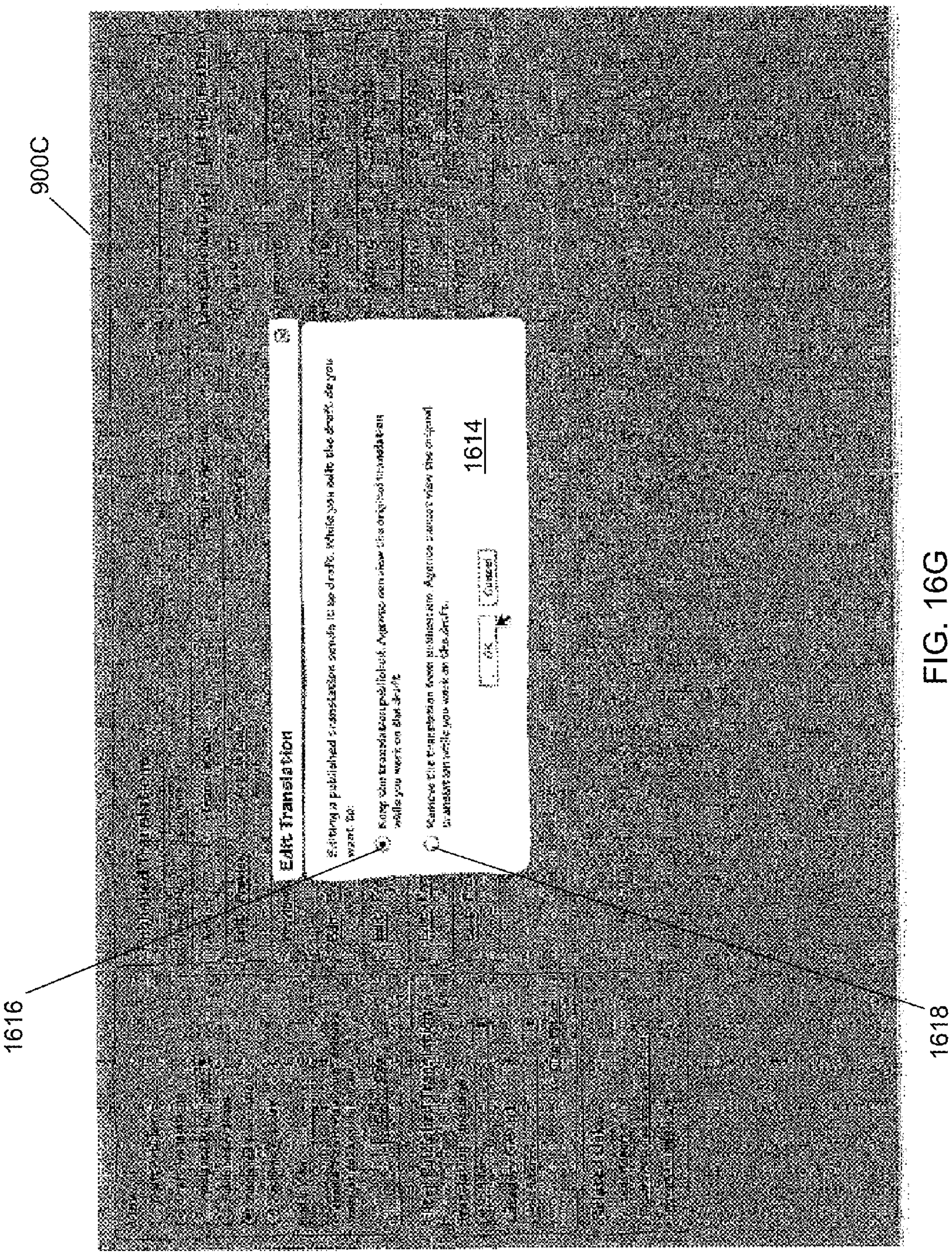

In FIG. 16F a UI 900D of an embodiment of a translation view and editor is shown with the edit link 956 being selected to bring up an edit translation overlay 1614 shown in FIG. 16G.

In FIG. 16G the edit translation overlay 1614 informs the user that editing a published translation sends the translations to draft, and asks the user whether they want to keep the translation published (selection 1616), or remove the translation (selection 1618) while work is done in draft status.

Figure 16H:
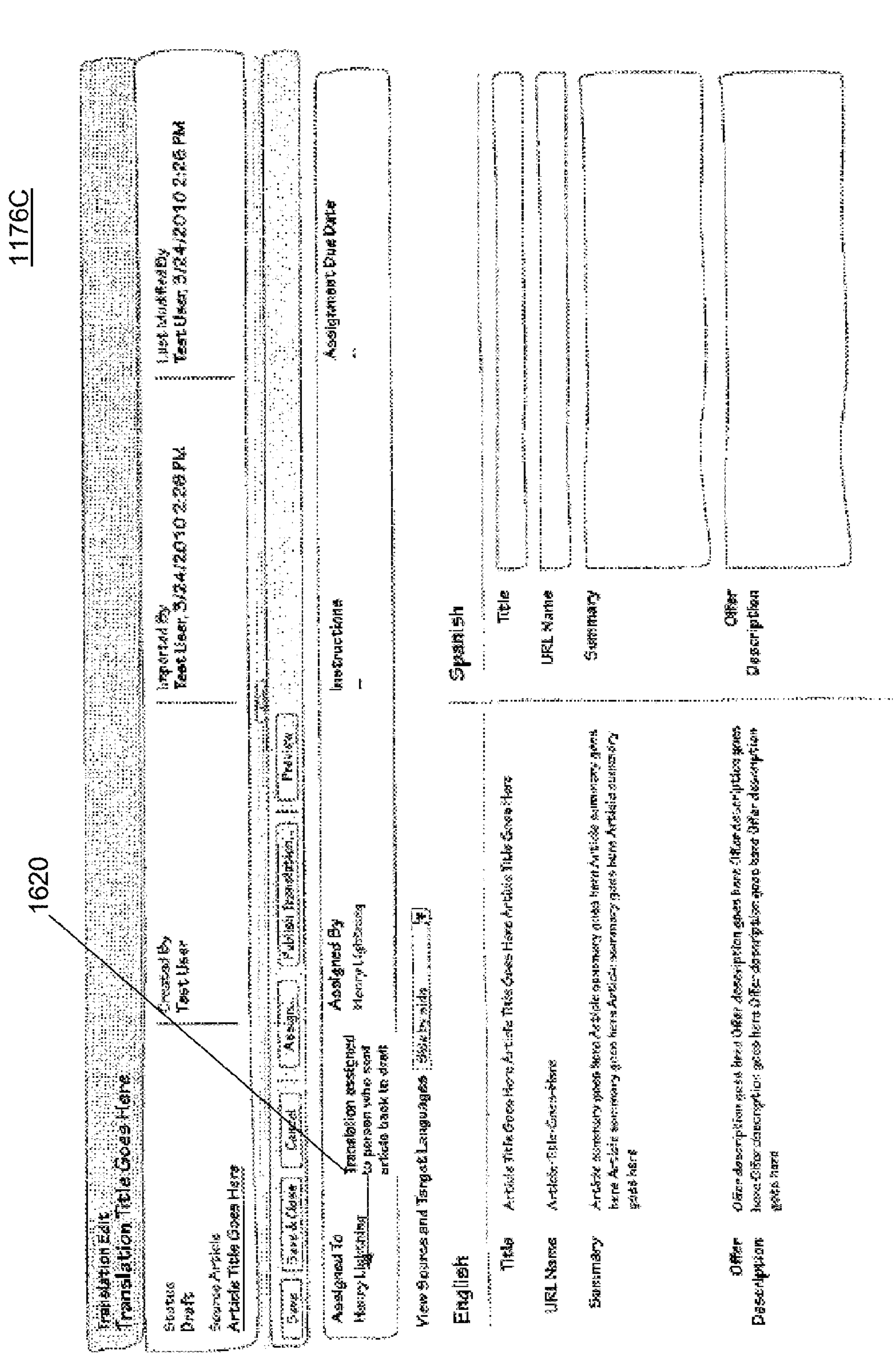

FIG. 16H illustrates translation edit details screenshot 1176C, respectively, with information fields and selections, which were explained with reference to similar screenshots previously and will not be explained in detail here. In screenshot 1176C the translation is assigned to the person who sent the article back to draft (1620).

Figure 17A:
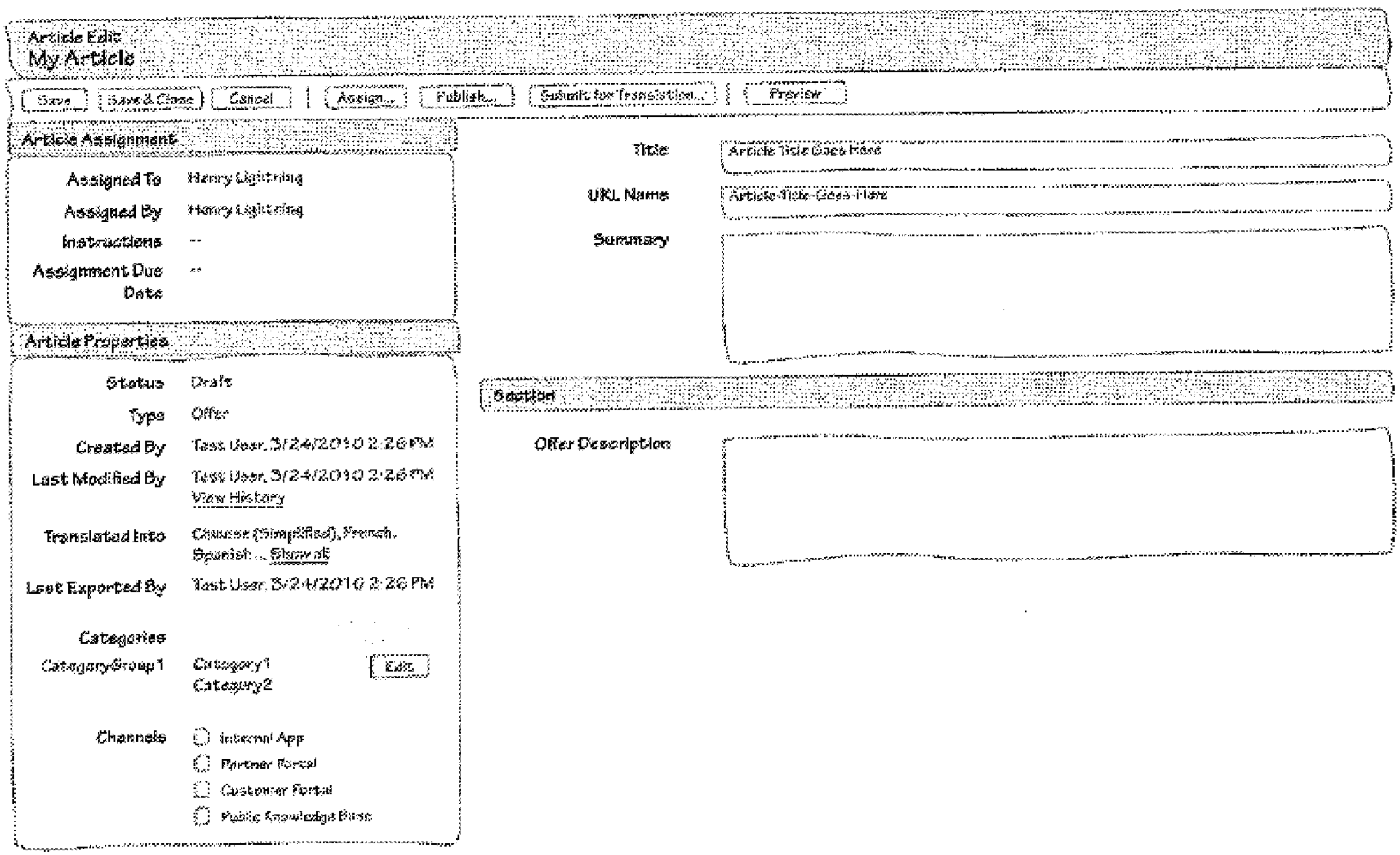
FIGS. 17A-17J show a series of screenshots of embodiments of article edit and detail pages.
Figure 17B:
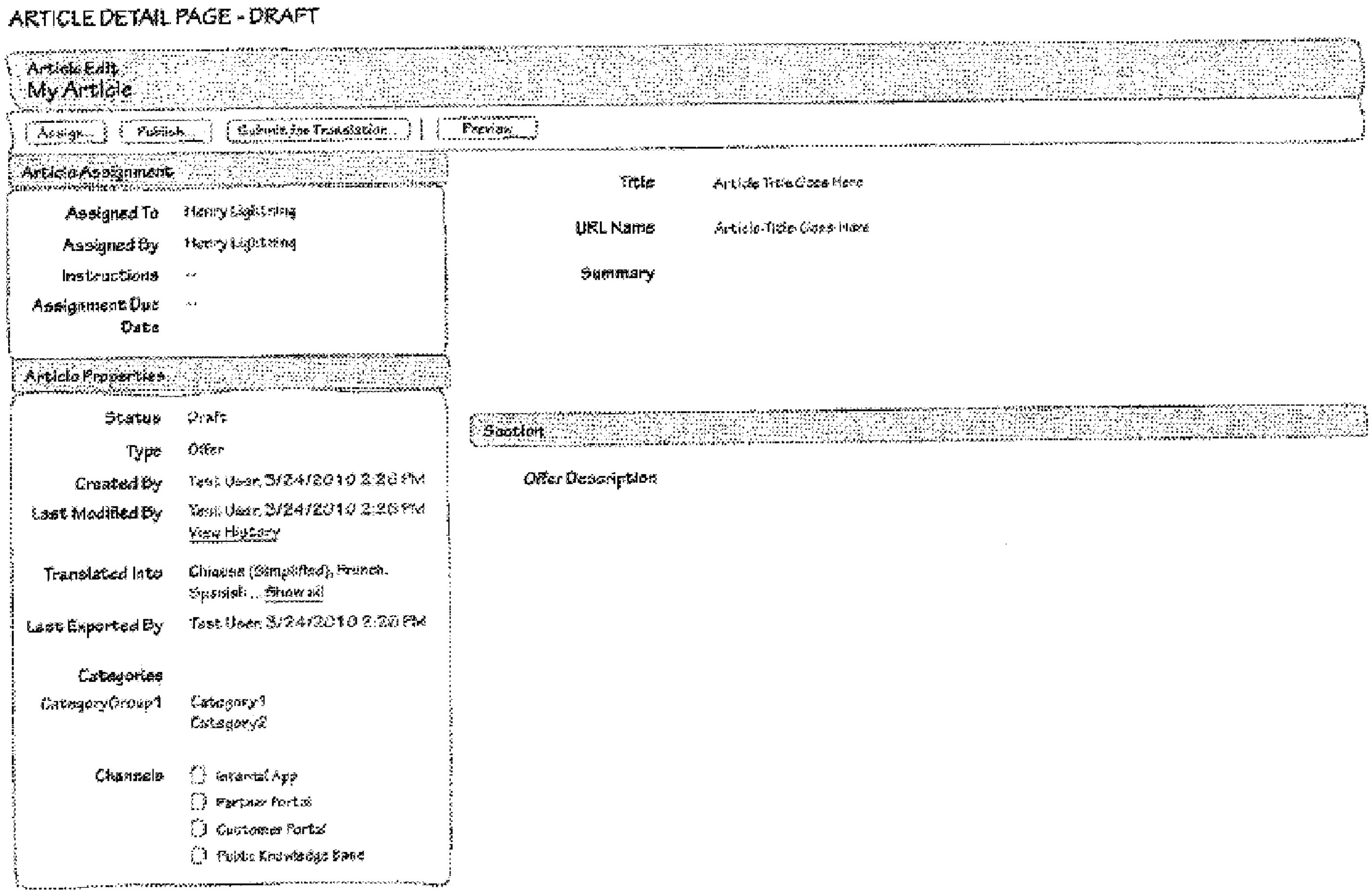

FIGS. 17A-17J show a series of screenshots of embodiments of article edit and detail pages;

FIGS. 17A and 17B show embodiments of FIG. 11C of screenshot 1102 that provides details of the article to be edited and for articles in the draft state.

Figure 17C:
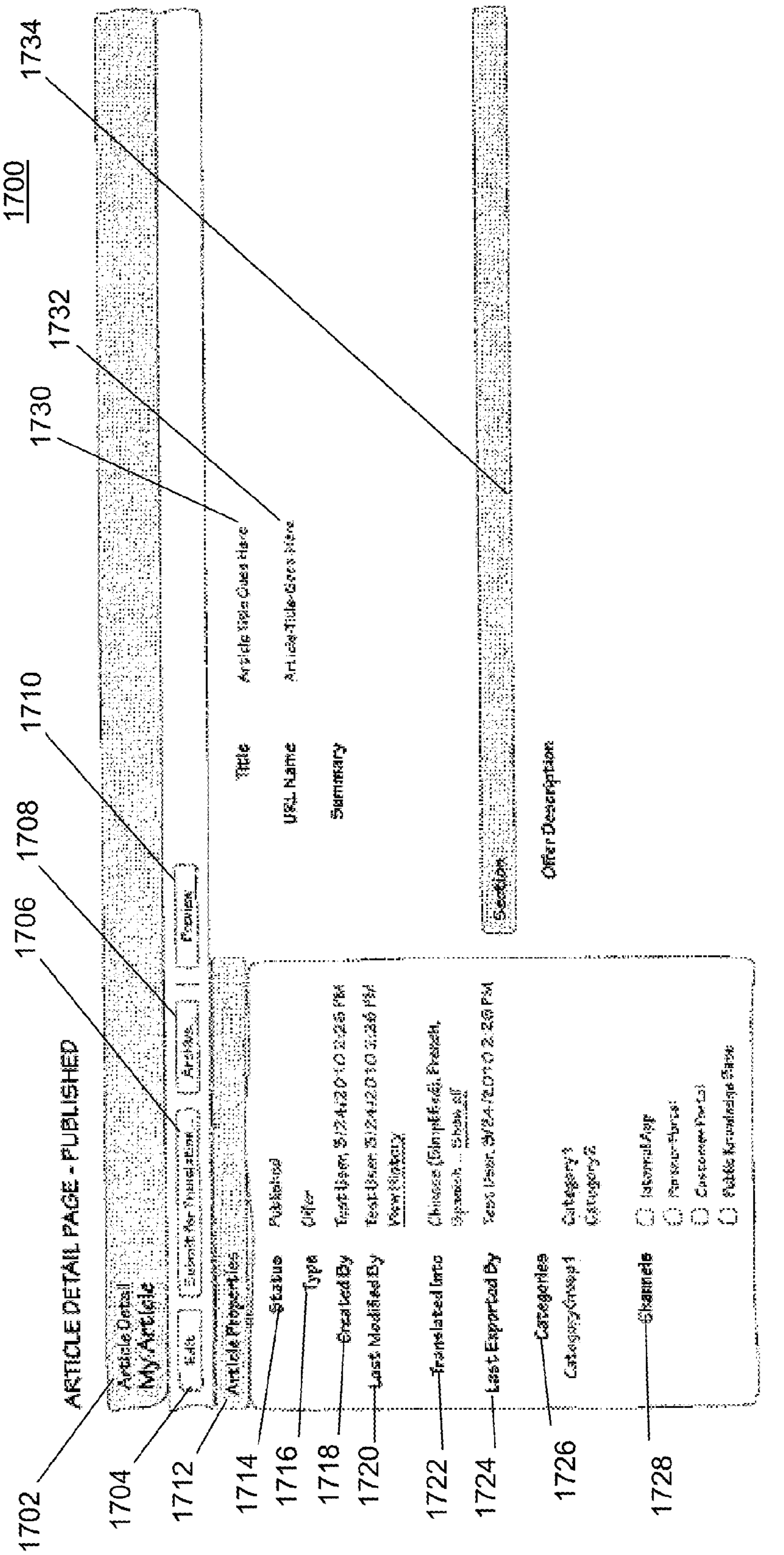
Figure 17D:
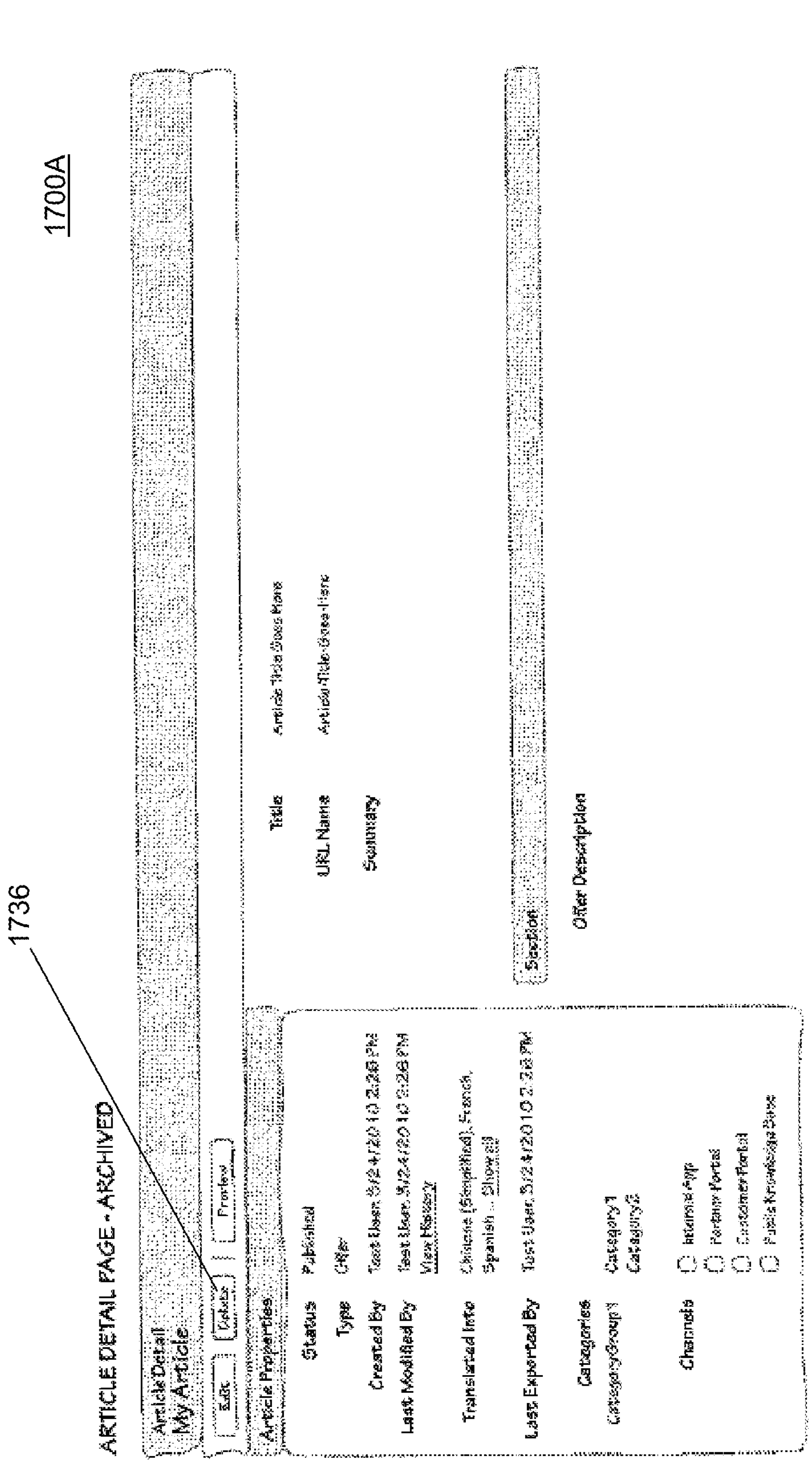

FIGS. 17C-17D show a series of screenshots of embodiments of article detail pages. FIG. 17C shows a screenshot 1700 of an embodiment of article detail page for published articles, and FIG. 17D shows a screenshot 1700A of article detail page for archived pages. Screenshot 1700 may include article detail 1702, edit tab 1704, submit for translation 1706, Archive tab 1708, preview tab 1710, article properties section 1712, article status 1714, article type 1716, created by 1718, last modified by 1720, translated into 1722, last exported by 1724, categories 1726, channels 1728, title 1730, URL name 1732, section for information display 1734, and delete tab 1736 (see FIG. 17D). As each of these elements and page details have been explained previously a full explanation for each element will not be repeated. In other embodiments, webpages 1700 and 1700A may not have all of the elements listed and/or may have other elements instead of or in addition to those listed.

Figure 17E:
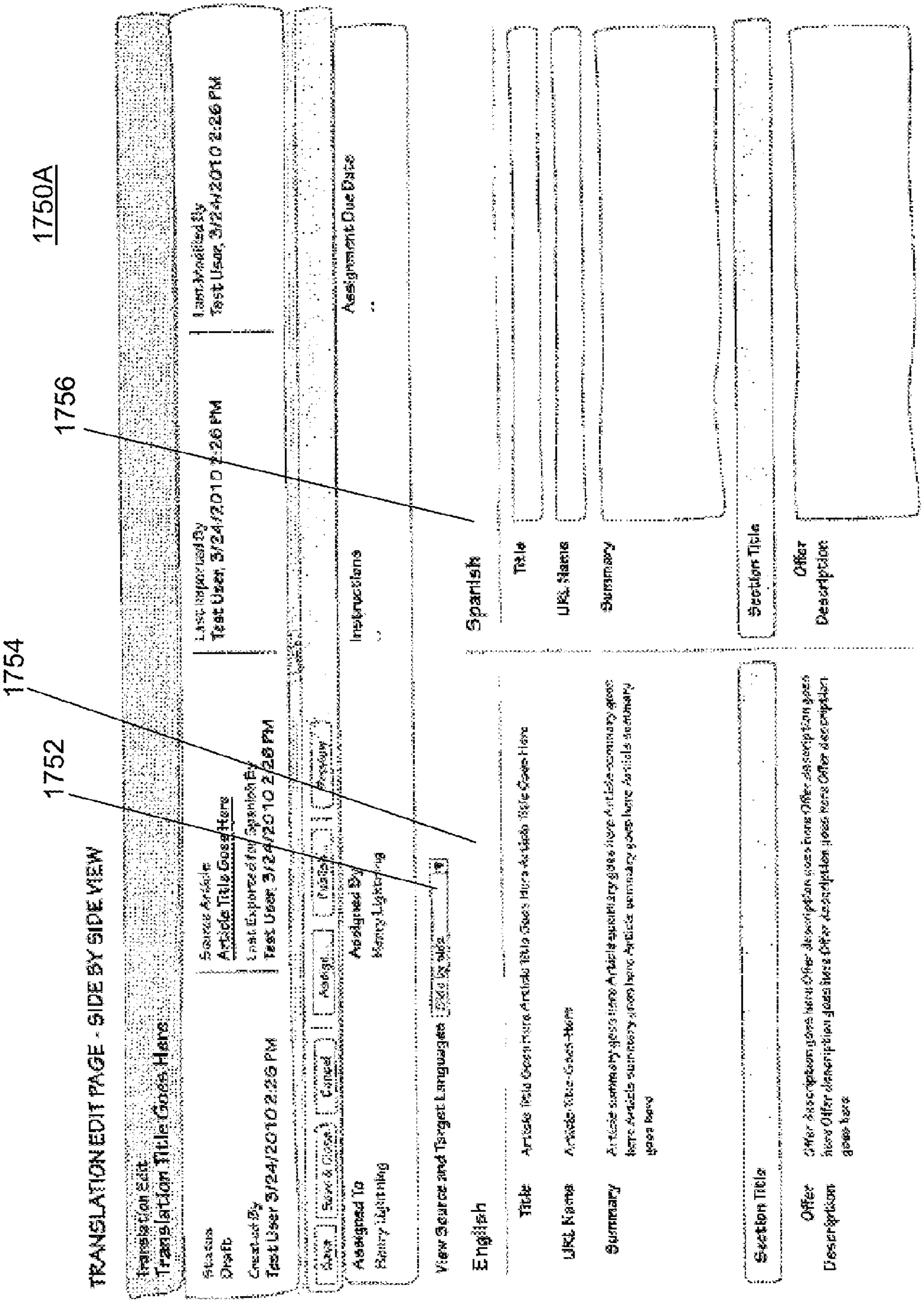
Figure 17F:
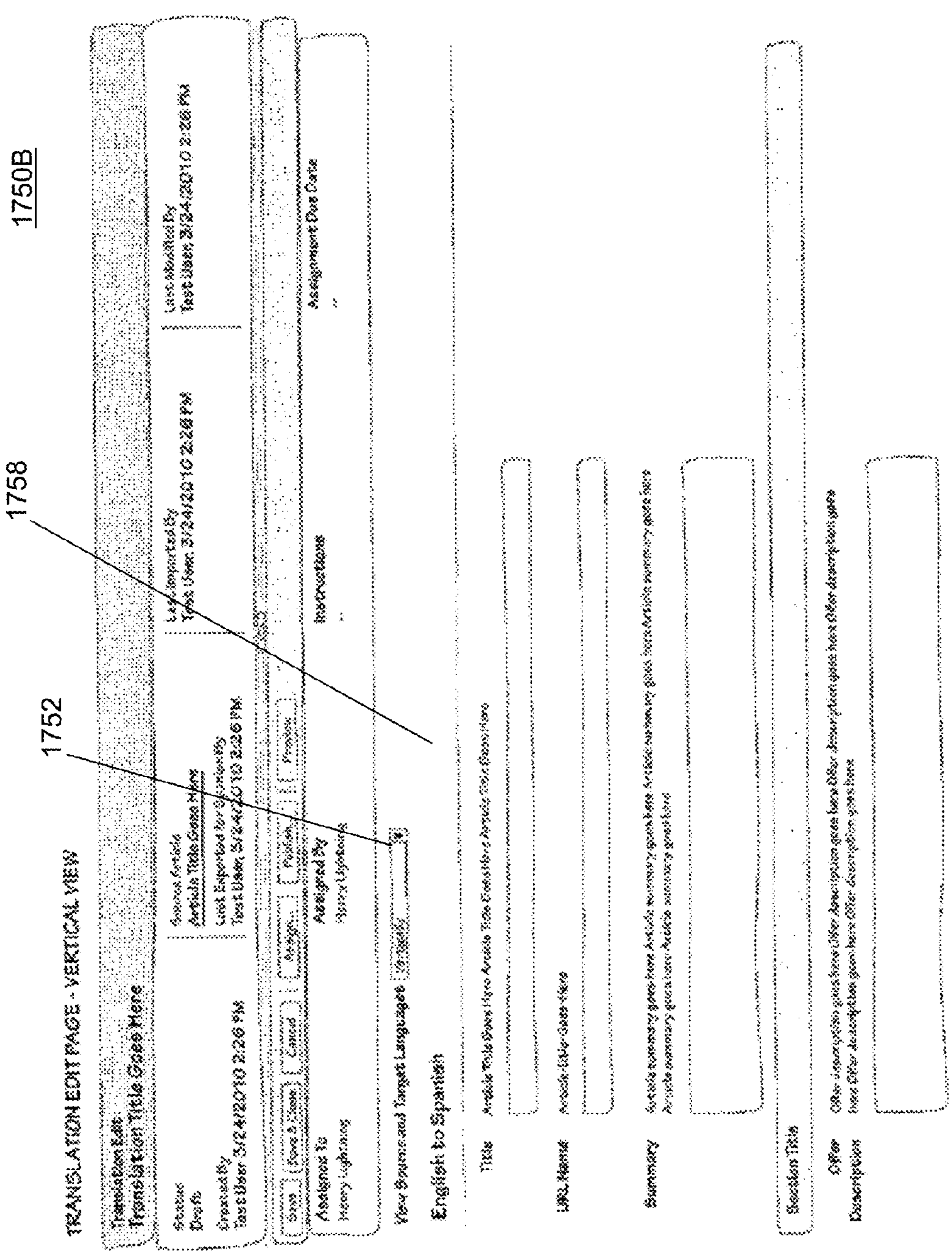

FIGS. 17E-17F show a series of screenshots of two different layouts for translation edit pages 1750A and 1750B, respectively. Pull down menu 1752 provides the user with the option of choosing between a side by side or vertical layout for displaying article translation information. The embodiment of the translation edit page of FIG. 17E provides an informational side by side view of article translations as depicted by display panes 1754 for English and 1756 for Spanish. In other embodiments the language pairs in the side by side panes may be different. In other embodiments more than two side by side panes may be shown on the page 1750A. For example English, Spanish, Russian, and French may be displayed in four side by side display panes. The embodiment of the translation edit page of FIG. 17F provides information of a translation for an article in a vertical view pane 1758.

Figure 17G:
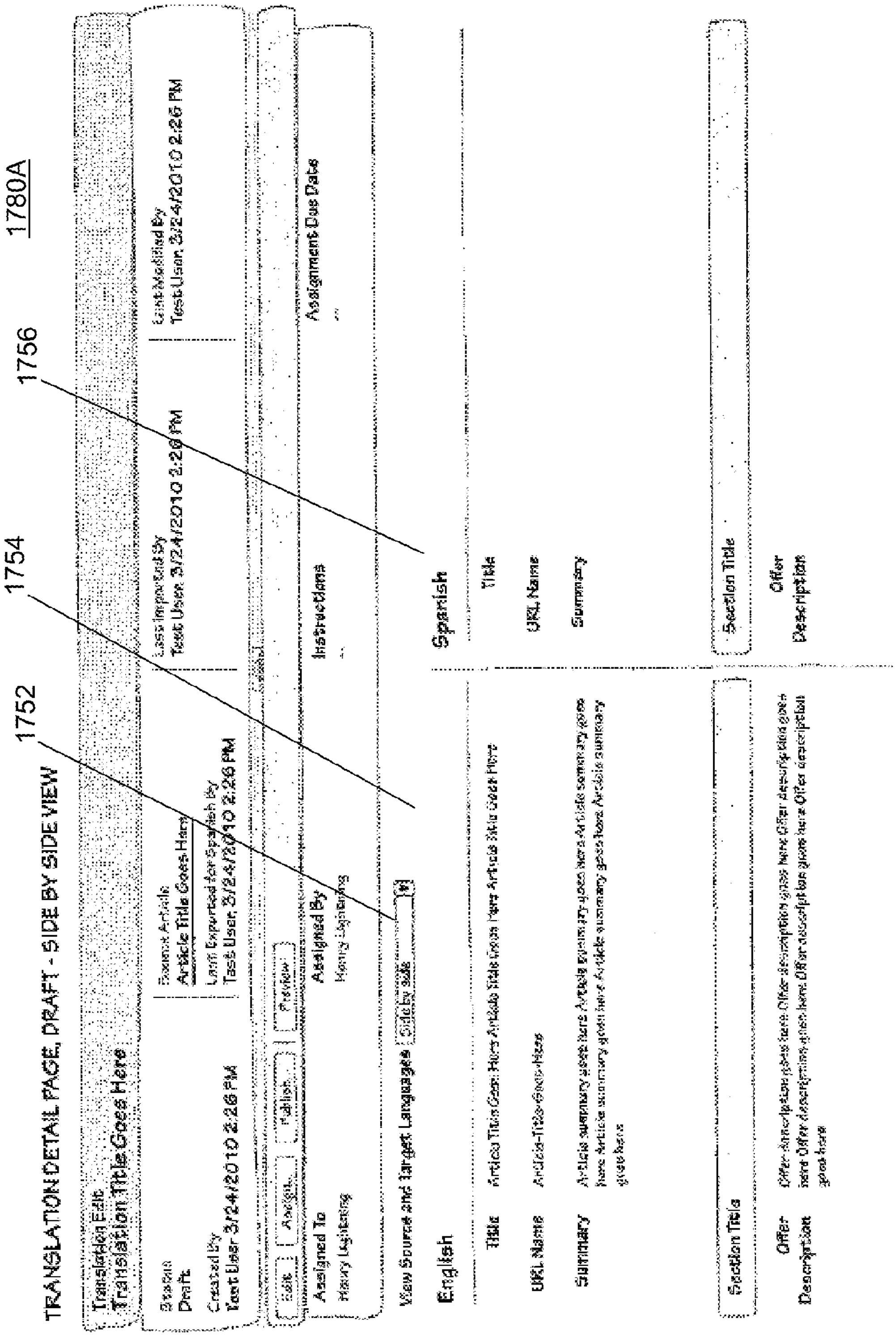
Figure 17H:
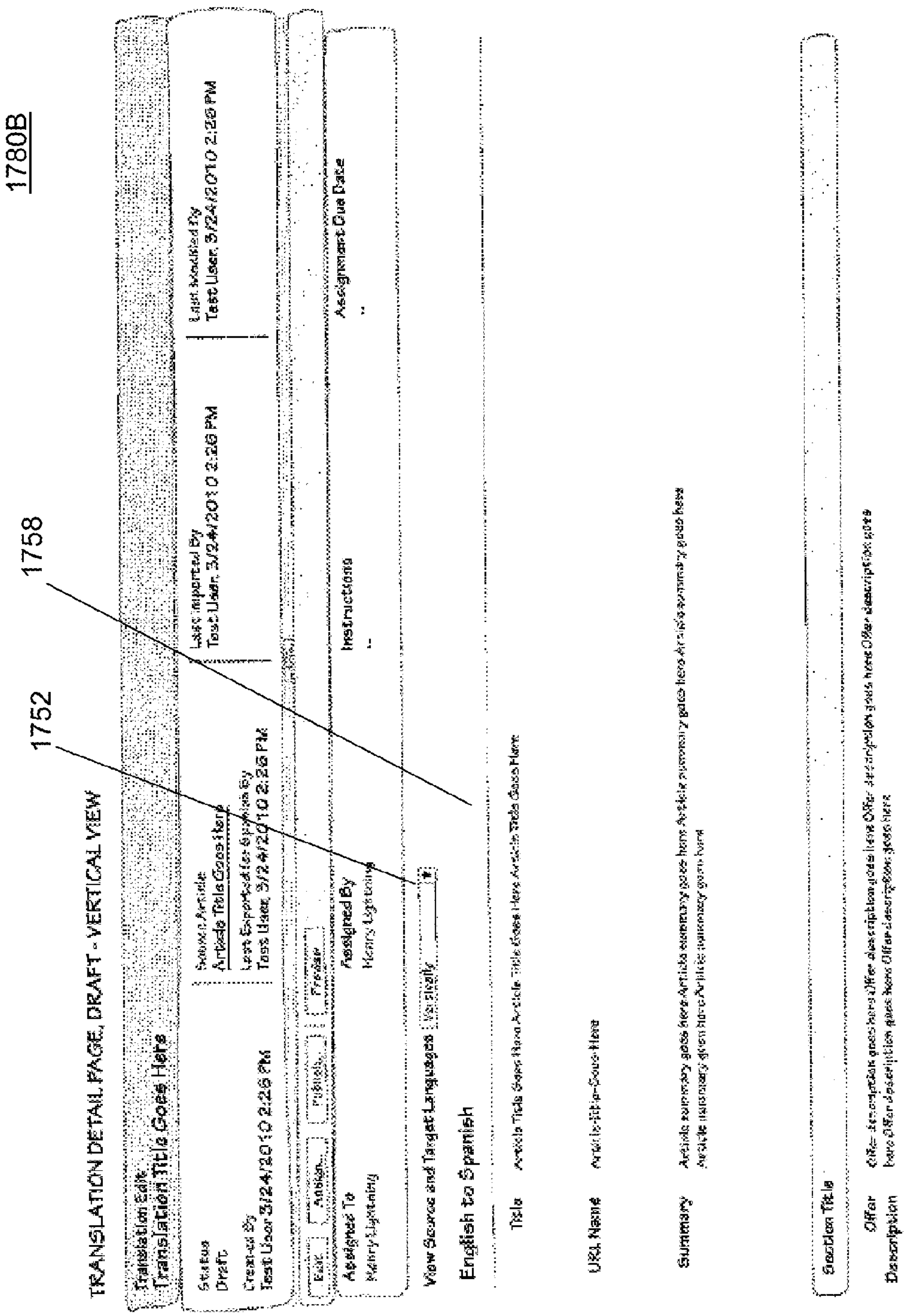

FIGS. 17G-17H show a series of screenshots for layouts for translation detail pages for draft status articles. Pull down menu 1752 provides the user with the option of choosing between a side by side or vertical layout for displaying article translation information. The embodiment of the translation edit page for draft status articles 1780A of FIG. 17G provides an informational side by side view of article translations as depicted by display panes 1754 for English and 1756 for Spanish. In other embodiments the language pairs in the side by side panes may be different. In other embodiments more than two side by side panes may be shown on the page 1780A. For example English, Spanish, Russian, and French may be displayed in four side by side display panes. The embodiment of the translation edit page for draft status articles of FIG. 17H provides information of a translation for an article in a vertical view pane 1758.

Figure 17I:
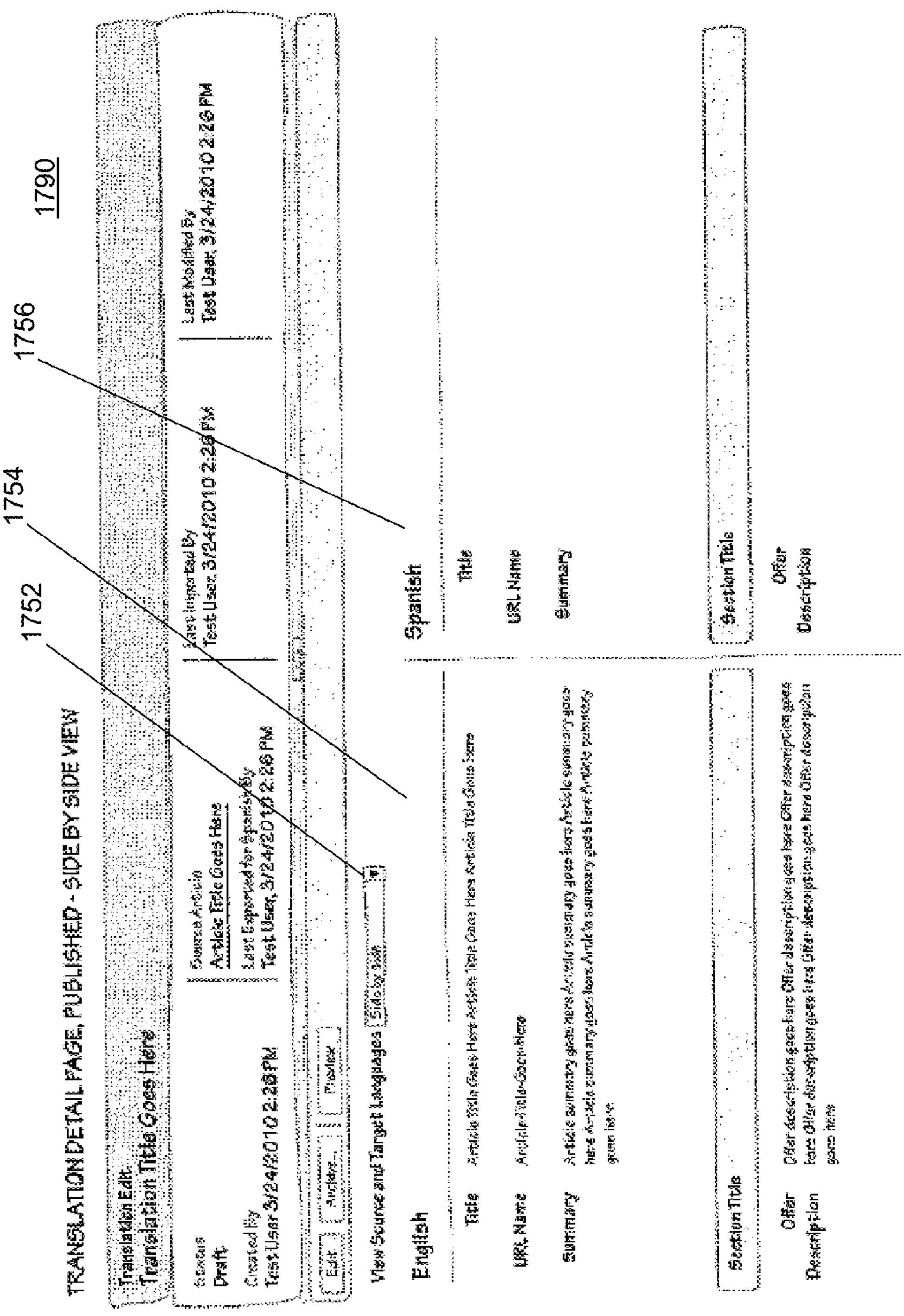

FIG. 17I shows a screenshots for layouts for translation detail pages for published status articles 1790. Pull down menu 1752 provides the user with the option of choosing between a side by side or vertical layout for displaying article translation information. The embodiment of the translation edit page for publish status articles 1790 of FIG. 17I provides an informational side by side view of article translations as depicted by display panes 1754 for English and 1756 for Spanish. In other embodiments the language pairs in the side by side panes may be different. In other embodiments more than two side by side panes may be shown on the page 1790. For example English, Spanish, Russian, and French may be displayed in four side by side display panes.

Figure 17J:
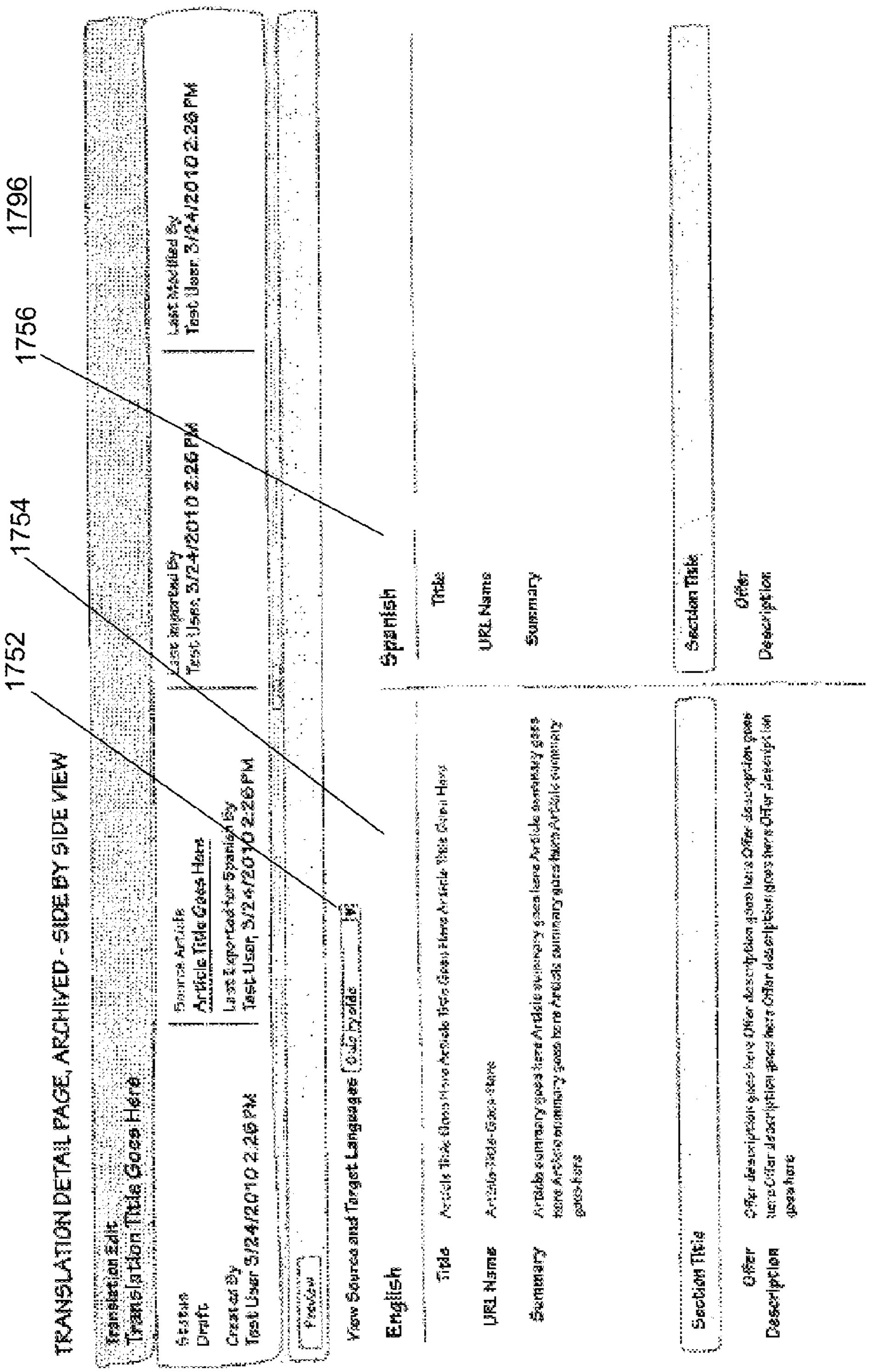

FIG. 17J shows a screenshots for layouts for translation detail pages for archived status articles 1796. Pull down menu 1752 provides the user with the option of choosing between a side by side or vertical layout for displaying article translation information. The embodiment of the translation edit page for archived status articles 1796 of FIG. 17J provides an informational side by side view of article translations as depicted by display panes 1754 for English and 1756 for Spanish. In other embodiments the language pairs in the side by side panes may be different. In other embodiments more than two side by side panes may be shown on the page 1796. For example English, Spanish, Russian, and French may be displayed in four side by side display panes.

In embodiments, knowledge managers may utilize an article management tab to carryout tasks including create, edit, archive, delete, assign, and publish a master version of articles (a master version is the source article in a specific language, translations are then referred as translation versions). In addition, further tasks conducted with the article management tab include requesting translations of articles, editing, deleting, publishing, and assigning translation versions of the requested articles. The aforementioned tasks may be accomplished through two views and two editors, the master language view and editor, and the translation view and editor, which are illustrated and described in the screenshots of FIGS. 9-17.

In embodiments various page views or screens are available for managing and accessing a multi-lingual knowledge base in a database network system, which are shown in FIGS. 9-17 as described above, following a general discussion of the functions of embodiments of the user interface.

In embodiments, the tasks of knowledge management that users may do within the article management tab of FIGS. 9-17 may include: creating, editing, archiving, deleting, assigning and publishing master version of articles (a master version is the source article in a specific language, translations are then referred as translation versions); requesting translation of articles; and editing, deleting, publishing, assigning translation versions of articles.

In embodiments, knowledge managers may utilize an article management tab to carryout tasks including create, edit, archive, delete, assign, and publish a master version of articles (a master version is the source article in a specific language, translations are then referred as translation versions). In addition, further tasks conducted with the article management tab include requesting translations of articles, editing, deleting, publishing, and assigning translation versions of the requested articles. The finding and managing articles and translations may be accomplished through two views and two editors, the master language view and editor, and the translation view and editor, which will be discussed further in conjunction with the screenshots of FIGS. 9-17, above.

In at least one embodiment, some knowledge management features may not be handled through the article management tab. These knowledge management features correspond to the tasks that require a read-only access to the articles and their translations, such as providing an overview of the translation status of the KB, and filtering capabilities (which will be discussed further in conjunction with the screenshots of FIGS. 9-17, above) that allow for identification of articles that should be translated, along with mass translation request feature. To facilitate the filtering of articles in the knowledge base, custom tables containing article identifications and other types of relevant information for identifying an article and persons associated with the article may be provided in custom tables as shown in table 1 and table 2. Portions of the information in the columns of tables 1 and 2 are inputted through the UI of embodiments, in which will be discussed further in conjunction with the screen shots of FIGS. 9-17 described above, and some information is automatically generated by the systems for managing a multi-lingual knowledge base in a database network system. The information in the columns of Tables 1 and 2 are described in conjunction with the discussion of screen shots of FIGS. 9-17.

TABLE 1

| Column | Example |
|---|---|
| Knowledge Article ID | |
| Knowledge Article Version ID | |
| Article Title | My Article Name |
| URL_Name | Article_Url_name |
| Summary | this is the article summary |
| Created By: Full Name | John Smith |
| Created Date | 5/20/2010 |
| First Published Date | 5/26/2010 11:31 AM |
| Last Modified By: Full Name | John Smith |
| Last Modified Date | 5/26/2010 |
| Last Published Date | 5/26/2010 11:31 AM |
| Visible In Customer Portal | Checkbox |
| Visible In Internal App | Checkbox |
| Visible In Partner Portal | Checkbox |
| Visible In Public Knowledge Base | Checkbox |
| Language | English |
| IsMaster | True/False |
| Publishing Status | Online/Draft/Archived |
| Import date | |
| Export date | |
| Ready for Publication | True/False/NA (NA may be used for master version) |
| Out of sync | True/False/NA (NA may be used for master version) |
| Assign to | |
| Due Date | |
| Instruction | |

TABLE 2

| Example | Comments |
|---|---|
| Knowledge Article ID | |
| Article Title | My Article Name |
| URL_Name | Article_Url_name |
| Summary | this is the article summary |
| Created By: Full Name | John Smith |
| Created Date | 5/20/2010 |
| First Published Date | 5/26/2010 11:31 AM |
| Last Modified By: Full Name | John Smith |
| Last Modified Date | 5/26/2010 |
| Last Published Date | 5/26/2010 11:31 AM |
| Visible In Customer Portal | Checkbox |
| Visible In Internal App | Checkbox |
| Visible In Partner Portal | Checkbox |
| Visible In Public Knowledge Base | Checkbox |
| Available Languages | Multiple selectable picklist value |
| View Stat field | |
| Vote Stat field | |
| Case Count | |

To facilitate the filtering of articles in the knowledge base, custom tables containing article identifications and other types of relevant information for identifying an article and persons associated with the article may be provided in custom tables.

The columns of the custom tables as shown in Tables 1 and 2 may have the following information. Knowledge Article ID may provide a unique identifier for an article in a knowledgebase. Knowledge Article Version ID may provide an indication of which version or generation the article is presently available in the knowledgebase. Article title URL_Name is a link in the form of a universal resource locator (URL) for accessing an article in the knowledge base. Summary may provide a synopsis of an articles content or subject matter. Created by may detail who created or wrote the article. Created date may be the date that the article was first written. First published date may be the date that an article was first published. Last modified date may indicate the last date an article had content changed. Visible in customer portal may be an indicator if the article is available for selection in a customer's interface to the knowledge base. Visable in internal application may indicate whether the article is available for selection in the internal application. Visable in partner portal may indicate whether the article is available in a menu for selection and viewing in a partner portal. Visible in public knowledge base may indicate whether the article is available in a menu for selection and viewing in a public knowledge base. Language IsMaster may indicate whether the language an article is in is the master or primary first language. Publishing status may indicate the state of an article including online, draft, or archived. Import date may indicate the date an article was placed in a data base following translation. Export date may indicate a date an article was sent ou (exported for translation. Ready for publication may indicate that an article is ready for general distribution. Out of sync may indicate that a master version may be undergoing revisions while other versions of the article are out for translation, or other changes. Assign to may indicate which translator was given an article to translate or update. Due date may indicate a date an article is to have a translation or revision completed by. Instruction may be requirements sent to a translator. View Stat field may indicate how often or frequency an article is selected from the knowledge base. Vote Stat field may be a user vote to determine a rank of article by usefulness, timeliness or other parameters. Case Count may be a count of cases.

The data schema for the data object definition in the UDD, in pseudo-Data Definition Language (DDL) format, may include a command to create a table for the language of the article, which may include columns for an identifier of an organization, a language of the article, a status of the article (e.g., draft, online, or archive), an indicator for whether the a default language is set for the master document (which is filled in at the time of the creation of the article prior to the user having a chance to set the language), and an identifier for the default assignee. The pseudo Data Definition Language is in the format of a data definition language file, but may be an equivalent to a DDL file that runs on a JAVA virtual machine. In an embodiment, a table for tracking the article version may be included, which may have columns for an identifier for the master version of the article, a column indicating whether the articles are out of date, a column that stores the date when the translations were completed, a column for storing the dates when the translations were completed, a column for storing the dates when the translations were exported to the translator for translation, and a column for storing when the translations were imported back into the system. The table may be used for tracking the state of the articles and of the translations of the article. Specifically, in pseudo DDL format, the data object definition may include coding such as:

CREATE TABLE knowledge.language_config (organization_id, language, status, is_default_master_language, default_assignee_id), and ALTER TABLE knowledge.article_version ADD (master_version_id, is_out_of_date, translation_completed_date, translation_exported_date, translation_imported_date)

In at least one embodiment, publication of article translations is controlled by assigning various permission levels or rights to users. Users with sufficient level of rights may submit articles for translation in some languages. As the costs of translating content are generally expensive, the careful selection of the target language(s) when requesting the translation of an article is a consideration. For example, an article may be linked to a product that is not distributed in Asia but in North America and Western Europe, and in that case the user may not want to request the translation in Chinese and other Asian languages, but in languages common to the target market. In an embodiment, the system may automatically determine which articles are good candidates for translations, and into which languages the article should be translated to. The determination may be based on criteria such as which articles may have the highest predicted return on investment (ROI), where for purposes of determining the ROI, the investment is the cost of translation. Some other factor that may determine whether to translate an article are which articles have the highest frequency of being referenced in a defined period of time, such as in the last 30 days and/or how often customers for translations. Selection tools may be provided via which an administrator may determine whether to request the translations suggested by the system. Alternatively, the administrator may make the determination of which article to have translated, without the system making the determination (and the determination may be based on criteria such as which articles may have the highest predicted ROI, the number of requests from customers for translations, and/or which articles have the highest frequency of being referenced in a defined period of time, such as in the last 30 days), and the administrator may then use the selection tool to request the translation.

In embodiments, articles for which translations have been requested and that are managed externally may be exported. The export may be done from within a node in a setup tree, (e.g., under application setup>data management that is accessed in the UI (the UI having features for exporting articles as shown and described in FIGS. 9-17 above). When exporting articles to be translated, after having selected a queue (for translating the articles), the user has the ability to select articles that have never been exported, select articles that are out of synchronization, select all articles from a queue, select source-target language pairs (for which to export zip files may be created) (one zip file per article type). The user also has the ability to select the target language or languages for exporting articles. The selection abilities of the user may allow for the exporting of articles for which translations have been previously requested in the same set of language or languages as the translation requests. When an article is exported, the date of (last) export is stored in the specific translation(s) records that match the export criteria. In at least one embodiment, the export may be asynchronous and may be monitored through a specific monitoring page.

System Overview

FIG. 18 illustrates a block diagram of an environment 1810 wherein an on-demand database service might be used. Environment 1810 may include user systems 1812, network 1814, system 1816, processor system 1817, application platform 1818, network interface 1820, tenant data storage 1822, system data storage 1824, program code 1826, and process space 1828. In other embodiments, environment 1810 may not have all of the components listed and/or may have other elements instead of, or in addition to, those listed above.

Environment 1810 is an environment in which an on-demand database service exists. User system 1812 may be any machine or system that is used by a user to access a database user system. For example, any of user systems 1812 may be a handheld computing device, a mobile phone, a laptop computer, a work station, and/or a network of computing devices. As illustrated in FIG. 18 (and in more detail in FIG. 19) user systems 1812 might interact via a network 1814 with an on-demand database service, which is system 1816.

An on-demand database service, such as system 1816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1816" and "system 1816" will be used interchangeably herein. A database image may include one or more database objects. A relational database management system (RDMS) or the equivalent may execute storage and retrieval of information against the database object(s). Application platform 1818 may be a framework that allows the applications of system 1816 to run, such as the hardware and/or software, e.g., the operating system. In an embodiment, on-demand database service 1816 may include an application platform 1818 that enables creation, managing and executing one or more applications developed by the provider of the on-demand database service, users accessing the on-demand database service via user systems 1812, or third party application developers accessing the on-demand database service via user systems 1812.

The users of user systems 1812 may differ in their respective capacities, and the capacity of a particular user system 1812 might be entirely determined by permissions (permission levels) for the current user. For example, where a salesperson is using a particular user system 1812 to interact with system 1816 that user system has the capacities allotted to that salesperson. However, while an administrator is using that user system to interact with system 1816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1814 is any network or combination of networks of devices that communicate with one another. For example, network 1814 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 1812 might communicate with system 1816 using TCP/IP and, at a higher network level, use other common Internet protocols to communicate, such as HTTP, FTP, AFS, WAP, etc. In an example where HTTP is used, user system 1812 might include an HTTP client commonly referred to as a "browser" for sending and receiving HTTP messages to and from an HTTP server at system 1816. Such an HTTP server might be implemented as the sole network interface between system 1816 and network 1814, but other techniques might be used as well or instead. In some implementations, the interface between system 1816 and network 1814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1816, shown in FIG. 18, implements a web-based customer relationship management (CRM) system. For example, in one embodiment, system 1816 includes application servers configured to implement and execute CRM software applications as well as provide related data, code, forms, webpages and other information to and from user systems 1812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1816 implements applications other than, or in addition to, a CRM application. For example, system 1816 may provide tenant access to multiple hosted (standard and custom) applications, including a CRM application. User (or third party developer) applications, which may or may not include CRM, may be supported by the application platform 1818, which manages creation, storage of the applications into one or more database objects and executing of the applications in a virtual machine in the process space of the system 1816.

One arrangement for elements of system 1816 is shown in FIG. 18, including a network interface 1820, application platform 1818, tenant data storage 1822 for tenant data 1923, system data storage 1824 for system data 1925 accessible to system 1816 and possibly multiple tenants, program code 1826 for implementing various functions of system 1816, and a process space 1828 for executing MTS system processes and tenant-specific processes, such as running applications as part of an application hosting service. Additional processes that may execute on system 1816 include database indexing processes.

Several elements in the system shown in FIG. 18 include conventional, well-known elements that are explained only briefly here. For example, each user system 1812 could include a desktop personal computer, workstation, laptop, PDA, cell phone, or any wireless access protocol (WAP) enabled device or any other computing device capable of interfacing directly or indirectly to the Internet or other network connection. User system 1812 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1812 to access, process and view information, pages and applications available to it from system 1816 over network 1814. Each user system 1812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1816 or other systems or servers. For example, the user interface device may be used to access data and applications hosted by system 1816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each user system 1812 and all of its components are operator configurable using applications, such as a browser, including computer code run using a central processing unit such as an Intel Pentium® processor or the like. Similarly, system 1816 (and additional instances of an MTS, where more than one is present) and all of their components might be operator configurable using application(s) including computer code to run using a central processing unit such as processor system 1817, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring system 1816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1816 is configured to provide webpages, forms, applications, data and media content to user (client) systems 1812 to support the access by user systems 1812 as tenants of system 1816. As such, system 1816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 19:
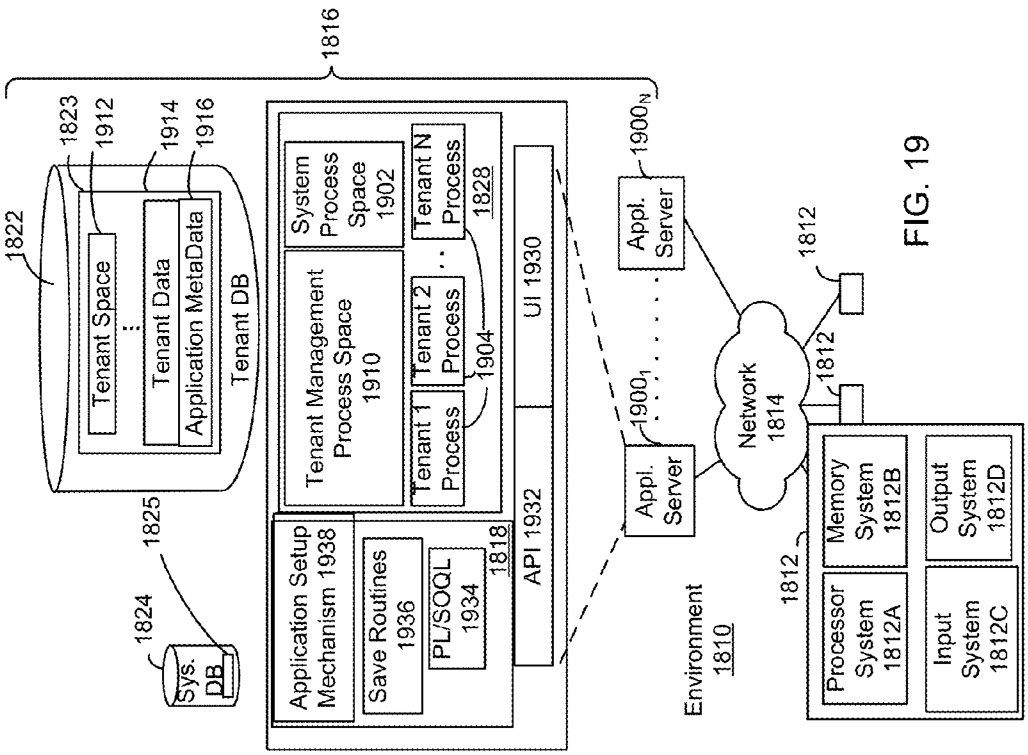
FIG. 19 shows a block diagram of an embodiment of elements of FIG. 18 and various possible interconnections between elements in an embodiment for methods and systems for managing multiple language articles within a knowledge base may operate.

FIG. 19 also illustrates environment 1810. However, in FIG. 19 elements of system 1816 and various interconnections in an embodiment are further illustrated. FIG. 19 shows that user system 1812 may include processor system 1812A, memory system 1812B, input system 1812C, and output system 1812D. FIG. 18 shows network 1814 and system 1816. FIG. 19 also shows that system 1816 may include tenant data storage 1822, tenant data 1923, system data storage 1824, system data 1925, User Interface (UI) 1930, Application Program Interface (API) 1932, PL/SOQL 1934, save routines 1936, application setup mechanism 1938, applications servers $\mathbf{1900}_1$-$\mathbf{1900}_N$, system process space 1802, tenant process spaces 1804, tenant management process space 1810, tenant storage area 1812, user storage 1814, and application metadata 1816. In other embodiments, environment 1810 may not have the same elements as those listed above and/or may have other elements instead of, or in addition to, those listed above.

User system 1812, network 1814, system 1816, tenant data storage 1822, and system data storage 1824 were discussed above in FIG. 18. Regarding user system 1812, processor system 1812A may be any combination of one or more processors. Memory system 1812B may be any combination of one or more memory devices, short term, and/or long term memory. Input system 1812C may be any combination of input devices, such as one or more keyboards, mice, trackballs, scanners, cameras, and/or interfaces to networks. Output system 1812D may be any combination of output devices, such as one or more monitors, printers, and/or interfaces to networks. As shown by FIG. 18, system 1816 may include a network interface 1820 (of FIG. 18) implemented as a set of HTTP application servers 1900, an application platform 1818, tenant data storage 1822, and system data storage 1824. Also shown is system process space 1802, including individual tenant process spaces 1804 and a tenant management process space 1810. Each application server 1900 may be configured to tenant data storage 822 and the tenant data 1923 therein, and system data storage 1824 and the system data 1925 therein to serve requests of user systems 1812. The tenant data 1923 might be divided into individual tenant storage areas 1812, which may be either a physical arrangement and/or a logical arrangement of data. Within each tenant storage area 1812, user storage 1814 and application metadata 1816 might be similarly allocated for each user. For example, a copy of a user's most recently used (MRU) items might be stored to user storage 1814. Similarly, a copy of MRU items for an entire organization that is a tenant might be stored to tenant storage area 1812. A UI 1930 provides a user interface and an API 1932 provides an application programmer interface to system 1816 resident processes to users and/or developers at user systems 1812. The tenant data and the system data may be stored in various databases, such as one or more Oracle™ databases.

Application platform 1818 includes an application setup mechanism 1938 that supports application developers' creation and management of applications, which may be saved as metadata into tenant data storage 1822 by save routines 1936 for execution by subscribers as one or more tenant process spaces 1804 managed by tenant management process 1810 for example. Invocations to such applications may be coded using PL/SOQL 1934 that provides a programming language style interface extension to API 1932. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 1816 for the subscriber making the invocation and executing the metadata as an application in a virtual machine.

Each application server 1900 may be communicably coupled to database systems, e.g., having access to system data 1925 and tenant data 1923, via a different network connection. For example, one application server $\mathbf{1900}_1$ might be coupled via the network 1814 (e.g., the Internet), another application server $\mathbf{1900}_{N-1}$ might be coupled via a direct network link, and another application server $\mathbf{1900}_N$ might be coupled by yet a different network connection. Transfer Control Protocol and Internet Protocol (TCP/IP) are typical protocols for communicating between application servers 1900 and the database system. However, it will be apparent to one skilled in the art that other transport protocols may be used to optimize the system depending on the network interconnect used.

In certain embodiments, each application server 1900 is configured to handle requests for any user associated with any organization that is a tenant. Because it is desirable to be able to add and remove application servers from the server pool at any time for any reason, there is preferably no server affinity for a user and/or organization to a specific application server 1900. In one embodiment, therefore, an interface system implementing a load balancing function (e.g., an F5 Big-IP load balancer) is communicably coupled between the application servers 1900 and the user systems 1812 to distribute requests to the application servers 1900. In one embodiment, the load balancer uses a least connections algorithm to route user requests to the application servers 1900. Other examples of load balancing algorithms, such as round robin and observed response time, also may be used. For example, in certain embodiments, three consecutive requests from the same user could hit three different application servers 1900, and three requests from different users could hit the same application server 1900. In this manner, system 1816 is multi-tenant, wherein system 1816 handles storage of, and access to, different objects, data and applications across disparate users and organizations.

As an example of storage, one tenant might be a company that employs a sales force where each salesperson uses system 1816 to manage their sales process. Thus, a user might maintain contact data, leads data, customer follow-up data, performance data, goals and progress data, etc., all applicable to that user's personal sales process (e.g., in tenant data storage 1822). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1816 might also maintain system level data usable by multiple tenants or other data. Such system level data might include industry reports, news, postings, and the like that are sharable among tenants.

In certain embodiments, user systems 1812 (which may be client systems) communicate with application servers 1900 to request and update system-level and tenant-level data from system 1816 that may require sending one or more queries to tenant data storage 1822 and/or system data storage 1824. System 1816 (e.g., an application server 1900 in system 1816) automatically generates one or more SQL statements (e.g., one or more SQL queries) that are designed to access the desired information. System data storage 1824 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/8128,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Method for Using the Environment (FIGS. 18 and 19)

Figure 20:
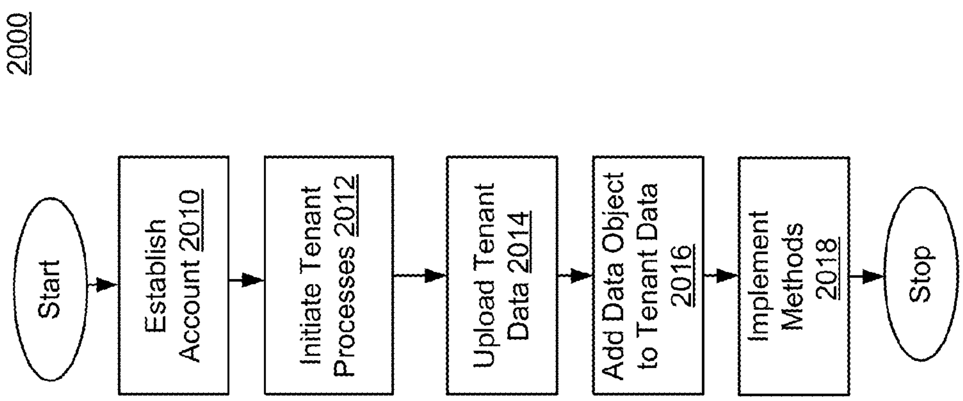
FIG. 20 shows a flowchart of an example of an embodiment of a method for using the environment of FIG. 18.

FIG. 20 shows a flowchart of an example of a method 2000 of using environment 1810. In step 2010, user system 1812 (FIGS. 18 and 19) establishes an account. In step 2012, one or more tenant process space 1904 (FIG. 19) are initiated on behalf of user system 1812, which may also involve setting aside space in tenant space 1912 (FIG. 19) and tenant data 1914 (FIG. 19) for user system 1812. Step 2012 may also involve modifying application metadata to accommodate user system 1812. In step 2014, user system 1812 uploads data. In step 2016, one or more data objects are added to tenant data 1914 where the data uploaded is stored. In step 2018, the methods associated with FIGS. 18-19 may be implemented. In another embodiment, although depicted as distinct steps in FIG. 20, steps 2002-2018 may not be distinct steps. In other embodiments, method 2000 may not have all of the above steps and/or may have other steps in addition to, or instead of, those listed above. The steps of method 2000 may be performed in another order. Subsets of the steps listed above as part of method 2000 may be used to form their own method.

Method for Creating the Environment (FIGS. 18 and 19)

Figure 21:
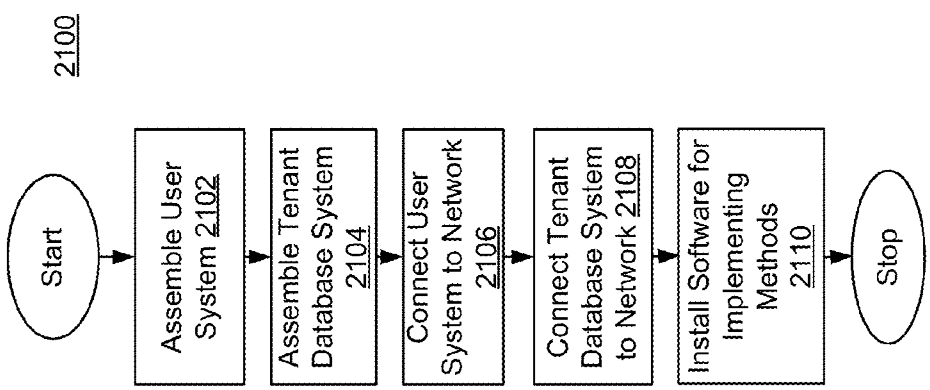
FIG. 21 shows a flowchart of an example of an embodiment of a method of making an environment of FIG. 18.

FIG. 21 is a method of making environment 1810, in step 2102, user system 1812 (FIGS. 18 and 19) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 2104, system 1816 (FIGS. 18 and 19) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 1816 may include installing application platform 1818, network interface 1820, tenant data storage 1822, system data storage 1824, system data 1925, program code 1826, process space 1828, UI 1930, API 1932, PL/SOQL 1934, save routine 1936, application setup mechanism 1938, applications servers $1900_1$-$1900_N$, system process space 1902, tenant process spaces 1904, tenant management process space 1910, tenant space 1912, tenant data 1914, and application metadata 1916 (FIG. 19).

In step 2106, user system 1812 is communicatively coupled to network 1904. In step 2108, system 1816 is communicatively coupled to network 1904 allowing user system 1812 and system 1816 to communicate with one another (FIG. 19). In step 2110, one or more instructions may be installed in system 1816 (e.g., the instructions may be installed on one or more machine readable media, such as computer readable media, therein) and/or system 1816 is otherwise configured for performing the steps of methods associated with FIGS. 18-19. In an embodiment, each of the steps of method 2100 is a distinct step. In another embodiment, although depicted as distinct steps in FIG. 21, steps 2102-2110 may not be distinct steps. In other embodiments, method 2100 may not have all of the above steps and/or may have other steps in addition to, or instead of, those listed above. The steps of method 2100 may be performed in another order. Subsets of the steps listed above as part of method 2100 may be used to form their own method.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

EXTENSIONS AND ALTERNATIVES

In an alternate embodiment, a CRUD delete for translations may be used instead of directly using DeleteDraftTranslations through an API by implementing the delete verb that simply delegates to the DeleteDraftTranslations transition in a validation hook, which would as described above correctly ensures that based on the current state and user this operation would be allowed, before proceeding with the UDD delete call.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method for managing multi-lingual knowledge bases in a database system, comprising:

receiving, by a host system, a request for a language translation to one or more languages of an article available in a first language in a knowledge base, the request being initiated through a user interface having at least one input area;

determining that the article is not available in the knowledge base in the requested one or more languages;

determining, based at least in part on both a predicted return on investment (ROI) associated with translating the article and a frequency of the article being referenced by other articles within a designated time period, that a translation request should be sent;

sending, from the host system, responsive to determining that the translation request should be sent, the translation request;

receiving, by the host system, one or more language translations of the article from a source other than the knowledge base;

storing the one or more language translations in the knowledge base; and publishing the translations using a process workflow to define a versioned life cycle for the one or more language translations as the one or more language translations move between draft, online and archived states, to provide the one or more language translations to users of the knowledge base.

2. The method of claim 1, where if the article is available in a language of a user interface in contact with the host system, the method further comprises: detecting the language of the user interface; and displaying the requested article in the language of the user interface.

3. The method of claim 1, where the process workflow has one or more transition types modeled as static enumerated types to define the versioned life cycle.

4. The method of claim 1, where the one or more articles are modeled with a unified data dictionary (UDD).

5. The method of claim 4, where the article publishing process workflow is based on a statically defined state machine based on approval process metadata entities in the UDD.

6. The method of claim 1, where the sending of the translation request is to an assignment queue that comprises a list of people who translate the articles for which a translation is requested.

7. The method of claim 6, where the article available in the first language is exported for translation, a copy of the article in the first language is sent directly to a translator or to a storage area to which a queue of translators of the assignment queue have access, and any one translator from the queue of translators may view, copy, and download the article, thereby allowing the translator to translate the article.

8. The method of claim 7, where the article in the first language is exported for translation as a zip file, and following translation one or more translations of the first language article are imported as zip files.

9. A system for managing multi-lingual knowledge bases, comprising:

a database housed on a server, the server having a processor system including at least one processor;

and a memory system including a machine readable medium having stored thereon one or more sequences of instructions which, when executed, cause a method to be carried out, the method comprising:

receiving, by a host system on the server, a request for a language translation to one or more languages of an article available in a first language in a knowledge base, the request being initiated through a user interface having at least one input area;

determining that the article is not available in the knowledge base in the requested one or more languages;

determining, based at least in part on both a predicted return on investment (ROI) associated with translating the article and a frequency of the article being referenced by other articles within a designated time period, that a translation request should be sent;

sending, from the host system, responsive to determining that the translation request should be sent, the translation request;

receiving, by the host system, one or more language translations of the article from a source other than the knowledge base;

storing the one or more language translations in the knowledge base; and publishing the translations using a process workflow to define a versioned life cycle for the one or more language translations as the one or more language translations move between draft, online and archived states, to provide the one or more language translations to users of the knowledge base.

10. The system of claim 9, where if the article is available in a language of a user interface in contact with the host system, the method further comprises: detecting the language of the user interface; and displaying the requested article in the language of the user interface.

11. The system of claim 10, where the process workflow has one or more transition types modeled as static enumerated types to define the versioned life cycle.

12. The system of claim 10, where the one or more articles are modeled with a unified data dictionary (UDD).

13. The system of claim 12, where the article publishing process workflow is based on a statically defined state machine based on approval process metadata entities in the UDD.

14. The system of claim 9, where the sending of the translation request is to an assignment queue that comprises a list of people who translate the articles for which a translation is requested.

15. The system of claim 14, where the article in the first language is exported for translation as a zip file, and following translation one or more translations of the first language article are imported as zip files.

16. The system of claim 9, where the article available in the first language is exported for translation, a copy of the article in the first language is sent directly to a translator or to a storage area to which a queue of translators of the assignment queue have access, and any one translator from the queue of translators may view, copy, and download the article, thereby allowing the translator to translate the article.

* * * * *